(12) United States Patent
Fujimura et al.

US011512205B2

(10) Patent No.: US 11,512,205 B2
(45) Date of Patent: Nov. 29, 2022

(54) COMPOSITE PIGMENT AND PRODUCTION METHOD THEREOF, PAINT COMPOSITION CONTAINING COMPOSITE PIGMENT, AND COATING FILM

(71) Applicant: ISHIHARA SANGYO KAISHA, LTD., Osaka (JP)

(72) Inventors: Takeshi Fujimura, Osaka (JP); Shogo Iseya, Osaka (JP); Hironori Shimoita, Osaka (JP); Yusuke Taniguchi, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 104 days.

(21) Appl. No.: 16/343,792

(22) PCT Filed: Oct. 23, 2017

(86) PCT No.: PCT/JP2017/038188
§ 371 (c)(1),
(2) Date: Apr. 22, 2019

(87) PCT Pub. No.: WO2018/079486
PCT Pub. Date: May 3, 2018

(65) Prior Publication Data
US 2019/0249017 A1    Aug. 15, 2019

(30) Foreign Application Priority Data

Oct. 24, 2016  (JP) .............................. JP2016-207774
Mar. 31, 2017  (JP) .............................. JP2017-072503
Apr. 26, 2017  (JP) .............................. JP2017-087582
May 31, 2017  (JP) .............................. JP2017-108353

(51) Int. Cl.
*C09C 3/06* (2006.01)
*C09C 1/00* (2006.01)
*C09C 1/02* (2006.01)
*C09C 1/36* (2006.01)
*C09D 7/40* (2018.01)
*C09D 133/02* (2006.01)
*C09D 7/62* (2018.01)
*C09C 3/12* (2006.01)
*C09C 3/10* (2006.01)
*C09C 3/08* (2006.01)
*C09D 201/00* (2006.01)
*C09D 7/42* (2018.01)
*C09C 1/30* (2006.01)
*C09C 1/62* (2006.01)
*C09D 133/04* (2006.01)

(52) U.S. Cl.
CPC .............. *C09C 3/06* (2013.01); *C09C 1/0081* (2013.01); *C09C 1/0084* (2013.01); *C09C 1/02* (2013.01); *C09C 1/022* (2013.01); *C09C 1/3054* (2013.01); *C09C 1/36* (2013.01); *C09C 1/3653* (2013.01); *C09C 1/62* (2013.01); *C09C 3/08* (2013.01); *C09C 3/10* (2013.01); *C09C 3/12* (2013.01); *C09D 7/42* (2018.01); *C09D 7/62* (2018.01); *C09D 7/69* (2018.01); *C09D 133/02* (2013.01); *C09D 133/04* (2013.01); *C09D 201/00* (2013.01); *C01P 2004/02* (2013.01); *C01P 2004/50* (2013.01); *C01P 2004/51* (2013.01); *C01P 2004/52* (2013.01); *C01P 2004/61* (2013.01); *C01P 2004/80* (2013.01)

(58) Field of Classification Search
CPC ..................................................... C09C 1/0081
See application file for complete search history.

(56) References Cited

U.S. PATENT DOCUMENTS

| 3,251,704 | A |  | 5/1966 | Nellessen |  |
|---|---|---|---|---|---|
| 3,576,656 | A |  | 4/1971 | Webb |  |
| 5,509,960 | A |  | 4/1996 | Simpson |  |
| 5,690,728 | A |  | 11/1997 | Ravishankar |  |
| 6,113,873 | A |  | 9/2000 | Tunashima |  |
| 2013/0030106 | A1 |  | 1/2013 | Chung |  |
| 2014/0000484 | A1 |  | 1/2014 | Wilkenhoener |  |
| 2014/0010772 | A1 |  | 1/2014 | Grunner |  |
| 2014/0242128 | A1 |  | 8/2014 | Ashida |  |
| 2015/0166763 | A1 | * | 6/2015 | Wilkenhoener | .......... C08K 3/32 106/449 |
| 2015/0166793 | A1 |  | 6/2015 | Mersch |  |
| 2016/0222214 | A1 |  | 8/2016 | Patel |  |

(Continued)

FOREIGN PATENT DOCUMENTS

| CN | 103459515 | 12/2013 |
|---|---|---|
| CN | 105722903 | 6/2016 |
| EP | 0778319 | 6/1997 |

(Continued)

OTHER PUBLICATIONS

Datasheet for DISPERSBYK-185 p. 1-2 Apr. 2016 (Year: 2016).*

(Continued)

*Primary Examiner* — Robert T Butcher
(74) *Attorney, Agent, or Firm* — Jeffrey S. Melcher; Melcher Patent Law PLLC

(57) ABSTRACT

The purpose of the present invention is to provide a composite pigment which can be dispersed and made into paint in a manner that saves labor compared with conventional flat emulsion paints, and which can achieve concealing properties and low glossiness (a luster reduction effect) without separately adding a matting agent. This composite pigment contains an inorganic compound and/or an organic compound, and a fixed extender pigment.

11 Claims, 17 Drawing Sheets

(56) References Cited

U.S. PATENT DOCUMENTS

2017/0121551 A1* 5/2017 Siekman .................. C09D 7/42

FOREIGN PATENT DOCUMENTS

| EP | 1 184 426 A2 | | 3/2002 |
|---|---|---|---|
| GB | 1532521 | | 11/1978 |
| JP | 06-100701 | | 4/1994 |
| JP | 07-216256 | | 8/1995 |
| JP | 07-304997 | | 11/1995 |
| JP | H08-209029 | | 8/1996 |
| JP | 09-25429 | | 1/1997 |
| JP | 09-157545 | | 6/1997 |
| JP | 2003-176131 | | 6/2003 |
| JP | 2004-307853 | | 11/2004 |
| JP | 2005-187701 | | 7/2005 |
| JP | 2005-272586 | | 10/2005 |
| JP | 2009-197221 | | 9/2009 |
| JP | 2012-92289 | | 5/2012 |
| JP | 2013-28778 | | 2/2013 |
| JP | 2002-356625 | | 9/2013 |
| JP | 2015-110733 | | 6/2015 |
| JP | 2016-3250 | | 1/2016 |
| KR | 1020120009519 | | 1/2012 |
| SG | 188588 | | 4/2013 |
| WO | 2013/003237 | | 1/2013 |
| WO | 2013/018828 | | 2/2013 |
| WO | WO 2014/000874 | * | 1/2014 |
| WO | 2015/038073 | | 3/2015 |

OTHER PUBLICATIONS

Machine translation of WO 2014000874 (Year: 2014).*
European Search Report issued in EP Application No. 17864877.0, dated May 29, 2020, pp. 1-11.
European Search Report issued in EP Application No. 17865992.6, dated May 29, 2020, pp. 1-11.
Mikhailov M.M et al: "Effects of Silicon and Magnesium Additions on the Reflectance and Photostability of Anatase Pigment Powders", Inorganic Materials, Sep. 1, 2002 (Sep. 1, 2002), pp. 922-926, XP055696612,New YorkDOI: 10.1023/A:1020046409695Retrievedfrom the Internet:URL:https://link.springer.com/content/pdf/ 10.1023/ A:1015345422261.pdf.
Written Opinion issued in PCT/JP2017/038188 dated Dec. 12, 2017, pp. 1-5.
International Search report issued in PCT/JP2017/038188 dated Dec. 12, 2017, pp. 1-2.
International Search report issued in PCT/JP2017/038189 dated Dec. 12, 2017, pp. 1-2.
Written Opinion issued in PCT/JP2017/038189 dated Dec. 12, 2017, pp. 1-5.
Search Report issued in Singapore application No. 11201903650X, dated Feb. 5, 2020, pp. 1-9.
Search Report issued in Singapore application No. 11201903648X, dated Jan. 28, 2020, pp. 1-9.
Office Action issued in corresponding Chinese Patent Application No. 201780066508.3, dated Feb. 24, 2021, pp. 1-13, machine translation pp. 1-8.
Wang Xing, Wei Wei Lian, Wei Shaodong, Production and Application of Nanometer Titanium Dioxide, Guizhou Science and Technology Press, pp. 23-25, Jul. 2014, partial translations also filed, 1 page.
Office Action issued in corresponding Taiwan Patent Application No. 11020253490, dated Mar. 19, 2021, pp. 1-13, machine translation pp. 1-8.
Office Action issued in JP Appln. No. 2018-547652 corresponding to U.S. Appl. No. 16/343,792, dated Mar. 22, 2022.
Office Action issued in Japanese application JP Appln. No 2018-547653 corresponding to U.S. Appl. No. 16/343,794, dated Mar. 22, 2022.

* cited by examiner

US 11,512,205 B2

COMPOSITE PIGMENT AND PRODUCTION METHOD THEREOF, PAINT COMPOSITION CONTAINING COMPOSITE PIGMENT, AND COATING FILM

TECHNICAL FIELD

The present invention relates to a composite pigment, a method for producing the composite pigment, a paint composition containing the composite pigment, and a paint film. Specifically, the present invention is as follows.

The present invention (the first invention of the present application) relates to a composite pigment containing an extender pigment and an inorganic compound, a method for producing the composite pigment, a paint composition containing the composite pigment, and a paint film.

The present invention (the second invention of the present application) relates to a composite pigment containing a titanium oxide pigment, a method for producing the composite pigment, a paint composition containing the composite pigment, and a paint film.

The present invention (the third invention of the present application and the fourth invention of the present application) relates to a composite pigment containing an inorganic color pigment, a method for producing the composite pigment, a paint composition containing the composite pigment, and a paint film.

The present invention (the fifth invention of the present application) relates to a composite pigment containing an extender pigment and an inorganic compound and/or organic compound, a method for producing the composite pigment, a composite pigment further containing an inorganic color pigment such as a titanium oxide pigment, a method for producing the composite pigment, and a paint composition containing the composite pigments, and a paint film.

BACKGROUND ART

By applying a matting paint to a surface of a target, the color impression or texture of the target is modified. For example, by applying a matting paint to an inner wall of a house, a relaxed atmosphere can be produced indoors. In addition, by applying a matting paint to a wall surface or a member which receives sunlight, or light from lighting equipment or the like, reflection of furniture, plants, persons or the like can be reduced. Further, a matting paint may be applied to a vehicle main body. In general, coating for vehicles is often "glossy", and by applying a matting paint, a distinctive and unique design can be created.

In the former applications (building materials and the like), among the applications described above, generally a color gloss paint to which a matting agent is added (color matting paint) is used. On the other hand, in the latter applications (vehicles and the like), generally a color gloss paint, a pearl paint or the like is applied to a vehicle main body to form a base layer, and a transparent matting paint is applied onto the base layer to form a top layer.

Heretofore, silica, resin beads and the like have been used as matting agents (e.g. Patent Literatures 1 and 2). Among them, silica matting agents have a good matte property, and are widely used in the above-described building material applications and vehicle applications.

Meanwhile, a silica matting agent is apt to cause an increase in viscosity of a matting paint containing the matting agent. In particular, when the amount of the matting agent blended is increased for the purpose of enhancing the degree of a gloss reduction, the viscosity of the paint markedly increases, so that the workability (handling) of the coating is deteriorated. On the other hand, for example, Patent Literature 3 suggests that an increase in viscosity of a paint is reduced by using a mixture of hydrophobic silica and an inorganic filler (calcium carbonate, mica, talc, clay or the like) as a matting agent.

Various attempts have been made to use a mixture of silica and an inorganic filler (extender pigment) as a matting agent for various purposes other than reduction of an increase in viscosity of a paint. For example, Patent Literature 4 suggests that deterioration of the appearance quality of a paint film due to aggregation of silica is reduced or an increase in gloss of a matting paint film due to friction is reduced by blending a mixture of silica and talc as a matting agent in a transparent (clear) matting paint for vehicles. Patent Literature 5 suggests that an increase in gloss of a matting paint film due to friction is reduced by blending a mixture of spherical silica gel and an extender pigment (calcium carbonate or barium sulfate) as a matting agent in a matting overprint varnish composition.

As pigments having a high gloss, inorganic color pigments such as titanium oxide pigments are used in a wide range of applications. However, in some applications, a high gloss is not required, and pigments having a low gloss are favored. For example, when a pigment having a low gloss is used for a coating material for a building or the like, a relaxed atmosphere can be produced. In addition, when a pigment having a low gloss is used for a wall surface or a member which receives sunlight or light from lighting equipment or the like, reflection of furniture, plants, persons or the like can be reduced.

For preparing a paint film having a low gloss and a low luster in general, a flat emulsion paint containing a titanium oxide pigment and porous calcium carbonate is used as described in, for example, Patent Literature 6. The calcium carbonate forms fine irregularities on the surface of a paint film, so that diffusion of incident light can be facilitated to exhibit a matte effect. Patent Literatures 1, 2 and 7 suggest that a matting agent of spherical silica, silicate particles or resin beads is added to a gloss paint (gloss emulsion paint) containing a titanium oxide pigment or the like.

A matting paint may be used as a coating material for a building or the like. For example, by applying a matting paint to an inner wall of a building, a relaxed atmosphere can be produced on the inner wall. In addition, by applying a matting paint to a wall surface or a member which receives sunlight, or light from lighting equipment or the like, reflection of furniture, plants, persons or the like can be reduced.

In general, a matting paint contains an inorganic color pigment (e.g. inorganic white pigment such as titanium dioxide), and a component for reducing gloss. For example, Patent Literature 6 discloses a flat emulsion paint containing a titanium dioxide pigment and porous calcium carbonate. The calcium carbonate forms fine irregularities on the surface of a paint film, so that diffusion of incident light is facilitated to exhibit a matte effect. Patent Literatures 1 and 2 suggest that a matting agent of spherical silica, resin beads or the like is added to a gloss paint (gloss emulsion paint) containing a titanium dioxide pigment or the like.

In addition, an attempt has been made to obtain a matting paint and a matting paint film without using a component for reducing gloss. For example, Patent Literature 8 suggests that on the surface of rutile-type or anatase-type titanium dioxide having an average particle diameter of 0.15 to 0.3 hydrous silicon and hydrous aluminum are provided as $SiO_2$ and $Al_2O_3$ in an amount of 2 to 15% by weight and an amount of 1 to 10% by weight, respectively, and an organic metal compound such as an organic silicon compound is provided in an amount of 0.05 to 5% by weight. It is stated that such a titanium dioxide pigment makes it possible to obtain a paint exhibiting high hiding power and an excellent matte effect without using a component for reducing gloss, and is excellent in storage stability.

By applying a matting paint to a surface of a target, the color impression or texture of the target is modified. For example, by applying a matting paint to an inner wall of a house, a relaxed atmosphere can be produced indoors. In addition, by applying a matting paint to a wall surface or a member which receives sunlight, or light from lighting equipment or the like, reflection of furniture, plants, persons or the like can be reduced.

As a matting paint, for example, a flat emulsion paint is known which contains an inorganic color pigment (titanium dioxide pigment) and porous calcium carbonate as described in Patent Literature 6. The calcium carbonate forms fine irregularities on the surface of a paint film, so that diffusion of incident light is facilitated to exhibit a matte effect. Patent Literatures 1 and 2 discloses a matting paint obtained by adding a matting agent of spherical silica, resin beads or the like to a gloss paint containing an inorganic color pigment (titanium dioxide pigment or the like).

CITATION LIST

Patent Literatures

Patent Literature 1: JP 08-209029 A
Patent Literature 2: JP 2005-187701 A
Patent Literature 3: JP 09-157545 A
Patent Literature 4: JP 2013-28778 A
Patent Literature 5: JP 2005-272586 A
Patent Literature 6: JP 2012-92289 A
Patent Literature 7: JP 2016-3250 A
Patent Literature 8: JP 09-25429 A

SUMMARY OF INVENTION

Technical Problem

As described above, the matting agents (mixed systems of silica and an extender pigment) described in Patent Literatures 3 to 5 have an advantage that an increase in viscosity of a paint is reduced to exhibit excellent handling over a matting agent of silica alone, and the like. Meanwhile, these matting agents are inferior in matte effect to a matting agent of silica. In addition, when an extender pigment is used in combination, the tactile feeling of a matting paint film tends to be deteriorated (the paint film has a rough tactile feeling).

In the case of the above-described flat emulsion paint, it is necessary to strongly disperse pigment components for ensuring that calcium carbonate in a paint exhibits a matte effect, and an inorganic color pigment (e.g. titanium oxide pigment) sufficiently exhibits pigment properties such as a hiding power. This leads to an increase in labor for formation of the paint.

In addition, a combination of a matting agent and a gloss paint (gloss emulsion paint) has the problem that field operation is complicated because when a matting agent is added to a paint at a construction site, an operator is required to weigh the matting agent, and stir and mix the matting agent and the paint. Further, addition of the complicated operation may cause construction failure. In addition, the matting agent is generally expensive, leading to an increase in cost of the paint.

In the case of the above-described flat emulsion paint described in Patent Literature 6, a high matte effect is easily obtained, but since large irregularities are formed on the surface of a paint film, the tactile feeling of the paint film is deteriorated (the paint film has a rough tactile feeling). In addition, in the case of a combination of a gloss emulsion paint and a matting agent, a moderate matte effect and a moderate tactile feeling (smoothness) of the paint film are obtained, but either of the matte effect and the tactile feeling is not sufficient, and the matting agent is expensive, leading to an increase in cost. Further, in the case of the titanium dioxide pigment described in Patent Literature 3, reduction of gloss is not sufficient, and therefore a sufficient matte effect is not obtained.

Thus, the above-described conventional techniques have the problem that it is difficult to secure both the matte effect and the tactile feeling of the paint film such that enhancement of the matte effect leads to deterioration of the tactile feeling of the paint film, and prioritization of the tactile feeling of the paint film leads to reduction of the matte effect.

The above-described problem arises not only when an inorganic white pigment such as titanium dioxide is used, but also when another inorganic color pigment is used.

In the case of the conventional flat emulsion paint, a high matte effect and a sufficient hiding power are obtained, but it is accordingly necessary to strongly disperse pigment components. This leads to an increase in labor for formation of the paint.

In addition, in the case of a combination of a gloss paint and a matting agent, a moderate matte effect is obtained, but the matte effect is not sufficient. Of course, when the amount of the matting agent blended is increased, the matte effect is enhanced, but the viscosity of the paint is increased. This also leads to an increase in production cost of the paint because the matting agent which is expensive is blended in a large amount.

The present invention has been made in view of the situations described above, and an object of the present invention is to provide a composite pigment which can be dispersed and formed into a paint in a labor saving manner, and is capable of exhibiting a sufficient low-gloss property (matte effect) and hiding power without using a matting agent, a method for producing the composite pigment, a paint composition containing the composite pigment, and a paint film containing the composite pigment.

Solution to Problem

The present inventors have extensively conducted studies for solving the above-described problems, and resultantly found, for the first time, that when as a matting agent, a composite pigment is used in which an extender pigment such as barium sulfate is fixed with an inorganic compound such as silica, a matting paint composition having a low viscosity and excellent handling can be obtained, and a high matte effect in a state of a paint film, and a good tactile feeling of the paint film can be attained.

The present inventors have extensively conducted studies for solving the above-described problems, and resultantly found, for the first time, that when a composite pigment is used in which a titanium oxide pigment and an extender pigment are fixed, the composite pigment can be dispersed and formed into a paint in a labor saving manner as compared to a conventional flat emulsion paint, and a low-gloss property (matte effect) and a hiding power can be attained without adding a matting agent separately.

In addition, the present inventors have extensively conducted studies for solving the above-described problems, and resultantly found, for the first time, that when a composite pigment is used in which an inorganic color pigment such as titanium dioxide is fixed with an inorganic compound, the composite pigment having a specific particle size distribution, it is possible to achieve both a low gloss (a low luster) and a good tactile feeling of the paint film in a paint (paint film) containing the composite pigment.

In addition, the present inventors have extensively conducted studies for solving the above-described problems, and resultantly found, for the first time, that when an inorganic color pigment such as a titanium dioxide pigment, which contains a zinc element is fixed with an inorganic compound, the particle size of a composite pigment can be appropriately increased, so that it is possible to exhibit a high matte effect in a paint film formed using a paint containing the composite pigment.

In addition, the present inventors have extensively conducted studies for solving the above-described problems, and resultantly found, for the first time, that when a composite pigment is used in which an inorganic color pigment such as a titanium oxide pigment and an extender pigment are fixed with an inorganic compound and/or organic compound, the composite pigment can be dispersed and formed into a paint in a labor saving manner as compared to a conventional flat emulsion paint, and a low-gloss property (matte effect) and a hiding power can be attained without adding a matting agent separately.

On the basis of these findings, the present inventors have completed the present invention ("the first invention of the present application" to "the fifth invention of the present application") as described below.

Specifically, the first invention of the present application includes:

(1-1) a composite pigment in which an extender pigment is fixed with an inorganic compound;

(1-2) the composite pigment according to (1-1), wherein a diameter on cumulative 50% (D50) in a volume cumulative distribution measured by a laser diffraction/scattering-type particle size distribution measuring apparatus is 1 to 15 μm;

(1-3) the composite pigment according to (1-1) or (1-2), wherein a diameter on cumulative 90% (D90) in the volume cumulative distribution measured by the laser diffraction/scattering-type particle size distribution measuring apparatus is 5 to 30 μm;

(1-4) the composite pigment according to any one of (1-1) to (1-3), wherein an oil absorption measured by a method specified in JIS K 5101-13-1 is 80 (ml/100 g) or less;

(1-5) the composite pigment according to any one of (1-1) to (1-4), wherein the extender pigment is barium sulfate;

(1-6) the composite pigment according to any one of (1-1) to (1-5), wherein the inorganic compound is an inorganic silicon compound;

(1-7) a matting agent comprising the composite pigment set forth in any one of (1-1) to (1-6);

(1-8) a paint composition comprising at least the composite pigment or matting agent set forth in any one of (1-1) to (1-7), and a resin;

(1-9) the paint composition according to (1-8), comprising a dispersant having an amine value;

(1-10) the paint composition according to (1-8) or (1-9), comprising a color material;

(1-11) The paint composition according to any one of (1-8) to (1-10), wherein the paint composition is a paint composition for formation of a matting top coat, which is applied onto a color base layer;

(1-12) a paint film formed using the paint composition set forth in any one of (1-8) to (1-11);

(1-13) a method for producing a composite pigment, comprising adjusting a pH of a slurry containing an inorganic compound source and an extender pigment, so that an inorganic compound derived from the inorganic compound source is precipitated to fix the extender pigment; and (1-14) the method for producing a composite pigment according to (1-13), comprising preparing the slurry in such a manner that a volume ratio (Va/Vb) of a volume (Va) of the inorganic compound source, which is calculated in terms of an inorganic compound, to a volume (Vb) of the extender pigment is 0.1 to 3.

The second invention of the present application includes:

(2-1) a composite pigment in which at least a titanium oxide pigment and an extender pigment are fixed with an inorganic compound and/or organic compound;

(2-2) the composite pigment according to (2-1), wherein at least a plurality of titanium oxide pigments and a plurality of extender pigments are fixed with an inorganic compound and/or organic compound;

(2-3) the composite pigment according to (2-1) or (2-2), wherein a diameter on cumulative 90% (D90) in a volume cumulative distribution measured by a laser diffraction/scattering-type particle size distribution measuring apparatus is 20 μm or less;

(2-4) the composite pigment according to any one of (2-1) to (2-3), wherein a diameter on cumulative 50% (D50) in the volume cumulative distribution measured by the laser diffraction/scattering-type particle size distribution measuring apparatus is 1 to 10 μm;

(2-5) the composite pigment according to any one of (2-1) to (2-4), wherein the extender pigment is calcium carbonate and/or barium sulfate;

(2-6) the composite pigment according to any one of (2-1) to (2-5), wherein the inorganic compound is an inorganic silicon compound;

(2-7) the composite pigment according to any one of (2-1) to (2-6), further comprising an inorganic compound and/or organic compound for surface treatment on a surface of the composite pigment;

(2-8) a matting pigment comprising the composite pigment set forth in any one of (2-1) to (2-7);

(2-9) a building wall surface coating pigment comprising the composite pigment set forth in any one of (2-1) to (2-7);

(2-10) a building material coating pigment comprising the composite pigment set forth in any one of (2-1) to (2-7);

(2-11) an automobile coating pigment comprising the composite pigment set forth in any one of (2-1) to (2-7);

(2-12) a furniture coating pigment comprising the composite pigment set forth in any one of (2-1) to (2-7);

(2-13) an electric and mechanical product coating pigment comprising the composite pigment set forth in any one of (2-1) to (2-7);

(2-14) a method for producing a composite pigment in which a diameter on cumulative 50% (D50) and a diameter on cumulative 90% (D90) in a volume cumulative distribution measured by a laser diffraction/scattering-type particle size distribution measuring apparatus is 1 to 10 μm and 20 μm or less, respectively, the method comprising preparing a slurry containing at least a titanium oxide pigment, an extender pigment, and an inorganic compound and/or organic compound, and fixing, under stirring, at least the titanium oxide pigment and the extender pigment with the inorganic compound and/or organic;

(2-15) a paint composition comprising the pigment set forth in any one of (2-1) to (2-13); and (2-16) a paint film formed using the paint composition set forth in (2-15).

The third invention of the present application includes:

(3-1) a composite pigment in which an inorganic color pigment is fixed with an inorganic compound, wherein an abundance ratio of the composite pigment having a particle diameter of 1 μm or more in a volume cumulative distribution measured by a laser diffraction/scattering-type particle size distribution measuring apparatus is 50% or more based on the total amount of the composite pigment, and a diameter on cumulative 90% (D90) is 30 μm or less;

(3-2) the composite pigment according to (3-1), wherein the abundance ratio of the composite pigment having a particle diameter of 2 μm or more in the volume cumulative distribution is 30% or more based on the total amount of the composite pigment;

(3-3) the composite pigment according to (3-1) or (3-2), wherein when for a paint composition containing the composite pigment and an acrylic resin, a specular gloss is measured by a method specified in JIS-K5600-4-7, the specular gloss is 5% or less under a geometric condition of 60°;

(3-4) the composite pigment according to any one of (3-1) to (3-3), wherein when for a paint composition containing the composite pigment and an acrylic resin, a specular gloss is measured by the method specified in JIS-K5600-4-7, the specular gloss is 40% or less under a geometric condition of 85°;

(3-5) the composite pigment according to any one of (3-1) to (3-4), wherein the inorganic color pigment is at least one selected from the group consisting of titanium dioxide, lower titanium oxide, titanium oxynitride, zinc oxide, basic lead carbonate, carbon black, bone black, graphite, iron black, cobalt chromate black spinel, iron chromate composite oxide, copper chromate spinel black composite oxide, Fe—Mn—Bi black, red iron oxide, molybdenum red, nickel antimony titanium yellow, chrome antimony titanium buff, synthetic iron oxide yellow, chrome yellow, ultramarine blue, iron blue, cobalt blue, cobalt green, chrome green, chromium oxide green, cobalt chromate green spinel and cobalt titanate green spinel;

(3-6) the composite pigment according to any one of (3-1) to (3-5), wherein the inorganic compound is an inorganic silicon compound;

(3-7) a matting pigment comprising the composite pigment set forth in any one of (3-1) to (3-6);

(3-8) a paint composition comprising the composite pigment set forth in any one of (3-1) to (3-7), and a resin;

(3-9) a paint film formed using the paint composition set forth in (3-8);

(3-10) a paint film according to (3-9), wherein the paint film contains the composite pigment and an acrylic resin, and when a specular gloss is measured by a method specified in JIS-K5600-4-7, the specular gloss is 5% or less under a geometric condition of 60°;

(3-11) the paint film according to (3-9) or (3-10), wherein the paint film contains the composite pigment and an acrylic resin, and when a specular gloss is measured by a method specified in JIS-K5600-4-7, the specular gloss is 40% or less under a geometric condition of 85°; and (3-12) a method for producing a composite pigment, comprising:

preparing a slurry having a solid concentration of 75 to 450 g/L and containing an inorganic compound source and an inorganic color pigment in such a manner that a volume ratio (Va/Vb) of a volume (Va) of the inorganic compound source, which is calculated in terms of a precipitated inorganic compound, to a volume (Vb) of the inorganic color pigment is 0.3 to 2; and adjusting a pH of the slurry so that an inorganic compound derived from the inorganic compound source is precipitated to fix the inorganic color pigment.

The fourth invention of the present application includes:

(4-1) a composite pigment in which an inorganic color pigment containing a zinc element is fixed with an inorganic compound;

(4-2) the composite pigment according to (4-1), wherein the inorganic color pigment and an extender pigment are fixed with the inorganic compound;

(4-3) the composite pigment according to (4-1) or (4-2), wherein the zinc element is present on at least a surface of the inorganic color pigment;

(4-4) the composite pigment according to any one of (4-1) to (4-3), wherein the zinc element is present as zinc oxide and/or zinc hydroxide;

(4-5) the composite pigment according to any one of (4-1) to (4-4), wherein an abundance ratio of the composite pigment having a particle diameter of 2 μm or more in a volume cumulative distribution measured by a laser diffraction/scattering-type particle size distribution measuring apparatus is 70% or more based on the total amount of the composite pigment;

(4-6) the composite pigment according to any one of (4-1) to (4-5), wherein a diameter on cumulative 90% (D90) in the volume cumulative distribution measured by the laser diffraction/scattering-type particle size distribution measuring apparatus is 30 μm or less;

(4-7) the composite pigment according to any one of (4-1) to (4-6), wherein the inorganic color pigment is a titanium dioxide pigment;

(4-8) a matting pigment comprising the composite pigment set forth in any one of (4-1) to (4-7);

(4-9) a paint composition comprising at least the composite pigment and/or the matting pigment set forth in any one of (4-1) to (4-8), and a resin;

(4-10) the paint composition according to (4-9), comprising a dispersant having an amine value;

(4-11) a paint film formed using the paint composition set forth in (4-9) or (4-10); and (4-12) a method for producing a composite pigment, comprising adjusting a slurry containing an inorganic color pigment containing a zinc element, and an inorganic compound source, and adjusting a pH of the slurry so that an inorganic compound derived from the inorganic compound source is precipitated to fix the inorganic color pigment.

The fifth invention of the present application includes:

(5-1) a composite pigment comprising extender pigment particles fixed to an inorganic compound and/or organic compound;

(5-2) a composite pigment in which some of the extender pigment particles set forth in (5-1) are replaced with an inorganic color pigment;

(5-3) a composite pigment in which the numbers of the extender pigment particles and the inorganic color pigment particles set forth in (5-2) are each 2 or more;

(5-4) the composite pigment according to (5-2) or (5-3), wherein a diameter on cumulative 90% (D90) in a volume cumulative distribution measured by a laser diffraction/scattering-type particle size distribution measuring apparatus is 30 µm or less;

(5-5) the composite pigment according to any one of (5-2) to (5-4), wherein a diameter on cumulative 50% (D50) in the volume cumulative distribution measured by the laser diffraction/scattering-type particle size distribution measuring apparatus is 1 µm or more and 10 µm or less;

(5-6) the composite pigment according to any one of (5-1) to (5-5), wherein the extender pigment is calcium carbonate and/or barium sulfate;

(5-7) the composite pigment according to any one of (5-1) to (5-6), wherein the inorganic compound is an inorganic silicon compound;

(5-8) the composite pigment according to any one of (5-2) to (5-7), wherein the inorganic color pigment particles contain a zinc element;

(5-9) the composite pigment according to any one of (5-2) to (5-8), wherein an abundance ratio of the composite pigment having a particle diameter of 2 µm or more in the volume cumulative distribution measured by the laser diffraction/scattering-type particle size distribution measuring apparatus is 70% or more based on the total amount of the composite pigment;

(5-10) the composite pigment according to any one of (5-2) to (5-9), wherein the inorganic color pigment is a titanium dioxide pigment;

(5-11) the composite pigment according to any one of (5-2) to (5-10), further comprising an inorganic compound and/or organic compound for surface treatment on a surface of the composite pigment;

(5-12) a matting pigment comprising the composite pigment set forth in any one of (5-1) to (5-11);

(5-13) a method for producing a composite pigment, comprising adjusting a pH of a slurry containing an inorganic compound source and extender pigment particles so that an inorganic compound derived from the inorganic compound source is precipitated to fix the extender pigment particles;

(5-14) a method for producing a composite pigment, comprising preparing a slurry containing inorganic color pigment particles, extender pigment particles, and an inorganic compound source and/or organic compound, and fixing, under stirring, the inorganic color pigment particles and the extender pigment particles with the inorganic compound and/or organic compound;

(5-15) a method for producing a composite pigment, comprising preparing a slurry containing inorganic color pigment particles containing a zinc element, extender pigment particles, and an inorganic compound source, and adjusting a pH of the slurry, so that an inorganic compound derived from the inorganic compound source is precipitated to fix the inorganic color pigment particles and the extender pigment particles;

(5-16) a paint composition comprising the composite pigment set forth in any one of (5-1) to (5-11) and/or the matting pigment set forth in (5-12), and a resin;

(5-17) the paint composition according to (5-16), comprising a dispersant having an amine value; and (5-18) a paint film comprising the paint composition set forth in (5-16) or (5-17).

Advantageous Effects of Invention

When the composite pigment of the first invention of the present application is blended in a paint (paint film), gloss of the paint film can be sufficiently reduced. The composite pigment has the same level in the degree of a gloss reduction as a conventional silica matting agent having a high matte effect.

In addition, while the composite pigment of the first invention of the present application is capable of exhibiting the high matte effect as described above, an increase in viscosity of a paint containing the composite pigment can be sufficiently reduced, so that a paint composition having good handling can be obtained.

In addition, the composite pigment of the first invention of the present application enables the paint film to have a smooth tactile feeling although the composite pigment contains an extender pigment which negatively affects the tactile feeling of the paint film.

As mentioned above, the composite pigment of the present invention is excellent in that it is possible to attain all of a high matte effect, good handling and a good tactile feeling of the paint film, which are difficult to attain with a conventional matting agent.

Further, the composite pigment of the first invention of the present application can be dispersed and formed into a paint in a labor saving manner only by adding the composite pigment to a resin or the like, and lightly mixing the resulting mixture. Because the composite pigment is easily dispersed, uneven loss of gloss (variation in the degree of a gloss at different positions on the paint film) can be reduced. In addition, the composite pigment of the present invention is composed of relatively inexpensive materials, and therefore a composite pigment, and a paint composition containing the composite pigment can be produced at low cost. Furthermore, by appropriately selecting the types of an extender pigment and an inorganic compound that form the composite pigment, a matting agent having an environmental load lower than that of a resin bead-based matting agent can be obtained.

When a titanium oxide pigment is used, the composite pigment of the second invention of the present application has sufficient titanium oxide pigment properties (whiteness, hiding power, color property and the like), and an effect of reducing a gloss and a luster which a white pigment of the titanium oxide has.

Specifically, a gloss can be reduced even to the degree of a gloss reduction referred to as "matting (specular gloss of 5% or less at 60°)" over the degree of a gloss reduction generally referred to as "70% gloss (specular gloss of 55 to 65% at 60° as measured in accordance with JIS K5600-4-7: 1999)", "50% gloss" or "30% gloss".

The values of the diameter on cumulative 90% (D90) and the median diameter D50 of the composite pigment of the second invention of the present application can be each set within an appropriate range. Specifically, the diameter on cumulative 90% (D90) is set 20 µm or less, and preferably, further the median diameter D50 is set to 1 to 10 µm. In this way, the tactile feeling of the paint film can be made smooth while a low-gloss property (matte effect) and a hiding power are exhibited. At the same time, a functionality can be imparted such that stain is hardly attached to the pant film, or the stain is easily removed.

The composite pigment of the second invention of the present application can be dispersed and formed into a paint in a labor saving manner only by adding the composite pigment to a paint resin or the like, and lightly mixing the resulting mixture. Therefore, a paint having a low-gloss property (matte effect) can be prepared without adding a matting agent separately, so that efficiency in field operation can be improved, and hence occurrence of construction failure, or the like can be reduced. Further, the composite pigment of the present invention is composed of relatively inexpensive materials, and therefore a paint composition can be produced at low cost.

The composite pigment of the third invention of the present application is a modified inorganic color pigment, and when the composite pigment is blended in a paint (paint film), the paint film exhibits a low gloss (a low luster). Specifically, a gloss can be reduced even to the degree of a gloss reduction referred to as "matting (specular gloss of 5% or less under a geometric condition of 60° as measured in accordance with JIS K5600-4-7: 1999)" over the degree of a gloss reduction generally referred to as "70% gloss", "50% gloss" or "30% gloss". In addition, the specular gloss at 85° can be set to 40% or less, and so-called 85° gloss can be sufficiently reduced.

The composite pigment of the third invention of the present application enables the paint film to have a good (smooth) tactile feeling.

In the conventional technique described above, it is difficult to secure both the matte effect and the tactile feeling of the paint film such that enhancement of the matte effect leads to deterioration of the tactile feeling of the paint film, and prioritization of the tactile feeling of the paint film leads to reduction of the matte effect. The composite pigment of the present invention is excellent in that it is possible to achieve both a high matte effect and a good tactile feeling of the paint film.

Further, the composite pigment of the third invention of the present application can eliminate the necessity of using a component for reducing gloss (extender pigment, matting agent or the like), so that a paint, particularly a matting paint, can be produced in a simple process. The composite pigment of the present invention can be dispersed and formed into a paint in a labor saving manner only by adding the composite pigment to a resin or the like, and lightly mixing the resulting mixture. In addition, the composite pigment of the present invention is composed of relatively inexpensive materials, and therefore a paint composition can be produced at low cost.

The fourth invention of the present application provides a composite pigment in which an inorganic color pigment containing a zinc element is fixed with an inorganic compound, the particle size distribution of the composite pigment can be set within an appropriate range, and when the composite pigment is blended in a paint (paint film), the paint film exhibits a low gloss (a low luster).

Preferably, the abundance ratio of the composite pigment having a particle diameter of 2 μm or more in a volume cumulative distribution measured by a laser diffraction/scattering-type particle size distribution measuring apparatus can be set to 70% or more based on the total amount of the composite pigment. In this way, the specular gloss of the paint film at 60° and the specular gloss of the paint film at 85° can be further reduced. Further, the diameter on cumulative 90% (D90) can be set to 30 μm or less, so that the tactile feeling of the paint film can be made smooth.

The composite pigment of the fourth invention of the present application can be formed into a paint only by adding the composite pigment to a resin, and lightly mixing the resulting mixture. Therefore, it is not necessary to strongly disperse pigment components as in the case of a conventional flat emulsion paint, and thus a matting paint can be produced in a labor saving manner. Further, when the composite pigment of the present invention is used, the necessity of separately adding a component for reducing gloss (extender pigment, matting agent or the like) can be eliminated, so that a matting paint can be conveniently produced. In addition, the composite pigment of the present invention is composed of relatively inexpensive materials, and therefore a matting paint can be produced at low cost.

The composite pigment of the fifth invention of the present application contains an extender pigment fixed with an inorganic compound and/or organic compound, and therefore by blending the composite pigment in a paint (paint film), a gloss of the paint film can be sufficiently reduced. The composite pigment has the same level in the degree of a gloss reduction as a conventional silica matting agent having a high matte effect.

In addition, while the composite pigment of the fifth invention of the present application is capable of exhibiting the high matte effect as described above, an increase in viscosity of a paint containing the composite pigment can be sufficiently reduced, so that a paint composition having good handling can be obtained.

In addition, the composite pigment of the fifth invention of the present application enables the paint film to have a smooth tactile feeling although the composite pigment contains an extender pigment which negatively affects the tactile feeling of the paint film.

As mentioned above, the composite pigment of the fifth invention of the present application is excellent in that it is possible to attain all of a high matte effect, good handling and a good tactile feeling of the paint film, which are difficult to attain with a conventional matting agent.

When the composite pigment of the fifth invention of the present application, which contains an inorganic color pigment, is blended in a paint (paint film), the paint film exhibits a low gloss (a low luster). In addition, as described above, the composite pigment of the present invention, in which titanium oxide is used as an inorganic color pigment, has sufficient titanium oxide pigment properties (whiteness, hiding power, color property and the like), and an effect of reducing a gloss and a luster which a white pigment of the titanium oxide has.

According to the composite pigment of the fifth invention of the present application, which contains an inorganic color pigment, a gloss can be reduced even to the degree of a gloss reduction referred to as "matting (specular gloss of 5% or less at 60°)" over the degree of a gloss reduction generally referred to as "70% gloss" (specular gloss of 55 to 65% at 60° as measured in accordance with JIS K5600-4-7: 1999), "50% gloss" or "30% gloss".

The values of the diameter on cumulative 90% (D90) and the median diameter D50 of the composite pigment of the fifth invention of the present application, which contains an inorganic color pigment, can be each set within an appropriate range. Specifically, the diameter on cumulative 90% (D90) is set 30 μm or less, and preferably, further the median diameter D50 is set to 1 to 10 μm. In this way, the tactile feeling of the paint film can be made smooth while a low-gloss property (matte effect) and a hiding power are exhibited. At the same time, a functionality can be imparted such that stain is hardly attached to the paint film and the stain is easily removed.

The abundance ratio of the composite pigment having a particle diameter of 2 μm or more in a volume cumulative distribution measured by a laser diffraction/scattering-type particle size distribution measuring apparatus can be set to 70% or more based on the total amount of the composite pigment. In this way, the specular gloss of the paint film at 60° and the specular gloss of the paint film at 85° can be further reduced.

The composite pigment of the fifth invention of the present application, which contains an inorganic color pigment, can be dispersed and formed into a paint in a labor saving manner only by adding the composite pigment to a paint resin or the like, and lightly mixing the resulting mixture. Further, a paint having a low-gloss property (matte effect) can be conveniently prepared without adding a matting agent separately, so that efficiency in field operation can be improved, and hence occurrence of construction failure, or the like can be reduced. In addition, the composite pigment of the present invention is composed of relatively inexpensive materials, and therefore a paint composition can be produced at low cost.

DESCRIPTION OF EMBODIMENTS

Figure 1:
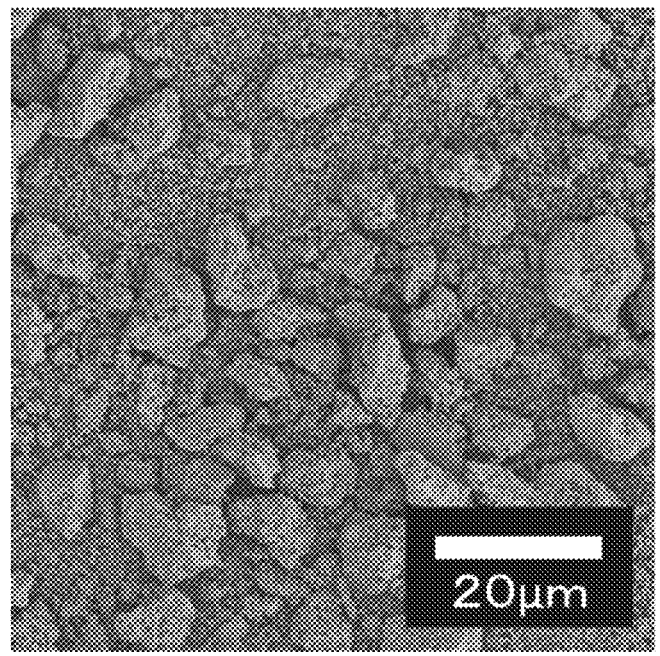
FIG. 1 is an electron microscope photograph of a composite pigment in Example 1-1 of the present invention.

Embodiments of the present invention ("the first invention of the present application" to "the fifth invention of the present application") will be described in detail below.

Embodiment of the Present Invention (the First Invention of the Present Application)

A composite pigment of the present invention is a pigment in which an extender pigment is fixed with an inorganic compound, specifically a pigment in which a plurality of extender pigment particles are aggregated in a granular shape with an inorganic compound interposed between the particles.

In the present invention, the "extender pigment" generally refers to a pigment which is added as an extender in a vehicle, and used for improvement of flowability, strength and optical properties, has a low refractive index, hiding power, and tinting strength in itself, and turns transparent or translucent when kneaded with a vehicle. Examples of the extender pigment include barium sulfate, calcium carbonate, aluminum hydroxide, barium carbonate, kaolin and talc. In particular, use of barium sulfate as an extender pigment makes it possible to impart acid resistance, alkali resistance, heat resistance, a radiation shielding property and the like to the composite pigment.

The size of the extender pigment forming the composite pigment of the present invention is preferably 0.1 to 1.0 µm, more preferably 0.15 to 0.7 µm, still more preferably 0.2 to 0.5 µm in terms of an average primary particle diameter. When the average primary particle diameter of the extender pigment is within the above-described range, the composite pigment has an appropriate size (preferred particle size distribution) at the time of fixing the extender pigment with an inorganic compound to aggregate the extender pigment.

The average primary particle diameter can be measured by electron microscopy. Specifically, extender pigment particles are photographed using a transmission electron microscope (H-7000 manufactured by Hitachi, Ltd.), image processing is performed using an automatic image processing analyzer (LUZEX AP manufactured by NIRECO CORPORATION), primary particle diameters of 2000 particles are measured, and an average thereof is defined as an average primary particle diameter.

The shape of the extender pigment may be any shape, and the extender pigment may have various shapes such as a spherical shape, a substantially spherical shape, a columnar shape, needle shape, a spindle shape, an elliptical shape, a cube, a rectangular solid and an indefinite shape.

Examples of the inorganic compound to be used for fixing the extender pigment include inorganic compounds having a fixing property or aggregating property, e.g. oxides, hydroxides and hydrous oxides of silicon, aluminum, zirconium, antimony, tin, cerium, zinc, titanium and the like. More specific examples thereof include silica, aluminum oxide, aluminum hydroxide, zirconium oxide, antimony oxide, tin oxide, cerium oxide, zinc oxide and titanium oxide, and at least one selected from inorganic compounds other than the extender pigment can be used.

The inorganic compound is preferably an inorganic silicon compound, especially preferably silica. By using an inorganic silicon compound, the specific surface area or oil absorption of the composite pigment can be set to an appropriate value, and the handling of a paint blending the composite pigment can be facilitated.

In the composite pigment of the present invention, the content ratio of the extender pigment and the inorganic compound in the composite pigment is preferably such that the content of the inorganic compound is 0.1 to 3 parts by volume based on 1 part by volume of the extender pigment. In addition, the content of the inorganic compound is more preferably 0.3 to 3 parts by volume based on 1 part by volume of the extender pigment from the viewpoint of reduction of a gloss of a paint film. Further, the content of the inorganic compound is more preferably 0.1 to 1.5 parts by volume based on 1 part by volume of the extender pigment from the viewpoint of the viscosity (handling) of a paint. In addition, the content of the inorganic compound is still more preferably 0.3 to 1.5 parts by volume based on 1 part by volume of the extender pigment from the viewpoint of both reduction of a gloss of a paint film and handling of a paint.

For fixation of the extender pigment, an organic compound having the same property (extender pigment fixing property) as that of the inorganic compound may be used. As the organic compound, an organic flocculant, an organic coagulant or the like can be used. The organic flocculant or organic coagulant is not particularly limited as long as it is capable of catching a plurality of particles by a polymer chain thereof to aggregate the particles, and a polymer compound such as a cationic polymer, an anionic polymer or a nonionic polymer can be used. The content of the organic compound can be appropriately set.

The composite pigment of the present invention is in the form of an aggregate in which an extender pigment is fixed with an inorganic compound. Here, there may be little gaps between extender pigments (densely composite state), or gaps may be appropriately formed (coarsely composite state). In addition, a plurality of aggregates in the above-described densely composite state (primary aggregates) may be gathered to form a secondary aggregate in which appropriate gaps are formed among the primary aggregates. The shape of composite pigment particles may be any shape, and the composite pigment particles may have various shapes such as a spherical shape, a substantially spherical shape, a columnar shape, needle shape, a spindle shape, an elliptical shape, a cube, a rectangular solid and an indefinite shape, but a spherical shape, a substantially spherical shape and the like are more preferable.

In the composite pigment of the present invention, the inorganic compound is required to exist at least between extender pigment particles for performing the function of the inorganic compound (function of fixing extender pigments each other), and in addition, the inorganic compound may exist in such a manner as to cover a part or all of the surfaces of composite pigment particles.

Preferably, the composite pigment of the present invention has a diameter on cumulative 50% (D50) of 1 to 15 µm in a volume cumulative distribution as measured by a laser diffraction/scattering-type particle size distribution measuring apparatus. For measurement of the volume particle size distribution of the composite pigment, for example, a laser diffraction/scattering-type particle size distribution measuring apparatus (LA-910 manufactured by HORIBA, Ltd.) can be used.

When the value of D50 is in the above-mentioned range, the matte effect in a paint film containing the composite pigment can be exhibited at a high level. Specifically, when a clear paint is prepared in a pigment volume concentration (PVC) of 20%, and formed into a paint film, and a specular gloss is measured in accordance with JIS K5600-4-7: 1999, a specular gloss of 5% or less can be obtained under a geometric condition of 60°. This means that a gloss is reduced even to the degree of a gloss reduction referred to as "matting" over the degree of a gloss reduction generally referred to as "70% gloss (specular gloss of 55 to 65% at) 60°)", "50% gloss" or "30% gloss".

Preferably, the composite pigment of the present invention has a diameter on cumulative 90% (D90) of 5 to 30 µm in a volume cumulative distribution as measured by a laser diffraction/scattering-type particle size distribution measuring apparatus. In this way, so-called "85° gloss" can also be sufficiently reduced in a paint film containing the composite pigment. Specifically, the specular gloss under a geometric condition of 85°, which is obtained by preparing a clear paint in a pigment volume concentration (PVC) of 20%, forming the paint into a paint film, and performing measurement in accordance with JIS K5600-4-7: 1999, can be reduced to 10% or less.

In addition, when the composite pigment of the present invention is blended in a paint film, the paint film has a good (smooth) tactile feeling, and the diameter on cumulative 90% (D90) is preferably 30 μm or less because a sufficiently smooth tactile feeling of the paint film can be attained. From the viewpoint of the tactile feeling of the paint film, the diameter on cumulative 90% (D90) is more preferably 20 μm or less.

As an evaluation index for the tactile feeling of the paint film, for example, a friction coefficient of the paint film can be used, and as the friction coefficient, a MIU (mean friction coefficient), an MMD (mean friction coefficient variation) and the like can be used. These friction coefficients can be measured using, for example, a friction feeling tester (KES-SE manufactured by Kato Tech Co., Ltd.).

When the composite pigment of the present invention has a diameter on cumulative 90% (D90) of 20 μm or less, the value of the MMD (mean friction coefficient variation) can be set to 0.02 or less, preferably 0.01 or less.

Preferably, the composite pigment of the present invention has an oil absorption of 80 (ml/100 g) or less as measured by the method described in JIS K 5101-13-1. In this way, an increase in viscosity of a paint containing the composite pigment of the present invention can be sufficiently reduced. From the viewpoint of reduction of the viscosity (improvement of handling) of the paint, the oil absorption is more preferably 60 (ml/100 g) or less.

The composite pigment of the present invention may further have an inorganic compound and/or organic compound for surface treatment on the outer surface thereof in addition to the above-mentioned configuration. Since the inorganic compound and/or organic compound exists on the surface of the composite pigment of the present invention (specifically, the inorganic compound and/or organic compound exists in such a manner as to cover a part or the whole of the surface of the composite pigment), and is used for so-called "surface treatment of composite pigment", the inorganic compound and/or organic compound is different in function from the above-mentioned inorganic compound and organic compound to be used for fixation (also referred to as an "inorganic compound and/or organic compound for fixation"). Thus, here, the "inorganic compound and/or organic compound for surface treatment" is appropriately distinguished from the "inorganic compound and/or organic compound for fixation".

When the expression "for fixation" or "for surface" is absent, and it is not possible to guess from the surrounding words, normally the inorganic compound and/or organic compound for fixation is suggested.

Examples of the inorganic compound for surface treatment include oxides, hydroxides and hydrous oxides of silicon, aluminum, zirconium, antimony, tin, cerium, zinc, titanium and the like. More specifically, silica, aluminum oxide, aluminum hydroxide, zirconium oxide, antimony oxide, tin oxide, cerium oxide, zinc oxide, titanium oxide and the like can be used. By treating the composite pigment with the inorganic compound, acid resistance and weatherability can be improved, or dispersibility in a dispersion medium such as a resin or the like can be improved.

Examples of the organic compound for surface treatment, which is provided on the surface of the composite pigment of the present invention, include organic silicon compounds such as silicone resins, siloxanes, silane coupling agents, carboxylic acids such as stearic acid and lauric acid, polyols and amines. By treating the matting agent with the organic compound, dispersibility in a dispersion medium such as a resin or the like can be improved.

The composite pigment of the present invention can be produced by, for example, the following method. That is, an extender pigment and an inorganic compound source are added to a solvent such as water, and dispersed by a disperser or the like to form a slurry.

The "inorganic compound source" in the present invention means a material which is precipitated as an inorganic compound by adjustment of the pH of a slurry as described later. Examples of the inorganic compound source include sodium silicate, sodium aluminate, aluminum sulfate, zirconium sulfate, stannous chloride and titanium tetrachloride. The inorganic compound source is preferably sodium silicate. As the sodium silicate, sodium silicates No. 1, No. 2 and No. 3 as specified in JIS 1408-1966 can be all used, but use of sodium silicate No. 3 is preferable from the viewpoint of availability and handling.

Here, in preparation of the slurry, it is preferable that the volume ratio (Va/Vb) of the volume (Va) of the inorganic compound source to the volume (Vb) of the extender pigment is set to 0.1 to 3. Here, the volume (Va) of the inorganic compound source means a volume calculated in terms of the volume of an inorganic compound precipitated as a result of adjustment of the pH as described later. When the volume ratio is in the above-mentioned range, a sufficient fixation effect by the inorganic compound can be obtained, so that the composite pigment has an appropriate size (preferred particle size distribution).

Subsequently, the pH of the slurry is adjusted to precipitate an inorganic compound derived from the inorganic compound source, and extender pigment is fixed with the inorganic compound.

When sodium silicate is used as the inorganic compound source, it is preferable that the pH is adjusted to 2 to 10 by adding dilute sulfuric acid while the slurry is heated to be held at about 50 to 100° C. In this way, it is possible to obtain a composite pigment having an appropriate size (preferred particle size distribution) while reducing formation of free silica. In adjustment of the pH by addition of dilute sulfuric acid as described above, it is more preferable to adjust the pH within a range of 6 to 9, and it is still more preferable to adjust the pH within a range of 7 to 8.

When aluminum sulfate is used as the inorganic compound source, it is preferable that the pH is adjusted to 4 to 13 by adding caustic soda (sodium hydroxide) while the slurry is heated to be held at about 50 to 100° C.

Subsequently to the above-described step, the resulting pigment can be dehydrated and washed, dried, and appropriately ground by known methods as necessary. Further, the pigment dried as described above may be calcined at a higher temperature as necessary. The calcination temperature can be appropriately set, and for example, a temperature of about 300 to 900° C. is preferable.

A method including fixing the extender pigment with an inorganic compound has been described above, but it is also possible to fix the extender pigment with an organic compound. Specifically, the extender pigment and an organic compound (organic flocculant, organic coagulant or the like including a polymer compound such as a cationic polymer, an anionic polymer or a nonionic polymer) are added to a solvent such as water, and dispersed by a disperser or the like to form a slurry, and the extender pigment is fixed. In this way, it is possible to produce a composite pigment in which an extender pigment is fixed with an organic compound.

The composite pigments of the present invention, which have been produced by the various methods described above, may be subjected to classification for the purpose of removing coarse particles. The classification can be performed by grinding or sieving. The method for classification by grinding is not particularly limited, and examples thereof may include use of an atomizer. Examples of the method for classification by sieving may include wet classification and dry classification.

When the composite pigment of the present invention is further subjected to surface treatment with an inorganic compound and/or organic compound for surface treatment, the surface treatment can be performed using a known method such as a wet process or a dry process. Here, it is preferable that a method involving application of a high torque is avoided so that the prepared composite pigment is not broken. For example, in the wet process, water or an organic solvent is added to the composite pigment of the present invention and the inorganic compound and/or organic compound, and the resulting mixture is mixed, whereby the matting agent according to the present invention can be subjected to surface treatment with the inorganic compound and/or organic compound.

The composite pigment of the present invention can be used for various applications. For example, the composite pigment is appropriately used as a matting agent to be blended in a paint composition for coating of building wall surfaces (exteriors, interiors, ceilings, floors, and wall surfaces, floors and the like of baths, kitchens, lavatories and the like), coating of building materials, coating of vehicles, coating of furniture, coating of electric and mechanical products and the like. In addition, the composite pigment of the present invention can be blended as a matting agent in plastic, rubber, latex, elastomer and the like. When the composite pigment of the present invention is used as a matting agent, the composite pigment can be used as such, or mixed with a conventional matting agent, a color material, an additive and the like, and used. Further, the composite pigment of the present invention can be blended in various paint compositions, plastic, rubber, latex, elastomer, ceramic, glass, metal or the like as an extender, an additive, a filler, an extender pigment, a flowability imparting agent, a strength auxiliary agent, an optical property improver or the like.

A paint composition of the present invention contains the composite pigment and a resin, and contains a color material, a dispersant, an additive, a solvent and the like as necessary.

Examples of the resin contained in the paint composition of the present invention include various paint resins such as phenol resins, alkyd resins, acrylic alkyd resins, acrylic resins, acrylic emulsion resins, polyester resins, polyester urethane resins, polyether resins, polyolefin resins, polyurethane resins, acrylic urethane resins, epoxy resins, modified epoxy resins, silicone resins, acrylic silicone resins and fluororesins.

As the color material, a pigment, a dye or the like can be used. As the pigment contained in the paint composition of the present invention, various inorganic pigments (titanium dioxide, zinc oxide, basic lead carbonate, lower titanium oxide, titanium oxynitride (titanium black), carbon black, bone black (bone charcoal), graphite, iron black, cobalt chromate black spinel, iron chromate composite oxide, copper chromate spinel black composite oxide, Fe—Mn—Bi black, red iron oxide, molybdenum red, nickel antimony titanium yellow, chrome antimony titanium buff, synthetic iron oxide yellow, chrome yellow, ultramarine blue, iron blue, cobalt blue, cobalt green, chrome green, chromium oxide green, cobalt chromate green spinel, cobalt titanate green spinel and the like); and various organic pigments (lake red 4R, ITR red, naphthol red, pyrazolone orange, pyrazolone red, benzimidazolon orange, watching red, lake red R, Bordeaux 10B, Bon maroon light, anthraquinone red, dianthraquinone red, anthanthrone red, anthanthrone orange, perylene red, perylene maroon, perylene violet, perinone orange, quinacridone red, quinacridone violet, quinacridone magenta, dimethyl magenta, dichloroquinacridone magenta, dichloro-magenta, quinacridone maroon, quinacridone scarlet, diketo-pyrrolo-pyrrole, fast yellow, benzimidazolon yellow, diarylide yellow, isoindolin yellow, quinophthalone yellow, phthalocyanine green, chlorinated phthalocyanine green, brominated phthalocyanine green, phthalocyanine blue, threne blue, dioxazine violet and the like) can be used. As the dye, basic dyes (rhodamine, Bismarck green, malachite green, methyl violet and the like); direct dyes (congo red, direct scarlet and the like); acidic dyes (metanil yellow, nigrosin, acid fast red and the like); metal-containing complex salt dyes; oil-soluble dyes; and the like can be used. At least one selected from these color materials can be used.

In addition, when a color material is not blended in the paint composition, a transparent (translucent) matting paint can be obtained. The transparent (translucent) matting paint can be used as a top coat which is applied onto a base layer (layer formed by applying a color gloss paint, a pearl paint or the like to a base material) in vehicle applications or the like.

Examples of the additive contained in the paint composition of the present invention include an emulsifier, an antifreezing agent, a pH adjuster, a thickener and a defoaming agent generally used. Examples of the solvent include water, toluene, xylene, mineral spirit, acetone, methyl ethyl ketone, methanol, butanol, ethyl acetate, amine acetate and ethylene glycol. The dispersant is appropriately selected according to the type of an inorganic compound used in synthesis of the composite pigment. For example, when silica is used as the inorganic compound, the surface of the composite pigment is slightly acidic because silica exists on the surface of the composite pigment. Here, it is preferable that as the dispersant, a dispersant having an amine value is used. Specific examples thereof include "DISPERBYK (registered trademark)-183", "DISPERBYK (registered trademark)-184" and "DISPERBYK (registered trademark)-185" manufactured by BYK Additives & Instruments.

The paint composition of the present invention can be prepared by stirring the composite pigment and the resin, and as necessary, the color material, dispersant, additive, solvent, and the like by a dispersing machine, and as necessary, defoaming the resulting mixture.

When the paint composition of the present invention is formed into a color matting paint by, for example, addition of the composite pigment of the present invention to a gloss paint, the amount of the composite pigment added is preferably 0.1 to 10% by mass, more preferably 1 to 5% by mass.

When the paint composition is formed into a transparent (translucent) topcoat matting paint by setting the content of the color material to a very small amount, or avoiding inclusion of a color material, the pigment volume concentration (PVC) of the composite pigment is preferably in a range of 5 to 40%, more preferably in a range of 10 to 30%, still more preferably in a range of 15 to 25%. When the pigment volume concentration (PVC) is in the above-mentioned range, a topcoat matting paint can be obtained which makes it possible to sufficiently reduce a gloss while maintaining color of a base layer.

A paint film of the present invention is the paint composition applied to a target, and cured. That is, the paint composition is applied to a target using a brush/wool roller or the like, and dried, whereby the paint film of the present invention can be obtained. Examples of the target include building materials (concrete, mortar, gypsum, plaster, plastic, glass, earthenware, stone, wood and the like), vehicle main bodies (made of metal or plastic), furniture and electric and mechanical products (made of plastic, glass, earthenware, stone, wood or the like). The target may be coated in advance with a paint composition (gloss paint, pearl paint or the like) which is different from the paint composition of the present invention.

Embodiment of the Present Invention (the Second Invention of the Present Application)

A composite pigment of the present invention is a composite pigment in which at least a titanium oxide pigment and an extender pigment are fixed with an inorganic compound and/or organic compound.

The composite pigment of the present invention is in the form in which at least a titanium oxide pigment and an extender pigment are fixed with an inorganic compound and/or organic compound. Although the composite pigment may have various forms, the forms typically include a form in which at least a plurality of titanium oxide pigment particles and a plurality of extender pigment particles are fixed with an inorganic compound and/or organic compound. At this time, it is preferable that constituent particles of the same kind (titanium oxide pigment particles each other or extender pigment particles each other) do not exist in a state of huddling in specific positions, but a state in which the extender pigment particles exist between the titanium oxide pigment particles is preferable. The extender pigment particles perform the function of a spacer so that the low-gloss property (matte effect) and the hiding power can be improved. Of course, the extender pigment particles are not always required to exist between all the titanium oxide pigment particles, and regions where the constituent particles of the same kind exist in a huddling state may be formed in a part of regions of the composite pigment, but when the composite pigment is macroscopically viewed, it is preferably to have a form in which the plurality of the titanium oxide pigment particles and the extender pigment particles exist in an evenly dispersed state.

Then from the viewpoint that the plurality of the titanium oxide pigment particles and the extender pigment particles are disposed in a dispersion state in the composite pigment, it is preferable that the shape of the titanium oxide pigment particles and/or extender pigment particles is spherical or substantially spherical.

Here, as described above, to facilitate having the state that the plurality of the titanium oxide pigment particles and the extender pigment particles exist in an evenly dispersed state, it is preferable that the average primary particle diameter of the extender pigment particles is nearly equal to or smaller than the average primary particle diameter of the titanium oxide particles. Specifically, when the average particle diameter of the titanium oxide particles is taken as 1, the average primary particle diameter of the extender pigment particles is preferably 0.1 to 1.5 and more preferably 0.5 to 1. This is because thus using the extender pigment particles nearly equal to or smaller than the titanium oxide pigment particles makes it easy for the extender pigment particles to function as a spacer between the titanium oxide pigment particles.

The average primary particle diameter can be measured by the same method as electron microscopy used for the measurement of the average primary particle diameter, already described in the above-mentioned [Embodiment of the present invention (the first invention of the present application)].

Then the titanium oxide pigment particles and the extender pigment particles may be in a state of having almost no gaps (densely composite state) therebetween due to an inorganic compound and/or organic compound, or may be in a state of having gaps (coarsely composite state) appropriately formed therebetween. In addition, a plurality of aggregates in the above-described densely composite state (primary aggregates) may be gathered to form a secondary aggregate in which appropriate gaps are formed among the primary aggregates. The shape of the composite pigment particles may be any shape and may have various shapes such as a spherical shape, a substantially spherical shape, a columnar shape, a needle shape, a spindle shape, an elliptical shape, a cube, a rectangular solid and an indefinite shape, but a spherical shape, a substantially spherical shape or the like is more preferable.

In the composite pigment of the present invention, the inorganic compound and/or organic compound fixes the constituent particles (the titanium oxide pigment particles, the extender pigment particles and the like) of the composite pigment. Therefore, the inorganic compound and/or organic compound, though being required to exist at least between the constituent particles, may exist so as further to cover a part or the whole of the surfaces of the composite pigment (specifically, the surfaces of the composite pigment particles). In this case, paying attention to functions of the both, the former (the inorganic compound and/or organic compound to be used for fixing the constituent particles of the composite pigment) and the latter (the inorganic compound and/or organic compound existing so as to cover a part or the whole of the surfaces of the composite pigment, that is, to be used for so-called "surface treatment of the composite pigment") are appropriately distinguished from each other by referring the former as an "inorganic compound and/or organic compound for fixation" and the latter as an "inorganic compound and/or organic compound for surface treatment".

Here, when the expression "for fixation" or "for surface treatment" is absent, and it is not possible to guess which one from the context, "for fixation" is usually meant.

In the composite pigment particles of the present invention, the diameter on cumulative 90% (D90) (diameter on cumulative 90% in the volume cumulative distribution) measured by a laser diffraction/scattering-type particle size distribution measuring apparatus is preferably 20 μm or less and more preferably 10 μm or less.

The diameter on cumulative 90% (D90) of the composite pigment particles can be measured by using a laser diffraction/scattering-type particle size distribution measuring apparatus. As such an apparatus, there can be used, for example, a laser diffraction/scattering-type particle size distribution measuring apparatus "LA-910" (manufactured by HORIBA, Ltd.).

Usual flat emulsion paints develop the matte effect, whereas the surface of their paint films is coarse. As a result, the tactile feeling of the paint film becomes rough and stain is liable to be attached on the paint films and the stain can hardly be removed in many cases. By contrast, when there is used the composite pigment of the present invention having a diameter on cumulative 90% (D90) of 20 μm or less, since the paint film surface becomes smooth, such a unique design can be developed that while the low-gloss property (matte effect) is developed, the tactile feeling of the paint films is smooth. At the same time, a functionality can be imparted such that stain is hardly attached to the paint films and the stain is easily removed.

In the composite pigment particles of the present invention, the median diameter D50 (diameter on cumulative 50% in the volume cumulative distribution) measured by the laser diffraction/scattering-type size distribution measuring apparatus is preferably 1 to 10 μm and more preferably 1 to 3 By forming the composite pigment of the present invention into a paint and using it, the surface of the paint film can further be made smooth. As a result, while the low-gloss property (matte effect) is developed, the smoothness of tactile feeling of the paint film and the difficulty in attachment of stain on the paint film (ease in removal of the stain) are more improved.

The median diameter D50 of the composite pigments can be measured, as in the above-mentioned D90, by using the laser diffraction/scattering-type particle size distribution measuring apparatus "LA-910" (manufactured by HORIBA, Ltd.), or the like.

For the titanium oxide pigment particles forming the composite pigment of the present invention, the average primary particle diameter is preferably 0.1 to 1.0 more preferably 0.1 to 0.5 μm and still more preferably 0.1 to 0.3 By making the average primary particle diameter of the titanium oxide pigment particles in the above range, when the titanium oxide pigment and the extender pigment are combined, the composite pigment can be made to have an appropriate size. This is preferable because, as a result, the low-gloss property (matte effect) and the hiding power can be improved and the tactile feeling of the paint film can be made smoother The shape of the titanium oxide pigment particles may be any shape and may have various shapes such as a spherical shape, a substantially spherical shape, a columnar shape, a needle shape, a spindle shape, an elliptical shape, a cube, a rectangular solid and an indefinite shape.

As the crystal form of the titanium oxide pigment, any form of anatase type, rutile type and brookite type can be used, but use of the rutile type or the anatase type is preferable. When the composite pigment is blended in a paint resin or the like, from the viewpoint of reducing the deterioration of the paint resin due to the photocatalytic activity, use of the rutile type is preferable. Here, as titanium oxide particles, there can be used ones produced by either method of so-called sulfate process or chloride process.

The extender pigment constituting the composite pigment of the present invention includes calcium carbonate (light calcium carbonate, heavy calcium carbonate, precipitated (synthetic) calcium carbonate, and the like), barium sulfate (precipitated (synthetic) barium sulfate, and the like), barite powder, talc, kaolin, clay, aluminum hydroxide and white carbon. As the extender pigment, calcium carbonate and barium sulfate are preferable.

As described later, in the composite pigment of the present invention, the extender pigment particles enter between the titanium oxide pigment particles and function as a spacer to provide appropriate gaps between the particles. To realize such a function, the volume of the extender pigment is important. In this point, calcium carbonate has a relatively low specific gravity and can secure a sufficient volume even in a small use amount thereof. Therefore, from the viewpoint of the cost, it is more preferable to use calcium carbonate as the extender pigment. Among calcium carbonate, precipitated (synthesized) calcium carbonate is especially preferable. This is because the precipitated (synthesized) calcium carbonate is easy in designing its particle size in a desired one and a precipitated (synthesized) calcium carbonate having the desired particle size is easily available.

In the extender pigment forming the composite pigment of the present invention, its average primary particle diameter is preferably 0.1 to 1.0 μm, more preferably 0.1 to 0.5 μm and still more preferably 0.1 to 0.35 μm. Making the average primary particle diameter of the extender pigment in the above range is preferable because of, when the titanium oxide pigment and the extender pigment are combined, enabling the composite pigment particles to be formed into an appropriate size, and enabling the low-gloss property (matte effect) and the hiding power to be improved and the tactile feeling of the paint film to become smoother.

The shape of the extender pigment particle may be any shape and may have various shapes such as a spherical shape, a substantially spherical shape, a columnar shape, a needle shape, a spindle shape, an elliptical shape, a cube, a rectangular solid and an indefinite shape.

In the composite pigment of the present invention, the content ratio of the extender pigment to the titanium oxide pigment can be appropriately set, but when the mass of the titanium oxide is taken as 1 in mass ratio, the mass of the extender pigment is preferably 0.01 to 100, more preferably 0.1 to 10 and still more preferably 0.2 to 1.

To firmly fix the titanium oxide pigment and the extender pigment, an inorganic compound and/or organic compound is used. Examples of the inorganic compound include oxides, hydroxides and hydrated oxides of silicon, aluminum, zirconium, antimony, tin, cerium, zinc. More specifically, there can be used silica, aluminum oxide, aluminum hydroxide, zirconium oxide, antimony oxide, cerium oxide, zinc oxide and the like.

As the inorganic compound, from the viewpoint of reducing the increase of the specific surface area of the composite pigment and the increase of the oil absorption along therewith, it is preferable to use silica. The increase in the viscosity of a paint when the paint is formed can be reduced thereby.

In the composite pigment of the present invention, when the inorganic compound is used for the fixation (that is, when the inorganic compound for fixation is used), the content ratio by mass of the inorganic compound to the pigment components (titanium oxide, the extender pigment and the like) is, when the mass of the pigment components is taken as 1, preferably 0.01 to 100, more preferably 0.05 to 10 and still more preferably 0.1 to 0.5.

As the organic compound for fixation constituting the composite pigment of the present invention, organic flocculants, organic coagulants and the like can be used. The organic flocculants and the organic coagulants are not especially limited as long as being capable of catching and aggregating a plurality of particles by their polymer chains, and polymer compounds such as cationic polymers, anionic polymers and nonionic polymers can be used. The content ratio to the organic compound can be appropriately set, but is, when the mass of the pigment components is taken as 1 in mass ratio, preferably 0.001 to 1, more preferably 0.001 to 0.1 and still more preferably 0.01 to 0.05.

The composite pigment of the present invention may have an inorganic compound and/or organic compound for surface treatment on its surface. As described above, these inorganic compound and/or organic compound, since existing so as to cover a part or the whole of the surface of the composite pigment of the present invention, that is, being used for so-called "surface treatment of the composite pigment", have a function different from the "inorganic compound and/or organic compound for fixation". Hence, here, the "inorganic compound and/or organic compound for surface treatment" and the "inorganic compound and/or organic compound for fixation" are distinguished from each other.

Examples of such an inorganic compound for surface treatment include those exemplified as inorganic compounds for surface treatment in the above-mentioned [Embodiment of the present invention (the first invention of the present application)], as they are.

Further the organic compound for surface treatment made to exist on the surface of the composite pigment of the present invention includes those exemplified as organic compounds for surface treatment in the above-mentioned [Embodiment of the present invention (the first invention of the present application)], as they are, and by treating the composite pigment with these organic compounds for surface treatment, the dispersibility to a disperse medium such as a resin can be improved.

The composite pigment of the present invention may be blended appropriately, in addition to the titanium oxide pigment and the extender pigment, as required, with various functional pigments such as color pigments, organic pigments, organic dyes and heat shield pigments.

The composite pigment of the present invention can be produced by various well-known methods, and can also be granulated by a granulating machine, but a fine composite pigment can hardly be produced. Then, a method in which a slurry containing, at least, the titanium oxide pigment, the extender pigment and the inorganic compound and/or organic compound is prepared and under stirring, at least, the titanium oxide pigment and the extender pigment are fixed with the inorganic compound and/or organic compound, is a preferred method because of being capable of easily producing a fine composite pigment having a median diameter D50 and a diameter on cumulative 90% (D90) in the above ranges.

Specifically, the titanium oxide pigment and the extender pigment (calcium carbonate, barium sulfate and the like) and the like and the inorganic compound and/or organic compound are added to a solvent such as water, and dispersed by a disperser to make a slurry. As the inorganic compound, sodium silicate is preferable, and any of No. 1, No. 2 and No. 3 specified in JIS 1408-1966 can be used, but from the point of easy availability and handling, it is preferable to use No. 3. While the slurry is heated and held at about 50 to 100° C., a dilute sulfuric acid is added to adjust pH. At this time, the pH value to be adjusted at depends on the extender pigment to be used. For example, when calcium carbonate is used as the extender pigment, pH is adjusted at about 7.0 to 10.0. When barium sulfate is used as the extender pigment, pH is adjusted at about 3.0 to 10.0. As a result, there can be obtained in a solution the composite pigment in which pluralities of the titanium oxide pigment particles and extender pigment particles are fixed with the inorganic compound and/or organic compound. To obtain the composite pigment having a more appropriate size, it is preferable that pH is adjusted in the range of 7.0 to 7.5. Thereafter, as required, the pigment is dehydrated and washed, dried and appropriately ground to be able to produce the composite pigment of the present invention. Further as required, the dried pigment in the above may be calcined at a higher temperature. The calcination temperature can be appropriately set, and for example, about 300 to 900° C. is preferable.

The composite pigment of the present invention produced by various well-known methods may be classified for the purpose of removing coarse particles. The classification can be performed by grinding or sieving. The classification method by grinding or sieving can be performed by the same method as the classification method already described in the above-mentioned [Embodiment of the present invention (the first invention of the present application)]

When the composite pigment of the present invention is subjected to a surface treatment with the inorganic compound and/or organic compound for surface treatment, the surface treatment can be performed by a well-known method such as a wet process or a dry process, and a preferred embodiment at this time is as described in [Embodiment of the present invention (the first invention of the present application)].

The composite pigment of the present invention can be used as a white pigment (matting pigment) having the low-gloss property (matte effect) in various applications. The composite pigment is appropriately used, for example, as a pigment for coating of building wall surfaces (exteriors, interiors, ceilings, floors, and wall surfaces, floors and the like of baths, kitchens, lavatories and the like), a pigment for coating of building materials, a pigment for coating of vehicles, a pigment for coating of furniture and a pigment for coating of electric and mechanical products. Further such a matting pigment can also be used by being blended in various paints in place of so-called matting materials.

The paint composition of the present invention contains the above-mentioned composite pigment, and contains, in addition to the composite pigment, as required, a resin, a dispersant, an additive, a solvent and the like. Examples of the resin include the resins, as they are, exemplified as resins contained as the paint composition in the above-mentioned [Embodiment of the present invention (the first invention of the present application)]. The additive includes various ones usually used, such as an emulsifier, an antifreezing agent, a pH adjuster, a thickener and a defoaming agent. The solvent includes water, toluene, xylene, mineral spirit, acetone, methyl ethyl ketone, methanol, butanol, ethyl acetate, amine acetate and ethylene glycol. The dispersant is selected according to the type of the inorganic compound and/or organic compound to be used in fabrication of the composite pigment. For example, when silica is used for the above-mentioned composite pigment, the surface condition of the composite pigment is slightly acidic because silica exists on the surface thereof. In this case, it is more preferable that as the dispersant, a dispersant having an amine value is used.

The paint composition of the present invention can be prepared by stirring the composite pigment, and as necessary, the above-mentioned resin, dispersant, additive and solvent, and the like by a dispersing machine, and as necessary, defoaming the resulting mixture.

In the paint composition of the present invention, it is preferable that the pigment volume concentration (PVC) is adjusted in the range of 30% to 60%. When attaching importance to reducing the gloss of a paint film, it is more preferable that the pigment volume concentration is made to be on the lower limit side of the above range, specifically, 30 to 40%. Then when attaching importance to enhancing the hiding power of a paint film, it is more preferable that the pigment volume concentration is made to be on the upper limit side of the above range, specifically, 50 to 60%.

The paint film of the present invention is a paint film made by applying and curing the above-mentioned paint composition on a substrate. That is, the paint film of the paint according to the present invention can be obtained by applying the above-mentioned paint composition on a substrate by using a brush, a wool roller or the like, and drying the resultant. The substrate includes building materials (concrete, mortar, gypsum, plaster, plastic, glass, earthenware, stone, wood and the like), vehicle main bodies (made of metal or plastic), furniture and electric and mechanical products (made of plastic, glass, earthenware, stone, wood or the like).

Embodiment of the Present Invention (the Third Invention of the Present Application)

The composite pigment of the present invention is one in which an inorganic color pigment is fixed by an inorganic compound, and a plurality of particles of the inorganic color pigment are aggregated into a granule by means of an inorganic compound.

In the present invention, "inorganic color pigment" refers to a pigment which contains an inorganic compound as a main component and exhibits an achromatic color such as white or black, or a chromatic color such as red, yellow, or blue. Examples of a white inorganic color pigment include titanium dioxide, zinc oxide, and basic lead carbonate. Examples of a black inorganic color pigment include a lower titanium oxide, titanium oxynitride (titanium black), carbon black, bone black (bone charcoal), graphite, iron black, cobalt chromate black spinel, iron chromate composite oxide, copper chromate spinel black composite oxide, and Fe—Mn—Bi black. Examples of a red inorganic color pigment include red iron oxide, and molybdenum red. Examples of a yellow inorganic color pigment include nickel antimony titanium yellow, chrome antimony titanium buff, synthetic iron oxide yellow, and chrome yellow. Examples of a blue inorganic color pigment include ultramarine blue, iron blue, and cobalt blue. Examples of a green inorganic color pigment include cobalt green, chrome green, chromium oxide green, cobalt chromate green spinel, and cobalt titanate green spinel. At least one kind selected from these inorganic color pigments may be used.

When titanium dioxide is used as the inorganic color pigment, with respect to the crystal form of a titanium dioxide pigment, any of anatase-type, rutile type, and brookite type may be used, but it is preferable to use a rutile type, or an anatase-type. When a composite pigment is added to a paint resin or the like, it is more preferable to use a rutile type from the viewpoint of reducing deterioration of the paint resin due to photocatalytic activities. In this regard, as titanium dioxide particles, those produced by either of so-called sulfate process or chloride process may be used.

The size of inorganic color pigments constituting the composite pigment of the present invention is preferably 0.1 to 1.0 μm in terms of an average primary particle diameter, more preferably 0.15 to 0.7 and further preferably 0.2 to 0.5. In a case where the average primary particle diameter of the inorganic color pigment is within the above range, when the inorganic color pigments are fixed by an inorganic compound and/or organic compound to form a composite, the composite pigment can have an appropriate size (preferable particle size distribution).

The average primary particle diameter can be measured by the same method based on the electron microscopic method used for measuring the average primary particle diameter as described in the above [Embodiment of the present invention (the first invention of the present application)].

There is no particular restriction on the shape of the inorganic color pigment, and it may be any of a spherical shape, a substantially spherical shape, a columnar shape, a needle shape, a spindle shape, an elliptical shape, a cubic shape, a rectangular solid shape, and an indefinite shape.

Examples of an inorganic compound used for firmly fixing the inorganic color pigment include oxides, hydroxides, and hydrous oxides of silicon, aluminum, zirconium, antimony, tin, cerium, zinc, titanium, and the like. More specific examples thereof include silica, aluminum oxide, aluminum hydroxide, zirconium oxide, antimony oxide, tin oxide, cerium oxide, zinc oxide, and titanium oxide; and at least one selected from the inorganic compounds may be used.

As the inorganic compound, an inorganic silicon compound is preferable, and silica is particularly preferable. By using an inorganic silicon compound, the specific surface area and the oil absorption amount of a composite pigment can have appropriate values, and a paint containing the same can be easily handled.

In the case of the composite pigment of the present invention, when an inorganic compound is used for fixing inorganic color pigments, the content ratio of the inorganic color pigment to the inorganic compound is preferably as the following ratio. That is, putting the volume of the pigment component as 1, the volume of the inorganic compound is preferably 0.3 to 2, more preferably 0.4 to 1.5, and further preferably 0.5 to 1.

For fixing the inorganic color pigments, an organic compound having the same effect as the inorganic compound may be used. As the organic compound, an organic flocculant, an organic coagulant, or the like may be used. There is no particular restriction on the organic flocculant, and the organic coagulant, insofar as they are capable of catching and aggregating a plurality of particles with their polymer chains, and a polymer compound such as a cationic polymer, an anionic polymer, and a nonionic polymer may be used. The content of the organic compound can be set appropriately.

The composite pigment of the present invention takes the form of an aggregate in which the inorganic color pigment particles are fixed by an inorganic compound and/or organic compound. At this time, there may be almost no gaps among the inorganic color pigment particles (densely composite state), or may be appropriate gaps (coarsely composite state). In addition, a plurality of aggregates in the above-described densely composite state (primary aggregates) may be gathered to form a secondary aggregate in which appropriate gaps are formed among the primary aggregates. The composite pigment may have any shape, such as a spherical shape, a substantially spherical shape, a columnar shape, a needle shape, a spindle shape, an elliptical shape, a cubic shape, a rectangular solid shape, and an indefinite shape, however the spherical shape, the substantially spherical shape, or the like is more preferable.

In the composite pigment of the present invention, an inorganic compound and/or organic compound is required to be present at least among the inorganic color pigment particles in order to exert its function (the function of fixing the inorganic color pigment particles each other), and further the inorganic compound and/or organic compound may be so present as to cover part or all of the surfaces of the composite pigment. In this case, paying attention to both the functions, the former (an inorganic compound and/or organic compound used for fixing the inorganic color pigment particles each other) is referred to as an "inorganic compound and/or organic compound for fixation", and the latter (an inorganic compound and/or an organic compound present so as to cover part or all of the surfaces of the composite pigment, and used for so-called "surface treatment of composite pigment") is referred to as an "inorganic compound and/or organic compound for surface treatment", and the two are appropriately distinguished from each other thereby. In this regard, when there is no notation such as "for fixation" or "for surface treatment", and it cannot be judged from the context, it is normally regarded as "for fixation".

The composite pigment of the present invention has a specific particle size distribution. That is, in the volume cumulative distribution measured by a laser diffraction/scattering-type particle size distribution measuring apparatus, the abundance ratio of the composite pigment particles having a particle diameter of 1 μm or more is 50% or more of the total, and the diameter on cumulative 90% (D90) is 30 μm or less.

For measurement of the volume particle size distribution of the composite pigment, for example, a laser diffraction/scattering-type particle size distribution measuring apparatus "LA-910" (manufactured by HORIBA, Ltd.) may be used.

When the abundance ratio of the composite pigment particles having a particle diameter of 1 μm or more is 50% or more of the total in the volume cumulative distribution, and the pigment is added in a paint (paint film), the paint film can be made to have a low gloss (a low luster). Specifically, in a case where a paint is prepared at a pigment volume concentration (PVC) of 40%, and this is coated to form a paint film, which specular gloss is measured according to JIS K 5600-4-7: 1999, the specular gloss under a geometric condition of 60° can be reduced to 5% or less. This means that the gloss is reduced even to the degree of a gloss reduction referred to as "matting" over the degree of a gloss reduction generally referred to as "70% gloss (specular gloss of 55 to 65% at 60°)", "50% gloss" or "30% gloss". Also, the specular gloss under a geometric condition of 85° can be reduced to 40% or less, and so-called 85° gloss can be sufficiently reduced.

With respect to the composite pigment of the present invention, when the abundance ratio of the composite pigment having a particle diameter of 2 μm or more is 30% or more of the total in the volume cumulative distribution measured by a laser diffraction/scattering-type particle size distribution measuring apparatus, a paint film with a lower gloss (a lower luster) can be favorably realized. By doing so, the specular gloss measured under a geometric condition of 85° according to JIS K 5600-4-7: 1999 (so-called 85° gloss) can be reduced to 30% or less. Further, when the abundance ratio of the composite pigment having a particle diameter of 5 μm or more in the volume cumulative distribution is 20% or more of the total, the specular gloss under a geometric condition of 85° may be reduced to 10% or less, which is more favorable.

Since the composite pigment of the present invention has a diameter on cumulative 90% (D90) of 30 μm or less in the volume cumulative distribution, it can exhibit the smooth tactile feeling of the paint film. From the viewpoint of the tactile feeling of a paint film, the diameter on cumulative 90% (D90) is preferably 20 μm or less, and more preferably 15 or less.

As the evaluation index of the tactile feeling of a paint film, for example, the friction coefficient of the paint film may be used, and the MIU (mean friction coefficient), MMD (mean friction coefficient variation), or the like may be used as the friction coefficient. These friction coefficients can be measured using, for example, a friction tester (KES-SE manufactured by Kato Tech Co., Ltd.).

When the diameter on cumulative 90% (D90) of the composite pigment of the present invention is made 15 μm or less, the value of MMD (mean friction coefficient variation) can be made 0.02 or less, and in a favorable case 0.01 or less.

The composite pigment of the present invention may further contain in its outer surface an inorganic compound and/or organic compound for surface treatment in addition to the above composition. As described above, this inorganic compound and/or organic compound are present so as to cover part or all of the surfaces of the composite pigment of the present invention, and used for so-called "surface treatment of composite pigment", therefore its function is different from that of "inorganic compound and/or organic compound for fixation". Consequently, here, the "inorganic compound and/or organic compound for surface treatment" and the "inorganic compound and/or organic compound for fixation" are distinguished from each other.

Examples of such an inorganic compound for surface treatment include oxides, hydroxides, and hydrous oxides of silicon, aluminum, zirconium, antimony, tin, cerium, zinc, and titanium. More specifically, silica, aluminum oxide, aluminum hydroxide, zirconium oxide, antimony oxide, tin oxide, cerium oxide, zinc oxide, titanium oxide, and the like can be used. By treating the composite pigment with any of these inorganic compounds, it is possible to improve the acid resistance and the weatherability, or the dispersibility in a dispersion medium such as a resin or the like.

As an organic compound to be present on the surface of the composite pigment of the present invention, the examples of the organic compound for surface treatment listed in the above [Embodiment of the present invention (the first invention of the present application)] may be applicable as they are, and by treating the composite pigment with any of the organic compounds, dispersion of a resin or the like in a dispersion medium can be improved.

The composite pigment of the present invention can be produced, for example, by the following method. That is, an inorganic color pigment and an inorganic compound source are added to a solvent such as water and dispersed by a disperser or the like to form a slurry.

The "inorganic compound source" means herein a material, which precipitates an inorganic compound able to fix the inorganic color pigment, by adjusting the pH of a slurry as described later. Examples of such an inorganic compound source include sodium silicate, sodium aluminate, aluminum sulfate, zirconium sulfate, stannous chloride, and titanium tetrachloride. Sodium silicate is preferable as the inorganic compound source. As sodium silicate, any of No. 1, No. 2 and No. 3 defined in JIS 1408-1966 can be used, but use of No. 3 is preferable from the viewpoint of availability and handling.

In preparing the slurry, the volume ratio (Va/Vb) of the volume (Va) of the inorganic compound source to the volume (Vb) of the inorganic color pigment is set preferably 0.3 to 2. The volume (Va) of the inorganic compound source means the volume in terms of an inorganic compound to be precipitated by the pH adjustment described later. When the amount of the inorganic compound source in the slurry is too small, a sufficient fixation effect cannot be obtained, and a composite pigment having a desired particle diameter (particle size distribution) cannot be obtained.

The solid content concentration of the slurry containing the inorganic color pigment and the inorganic compound source is 75 to 450 g/L, and preferably 100 to 400 g/L. By adjustment to such a solid content concentration, it becomes easy to obtain a composite pigment having a desired particle size distribution described above.

Subsequently, by adjusting the pH of the slurry, the inorganic color pigment is fixed by precipitation of an inorganic compound derived from the inorganic compound source.

When sodium silicate is used as the inorganic compound source, it is preferable to heat the slurry and to add dilute sulfuric acid to adjust the pH between 2 and 10, while keeping the temperature in a range of about 50 to 100° C. By doing so, it is possible to obtain in a solution a composite pigment in which a plurality of inorganic color pigment particles are fixed by silica. In this case, as the pH becomes lower, free silica not combined with the inorganic color pigment tends to precipitate and the amount of the free silica contained in the composite pigment increases. As a result, the viscosity tends to increase when the composite pigment is formed into a paint. In this case, as the pH becomes higher, (specifically, when the pH is around 9 to 10), the particle diameter of the composite pigment tends to become smaller, and the matte effect tends to become lower. For this reason, in the pH adjustment by adding the dilute sulfuric acid, the pH is preferably adjusted into a range of 6 to 9, and more preferably adjusted into a range of 7 to 8.

When aluminum sulfate is used as the inorganic compound source, it is preferable to heat up the slurry and adjust the pH to 4 to 13 by adding caustic soda (sodium hydroxide) while keeping the temperature in a range of about 50 to 100° C.

Following the above steps, if necessary, it is possible to perform washing and dehydration, drying, and appropriate grinding by a publicly known method. Further, if necessary, the above dried product may be calcined at a higher temperature. The calcination temperature can be appropriately set, for example, preferably at about 300 to 900° C.

In the above, the method of fixing the inorganic color pigment using an inorganic compound has been described, however it is also possible to fix the inorganic color pigment by an organic compound. That is, the inorganic color pigment and an organic compound (an organic flocculant, an organic coagulant, or the like composed of a polymer compound, such as a cationic polymer, an anionic polymer, and a nonionic polymer) are added to a solvent such as water, and dispersed by a disperser or the like to form a slurry, thereby fixing the inorganic color pigment. By doing so, a composite pigment, in which the inorganic color pigment is fixed by an organic compound, can be produced.

The composite pigment of the present invention produced by any of various methods described above may be classified for the purpose of removing coarse particles. Classification may be carried out by grinding or sieving. The classification method by grinding or sieving may be the same method as the classification method already described in the above [Embodiment of the present invention (the first invention of the present application)].

When the composite pigment of the present invention is further surface-treated with an inorganic compound and/or organic compound for surface treatment, it may be carried out by a publicly known method such as a wet process or a dry process, and in this case a preferable embodiment is as described in [Embodiment of the present invention (the first invention of the present application)].

The composite pigment of the present invention can be used in various applications as a pigment having a matte effect (matting pigment). For example, it may be used favorably in a building wall surface coating pigment (exterior, interior, ceiling, floor and bathtub, walls and floors of kitchen, toilet, and the like), a building material coating pigment, an automobile coating pigment, a furniture coating pigment, and an electric and mechanical product coating pigment. Also, this matting pigment may be blended in various paints as an alternative of so-called matting agent (a component for reducing gloss to be added separately from the pigment component).

The paint composition of the present invention contains the above-described composite pigment, and if necessary, a resin, a dispersant, an additive, a solvent, and the like in addition to the composite pigment. Specific examples of these resin, additive, and solvent may be exactly the same as respectively listed as the examples of resin, additive, and solvent to be included in the paint composition in the above [Embodiment of the present invention (the first invention of the present application)]. A dispersant is selected according to the type of the inorganic compound and/or organic compound used for preparing a composite pigment. For example, when silica is used for the composite pigment, since silica is present on the surface of the composite pigment, the surface condition is slightly acidic. In this case, it is more preferable to use a dispersant having a certain amine value as the dispersant.

A composite pigment, and if necessary, the above-mentioned resin, dispersant, additive, solvent, and the like are stirred with a dispersing machine, and if necessary degassed to prepare a paint composition of the present invention.

The pigment volume concentration (PVC) of the paint composition of the present invention is preferably adjusted in a range of 10% to 60%. When importance is attached to reduction of the gloss of a paint film, it is more preferable to adjust the pigment volume concentration in the lower side of the above range, specifically in a range of 20 to 40%. Further, when importance is attached to the hiding power of a paint film, it is more preferable to adjust the pigment volume concentration in the upper side of the above range, specifically in a range of 50 to 60%.

A paint film of the present invention is formed by applying the aforedescribed paint composition to a substrate, and curing it. That is, a paint film of the paint according to the present invention may be obtained by applying the aforedescribed paint composition on a substrate using a brush, a wool roller, or the like, followed by drying. Examples of a substrate include building materials (concrete, mortar, gypsum, plaster, plastic, glass, earthenware, stone, wood, and the like), an automobile body (metallic, or plastic), furniture and electromechanical products (plastic, glass, earthenware, stone-made, wooden, and the like).

Embodiment of the Present Invention (the Fourth Invention of the Present Application)

The composite pigment of the present invention is one in which an inorganic color pigment containing zinc element is fixed by an inorganic compound. In the present invention, "inorganic color pigment" refers to a pigment which contains an inorganic compound as a main component, and exhibits an achromatic color such as white or black, or a chromatic color such as red, yellow, or blue. As examples of various inorganic color pigments of white, black, red, yellow, blue and green colors, various inorganic color pigments listed as "inorganic color pigments" in the [Embodiment of the present invention (the third invention of the present application)] may be included as they are.

From the viewpoint of versatility of composite pigments, it is preferable to use a white color pigment as the inorganic color pigment, and among others use of a titanium dioxide color pigment is more preferable. When a titanium dioxide pigment is used as the inorganic color pigment, any out of the anatase type, rutile type, and brookite type can be used as the crystal form of the titanium dioxide pigment, however use of the rutile type, or the anatase type is preferable. When the composite pigment is blended in a paint resin, or the like, it is more preferable to use the rutile type from the viewpoint of reducing degradation of a resin due to photocatalytic activities. In this regard, as the titanium dioxide pigment, those produced by any of so-called sulfate process and chloride process may be used.

As for the preferable size of an inorganic color pigment constituting the composite pigment of the present invention, the average primary particle diameter of 0.1 to 1.0 μm is preferable, 0.15 to 0.7 μm is more preferable. and 0.2 to 0.5 μm is further preferable. In a case where the average primary particle diameter of the inorganic color pigment is within the above range, when the inorganic color pigment is fixed by an inorganic compound to form a composite pigment, the same can have an appropriate size (preferable particle size distribution).

The average primary particle diameter can be measured by the same method based on the electron microscopic method used for measuring the average primary particle diameter as described in the above [Embodiment of the present invention (the first invention of the present application)], and the like.

There is no particular restriction on the shape of the inorganic color pigment, and it may be any of a spherical shape, a substantially spherical shape, a columnar shape, a needle shape, a spindle shape, an elliptical shape, a cubic shape, a rectangular solid shape, and an indefinite shape.

The composite pigment of the present invention may contain an extender pigment besides the above-mentioned inorganic color pigment. That is, the composite pigment of the present invention can be one obtained by fixing an inorganic color pigment containing zinc element and the extender pigment using an inorganic compound. In the present invention, an "extender pigment" is generally added as an extender in a vehicle and used for improving the flowability, the strength, or the optical properties, nevertheless its own refractive index, hiding power, and tinting strength are low. Examples of the extender pigment include calcium carbonate (such as light calcium carbonate, heavy calcium carbonate, and precipitated (synthetic) calcium carbonate), barium sulfate (such as precipitated (synthetic) barium sulfate), aluminum hydroxide, barium carbonate, a barite powder, kaolin, talc, clay, and white carbon.

The size of the extender pigment is preferably substantially the same as the inorganic color pigment. Specifically, the average primary particle diameter thereof is preferably 0.1 to 1.0 μm, more preferably 0.1 to 0.5 μm, and further preferably 0.1 to 0.35 μm.

By being contained an extender pigment to a composite pigment (in other words, by replacing a part of the inorganic color pigment in a composite pigment with an extender pigment), it becomes possible to reduce the material cost of the composite pigment while maintaining an appropriate size (preferable particle size distribution) of the composite pigment.

In a case where an extender pigment is contained in the composite pigment of the present invention, the content ratio of the inorganic color pigment to the extender pigment may be set appropriately. Specifically, putting the volume of the inorganic color pigment as 1, the relative volume of the extender pigment is preferably in a range of 0.1 to 2, and more preferably in a range of 0.5 to 1.

Examples of an inorganic compound used for fixing the inorganic color pigment of the present invention (and an extender pigment) include those listed as examples of an inorganic compound to be used for fixing an extender pigment in the above [Embodiment of the present invention (the first invention of the present application)] as they are. Among them, an inorganic silicon compound is preferable, and examples thereof may include oxides, hydroxides, hydrous oxides, and the like of silicon. As the inorganic silicon compound, silica is particularly preferable. By using the inorganic silicon compound, the specific surface area and the oil absorption amount of the composite pigment can be adjusted to appropriate values, so that a paint containing the same can be easily handled.

In the composite pigment of the present invention, the content ratio of the inorganic color pigment (and the extender pigment) to the inorganic compound is preferably as follows. That is, putting the volume of the inorganic color pigment (and extender pigment) as 1, the relative volume of the inorganic compound is preferably 0.3 to 2, more preferably 0.4 to 1.5, and further preferably 0.5 to 1.

The composite pigment of the present invention has a form, in which the inorganic color pigment (and the extender pigment) forms an aggregate fixed by the inorganic compound. At this time, it may be in a state in which there is substantially no gaps among the particles of the inorganic color pigment (and the extender pigment) (densely composite state), or it may be in a state in which there are appropriate gaps (coarsely composite state). In addition, a plurality of aggregates in the above-described densely composite state (primary aggregates) may be gathered to form a secondary aggregate in which appropriate gaps are formed among the primary aggregates. The composite pigment may have any shape, such as a spherical shape, a substantially spherical shape, a columnar shape, a needle shape, a spindle shape, an elliptical shape, a cubic shape, a rectangular solid shape, and an indefinite shape, however the spherical shape, the substantially spherical shape, or the like is more preferable.

In the composite pigment of the present invention, an inorganic compound is required at least to be present among the particles of the inorganic color pigment (and the extender pigment) in order to express its function (fixation of the pigment components), and additionally it may be so present as to cover part or all of the surfaces of the composite pigment.

The composite pigment of the present invention contains zinc element in the inorganic color pigment. The expression of "containing zinc element in the inorganic color pigment" means a state in which zinc element is present on the particle surface of the inorganic color pigment and/or a state in which zinc element is contained (as a dope) inside the inorganic color pigment. This also applies to the case where the inorganic color pigment is zinc oxide, which means that zinc element having an origin different from the matrix exists in the surface and/or the inside of the particle of zinc oxide as a matrix.

When zinc element is contained in the composite pigment, the composite pigment can have an appropriate size (preferable particle size distribution). Further, it is possible to reduce the amount of small granules contained in the composite pigment. Since relatively large particles generally contribute to development of a matte effect, the abundance ratio of relatively large particles can be increased by reduction of small granules, and consequently the matte effect can be enhanced. The content of zinc element is preferably 0.5 to 5% by mass in terms of Zn based on the inorganic color pigment.

A zinc element may be present on the surface of the particle of the extender pigment or may be present in a state of being contained (as a dope) inside the extender pigment. Alternatively, it may be present in the gaps among the particles of a pigment component (inorganic color pigment and extender pigment), or in the inorganic compound for fixing the pigment component particles each other.

Since zinc element is present at least on the particle surface of the inorganic color pigment, the composite pigment can be made to have a more appropriate size (more preferable particle size distribution), when the inorganic color pigment (and the extender pigment) is fixed by the inorganic compound, which is preferable. Although the reason is not very clear, it is presumed that aggregation of the component advances favorably, because zinc element (zinc compound) having a relatively high affinity for the inorganic compound is present near the surface of the inorganic color pigment (and the extender pigment).

The zinc element may be present in the inorganic color pigment in various states, however it is preferably present in the form of zinc oxide and/or zinc hydroxide. Zinc oxide and zinc hydroxide can be easily contained in the inorganic color pigment by a treatment such as precipitation or calcination which will be described later, with which the composite pigment can favorably have a more appropriate size (more preferable particle size distribution).

With respect to the composite pigment of the present invention, the abundance ratio of the composite pigment having a particle diameter of 2 μm or more in the volume cumulative distribution measured by a laser diffraction/scattering-type particle size distribution measuring apparatus is preferably 70% or more of the total, and more preferably 80% or more of the total. For measurement of the volume particle size distribution of the composite pigment, for example, a laser diffraction/scattering-type particle size distribution measuring apparatus "LA-910" (manufactured by HORIBA, Ltd.) can be used.

A paint film containing the composite pigment with such a particle size distribution can achieve a matte effect at a high level. Specifically, the specular gloss under a geometric condition of 60° measured for a paint film having a pigment volume concentration (PVC) of 40% can be made to 5% or less, and further the specular gloss under a geometric condition of 85° can be reduced to 10% or less.

In the composite pigment of the present invention, it is preferable that the diameter on cumulative 90% (D90) in the volume cumulative distribution measured by a laser diffraction/scattering-type particle size distribution measuring apparatus is 30 μm or less. If so, the sufficiently smooth tactile feeling of the paint film may be realized in the paint film containing the composite pigment, while developing a matte effect at a high level. From the viewpoint of the tactile feeling of the paint film, the diameter on cumulative 90% (D90) is more preferably 20 μm or less.

As the evaluation index of the tactile feeling of a paint film, for example, a friction coefficient of the paint film can be used, and as the friction coefficient MIU (mean friction coefficient), MMD (mean friction coefficient variation), and the like may be used. These friction coefficients can be measured using, for example, a friction tester (KES-SE manufactured by Kato Tech Co., Ltd.).

With respect to the composite pigment of the present invention, by adjusting the diameter on cumulative 90% (D90) to 20 μm or less, the value of MMD (mean friction coefficient variation) can be reduced to 0.02 or less.

The oil absorption measured by the method described in JIS K 5101-13-1 of the composite pigment of the present invention is preferably 80 (mL/100 g) or less. In such a case, it is possible to sufficiently reduce the increase in viscosity when the composite pigment of the present invention is blended in the paint.

The composite pigment of the present invention may further have another kind of an inorganic compound and/or organic compound for surface treatment for covering the surface in its outer surface in addition to the above composition. This inorganic compound and/or organic compound are present on the surface of the composite pigment of the present invention (more specifically, present so as to cover part or all of the surfaces thereof), and used for so-called "surface treatment of composite pigment", therefore the function is different from that of an inorganic compound or an organic compound used for fixation as described above (also referred to as an "inorganic compound and/or organic compound for fixation"). Consequently, here, the "inorganic compound and/or organic compound for surface treatment" and the "inorganic compound and/or organic compound for fixation" are appropriately distinguished from each other.

In this regard, when there is no notation such as "for fixation" or "for surface treatment", and it cannot be judged from the context, it is normally regarded as "for fixation".

Examples of such an inorganic compound for surface treatment include oxides, hydroxides, and hydrous oxides of silicon, aluminum, zirconium, antimony, tin, cerium, zinc, and titanium. More specifically, silica, aluminum oxide, aluminum hydroxide, zirconium oxide, antimony oxide, tin oxide, cerium oxide, zinc oxide, titanium oxide, and the like can be used. By treating the composite pigment with any of these inorganic compounds, it is possible to improve the acid resistance and the weatherability, or the dispersibility in a dispersion medium such as a resin or the like.

Examples of an organic compound for surface treatment to be present on the surface of the composite pigment of the present invention include an organosilicon compound such as a silicone resin, a siloxane, a silane coupling agent, a carboxylic acid, such as stearic acid, and lauric acid, including the salts thereof, a polyol, and an amine. By treating the composite pigment with any of these organic compounds, it is possible to improve the dispersibility of a resin or the like in a dispersion medium.

The composite pigment of the present invention can be produced, for example, by the following method. First, an inorganic color pigment containing zinc element is prepared.

In this regard, "containing zinc element" includes not only a state in which zinc element exists in the particle surface of an inorganic color pigment but also a state in which zinc element is present inside the particle of an inorganic color pigment.

For example, a zinc compound is precipitated on the surface of an inorganic color pigment by adjusting the pH of a slurry containing the inorganic color pigment and a zinc compound source. As the zinc compound source, one capable of precipitating a desired zinc compound by pH adjustment can be used. For example, by using zinc sulfate heptahydrate, zinc chloride, or the like as the zinc compound source, and adjusting the pH of the slurry to about 8 to 8.5, an oxide and/or a hydroxide of zinc can be precipitated on the surface of the inorganic color pigment. At this time, an alkali such as sodium hydroxide can be used for pH adjustment.

Also, an inorganic color pigment having zinc element on the surface of the particle or inside the particle may be prepared by mixing an inorganic color pigment and a zinc compound, and heating (calcination) this mixture. The addition amount of the zinc compound and the temperature of heating (calcination) may be appropriately set according to the kind of the inorganic color pigment and the like.

Further, when a titanium dioxide pigment is used as an inorganic color pigment, a titanium dioxide pigment having a zinc compound on the particle surface may be also prepared as follows. That is, a hydrate of titanium dioxide, and a zinc compound as an additive for calcination are mixed and calcined. The amount of the zinc compound is preferably 0.1 to 2.0% by mass in terms of ZnO with respect to titanium dioxide. Although the calcination conditions can be set appropriately, the calcination temperature is preferably 800 to 1000° C. As the additive for calcination, various zinc compounds may be used, but it is preferable to use an oxide and/or hydroxide of zinc.

Subsequently, the inorganic color pigment obtained as above and, if necessary, an extender pigment, furthermore, an inorganic compound source are added into a solvent such as water, and dispersed by a dispersing machine such as a disperser to form a slurry.

The "inorganic compound source" means herein a material which precipitates an inorganic compound by adjusting the pH of a slurry as described later. Sodium silicate is preferable as the inorganic compound source. As sodium silicate, any of No. 1, No. 2 and No. 3 defined in JIS 1408-1966 can be used, but use of No. 3 is more preferable from the viewpoint of availability and handling.

In preparing the slurry, the volume ratio (Va/Vb) of the volume (Va) of the inorganic compound source to the volume (Vb) of the inorganic color pigment (and the extender pigment) is preferably set in a range of 0.3 to 2. In this case, the volume (Va) of the inorganic compound source means the volume in terms of an inorganic compound to be precipitated as a result of the pH adjustment described later. By adjusting to such a volume ratio, a sufficient fixation effect by the inorganic compound can be obtained, so that the composite pigment can acquire an appropriate size (preferable particle size distribution).

Subsequently, by adjusting the pH of the slurry, an inorganic compound derived from the inorganic compound source is precipitated, and the inorganic color pigment (and the extender pigment) is fixed by the inorganic compound.

As an inorganic compound source, a compound which becomes the above inorganic compound by precipitation can be used, and the pH for precipitation can be appropriately set according to the inorganic compound. For example, when sodium silicate is used, it is preferable to adjust the pH to 2 to 10 by adding dilute sulfuric acid. By doing so, it is possible to yield a composite pigment having an appropriate size (preferable particle size distribution) while reducing the formation of free silica. In the pH adjustment by adding dilute sulfuric acid, it is more preferable to adjust the pH in a range of 6 to 9, and further preferably in a range of 7 to 8. Further, it is preferable to precipitate an inorganic compound while heating the slurry and keeping the temperature in a range of about 50 to 100° C.

Following the above step, if necessary, washing, dehydration, and drying may be carried out by publicly known methods, and grinding may be performed appropriately. Further, if necessary, the above dried product may be calcined at a higher temperature. The calcination temperature may be appropriately set, and, for example, about 300 to 900° C. is preferable.

In the above, the method of fixing the inorganic color pigment (and the extender pigment) by the inorganic compound has been described, however it is also possible to fix the inorganic color pigment (and the extender pigment) by an organic compound. That is, an extender pigment and an organic compound (an organic flocculant, an organic coagulant, or the like composed of a polymer compound, such as a cationic polymer, an anionic polymer, and a nonionic polymer) are added to a solvent such as water, and dispersed by a dispersing machine such as a disperser to form a slurry, thereby fixing the inorganic color pigment (and the extender pigment). By doing so, a composite pigment, in which the inorganic color pigment (and the extender pigment) is fixed by an organic compound, can be produced.

The composite pigment of the present invention produced by any of various methods described above may be classified for the purpose of removing coarse particles. Classification may be carried out by grinding or sieving. The classification method by grinding or sieving may be the same method as the classification method already described in the above [Embodiment of the present invention (the first invention of the present application)].

When the composite pigment of the present invention is further surface-treated with an inorganic compound and/or organic compound for surface treatment, it may be carried out by a publicly known method such as a wet process or a dry process, and in this case a preferable embodiment is as described in [Embodiment of the present invention (the first invention of the present application)].

The composite pigment of the present invention can be used in various applications as a matting pigment. For example, it may be used favorably as a matting pigment to be blended in a paint composition for coating building wall surface (exterior, interior, ceiling, floor and bathtub, walls and floors of kitchen, toilet, and the like), for coating building materials, for coating vehicles, for coating furniture, and for coating electromechanical products.

The composite pigment of the present invention may be blended in various paints as so-called matting agent (a component for developing a matte effect to be added into a paint separately from the color material).

The paint composition of the present invention contains the composite pigment and/or the matting pigment, a resin, and, if necessary, also an additive, a solvent, a dispersant, or the like.

As a resin contained in the paint composition of the present invention, those listed as the examples of the resins to be contained in a paint composition in the above [Embodiment of the present invention (the first invention of the present application)] may be used.

Examples of an additive contained in the paint composition of the present invention include various kinds of commonly used emulsifiers, antifreezing agents, pH adjusters, thickeners, and defoaming agents. Specific examples of the solvent include those listed as the examples of the solvent to be used in the paint composition in the above [Embodiment of the present invention (the first invention of the present application)] as they are.

A dispersant is appropriately selected corresponding to the type of an inorganic compound used for synthesizing a composite pigment. For example, when silica is used as the inorganic compound, since silica is present at the surface of the composite pigment, the surface is slightly acidic. In this case, it is more preferable to use a dispersant having a certain amine value as the dispersant. Specific examples thereof include those listed as the examples of the dispersant having an amine value in the above [Embodiment of the present invention (the first invention of the present application)] as they are.

The composite pigment of the present invention itself also functions as a color material. Therefore, when the paint composition of the present invention is prepared, it is not necessary to separately add a color material, but it is also possible to add a color material separately thereto in addition to the composite pigment. As the color material, common pigments, dyes, and the like may be used. As a pigment to be contained in the paint composition of the present invention, those listed as examples of the pigment which can be used as a "color material" in the paint composition in the above [Embodiment of the present invention (the first invention of the present application)] may be used as they are.

The composite pigment and the resin, and if necessary the above-mentioned dispersant, additive, solvent, color material, and the like are stirred with a dispersing machine, and if necessary degassing is performed, to prepare a paint composition of the present invention.

The pigment volume concentration (PVC) of the paint composition of the present invention is preferably adjusted in a range of 10% to 60%. When importance is attached to reduction of the gloss of a paint film, it is more preferable to adjust the pigment volume concentration in the lower side of the above range, namely in a range of 20 to 40%. Further, when importance is attached to the hiding power of a paint film, it is more preferable to adjust the pigment volume concentration in the upper side of the above range, namely in a range of 50 to 60%.

A paint film of the present invention is formed by coating the aforedescribed paint composition onto an object and curing it. That is, a paint film of the present invention may be obtained by coating the aforedescribed paint composition onto an object using a brush, a wool roller, or the like, followed by drying. Examples of an object include building materials (concrete, mortar, gypsum, plaster, plastic, glass, earthenware, stone, wood, and the like), a vehicle main body (metallic, or plastic), furniture and electromechanical products (plastic, glass, earthenware, stone-made, wooden, and the like).

Embodiment of the Present Invention (the Fifth Invention of the Present Application)

A composite pigment of the present invention contains extender pigment particles fixed by an inorganic compound and/or organic compound, in other words it is a particulate aggregate having gathered a plurality of (two or more) extender pigment (specifically, particles of the extender pigment) by means of an inorganic compound and/or organic compound.

In this regard, the content of the descriptions in the above [Embodiment of the present invention (the first invention of the present application)] through [Embodiment of the present invention (the fourth invention of the present application)] shall apply as they are in the current Embodiment of the present invention, unless otherwise specified.

In the present invention, an "extender pigment" means a pigment, which is generally added as an extender in a vehicle and used for improving the flowability, the strength, or the optical properties, although its own refractive index, hiding power, and tinting strength are low, and which becomes transparent or translucent when it is kneaded with a vehicle. Examples of the extender pigment include barium sulfate (such as precipitated (synthetic) barium sulfate), calcium carbonate (such as light calcium carbonate, heavy calcium carbonate, and precipitated (synthetic) calcium carbonate), aluminum hydroxide, barium carbonate, a barite powder, kaolin, talc, clay, and white carbon. As the extender pigment, calcium carbonate, and barium sulfate are preferable. In particular, when barium sulfate is used as an extender pigment, acid resistance, alkali resistance, heat resistance, radiation shielding performance, and the like can be imparted to a composite pigment.

The size of the extender pigment particles constituting the composite pigment of the present invention is preferably 0.1 μm or more and 1.0 μm or less in terms of the average primary particle diameter, more preferably 0.15 μm or more and 0.7 μm or less, and more preferably 0.2 μm or more and 0.5 μm or less. In a case in which the average primary particle diameter of an extender pigment is within the above range, when the extender pigment particles are gathered and fixed by an inorganic compound, the composite pigment can have an appropriate size (a preferable particle size distribution).

The average primary particle diameter can be measured by an electron microscopic method. More particularly, the particles of an extender pigment are photographed using a transmission electron microscope (H-7000 manufactured by Hitachi, Ltd.), an image processing is performed using an automatic image processing and analyzing apparatus (LUZEX AP manufactured by NIRECO CORPORATION), and the primary particle diameter is measured for 2,000 particles, and the average value thereof is regarded as the average primary particle diameter.

There is no particular restriction on the particle shape of an extender pigment, and it may be any of various shapes, such as a spherical shape, a substantially spherical shape, a columnar shape, a needle shape, a spindle shape, an elliptical, a cubic shape, a rectangular solid shape, and an indefinite shape.

Examples of an inorganic compound used for fixing the extender pigment particles include an inorganic compound having a fixing property or an aggregating property, such as oxides, hydroxides, and hydrous oxides of silicon, aluminum, zirconium, antimony, tin, cerium, zinc, and titanium. More specific examples thereof include silica, aluminum oxide, aluminum hydroxide, zirconium oxide, antimony oxide, tin oxide, cerium oxide, zinc oxide, and titanium oxide; and at least one selected from inorganic compounds other than an extender pigment may be used.

As the inorganic compound, an inorganic silicon compound is preferable, and examples thereof include oxides, hydroxides, and hydrous oxides of silicon. As the inorganic silicon compound, silica is particularly preferable. By using an inorganic silicon compound, the specific surface area and the oil absorption amount of a composite pigment can be appropriate values, and a paint blending the same can be easily handled.

In the composite pigment of the present invention, with respect to the content ratio between the extender pigment particles and the inorganic compound in the composite pigment, putting the volume of the extender pigment as 1, the relative volume of the inorganic compound is preferably 0.1 or more and 3 or less. From the viewpoint of reducing the gloss of a paint film, the relative volume of the inorganic compound is more preferably 0.3 or more and 3 or less with respect to 1 volume of the extender pigment. Furthermore, from the viewpoint of the viscosity of the paint (handling), the relative volume of the inorganic compound is further preferably 0.1 or more and 1.5 or less with respect to 1 volume of the extender pigment particles. In addition, from both the viewpoints of a gloss reduction of the paint film and handling of the paint, the relative volume of the inorganic compound is still further preferably 0.3 or more and 1.5 or less with respect to 1 volume of the extender pigment particles.

For fixing the extender pigment particles, an organic compound having a property similar to that of the above inorganic compound (the property to fix the extender pigment particles) may be used together with the above inorganic compound, or separately. As the organic compound, an organic flocculant, an organic coagulant, or the like may be used. There is no particular restriction on the organic flocculant, and the organic coagulant, insofar as they are capable of catching and aggregating a plurality of particles with their polymer chains, and a polymer compound such as a cationic polymer, an anionic polymer, and a nonionic polymer may be used. The content of the organic compound may be appropriately set, and putting the mass of the extender pigment component as 1, the relative mass of the organic compound is preferably 0.001 or more and 1 or less, more preferably 0.001 or more and 0.1 or less, and further preferably 0.01 or more and 0.05 or less.

The composite pigment of the present invention has a form, in which the extender pigment particles form an aggregate fixed by the inorganic compound and/or organic compound. At this time, it may be in a state in which there is substantially no gaps among the extender pigment particles (densely composite state), or it may be in a state in which there are appropriate gaps (coarsely composite state). In addition, a plurality of aggregates in the above-described densely composite state (primary aggregates) may be gathered to form a secondary aggregate in which appropriate gaps are formed among the primary aggregates. The composite pigment particle may have any shape, such as a spherical shape, a substantially spherical shape, a columnar shape, a needle shape, a spindle shape, an elliptical shape, a cubic shape, a rectangular solid shape, and an indefinite shape, however the spherical shape, the substantially spherical shape, or the like is more preferable.

In the composite pigment of the present invention, the inorganic compound and/or organic compound is required at least to be present among the particles of the extender pigment in order to exert its function (function to fix the extender pigment particles each other), and further the inorganic compound and/or organic compound may be so present as to cover part or all of the particle surfaces of the composite pigment.

The diameter on cumulative 50% (D50) in the volume cumulative distribution measured by a laser diffraction/scattering-type particle size distribution measuring apparatus of the composite pigment of the present invention is preferably 1 μm or more and 15 μm or less. For measurement of the volume particle size distribution of the composite pigment, for example, a laser diffraction/scattering-type particle size distribution measuring apparatus "LA-910" (manufactured by HORIBA, Ltd.) may be used.

When D50 takes such a value, the matte effect can be expressed at a high level in a paint film containing the composite pigment. Specifically, in a case where a clear paint is prepared at a pigment volume concentration (PVC) of 20%, and this is coated to form a paint film, which specular gloss is measured according to JIS K 5600-4-7: 1999, the specular gloss under a geometric condition of 60° can be reduced to 5% or less. This means that the gloss is reduced even to the degree of a gloss reduction referred to as "matting" over the degree of a gloss reduction generally referred to as "70% gloss (specular gloss of 55 to 65% at 60°)", "50% gloss" or "30% gloss".

The composite pigment of the present invention preferably has a diameter on cumulative 90% (D90) in the volume cumulative distribution measured by a laser diffraction/scattering-type particle size distribution measuring apparatus of 5 μm or more and 30 μm or less. By doing so, it becomes possible to sufficiently reduce so-called "85° gloss" in the paint film containing the composite pigment. Specifically, in a case where a clear paint is prepared at a pigment volume concentration (PVC) of 20%, and this is coated to form a paint film, the specular gloss measured under a geometric condition of 85° according to JIS K 5600-4-7: 1999 can be reduced to 10% or less.

In addition, when the composite pigment of the present invention is blended in a paint film, the paint film gives a good (smooth) tactile feeling, and the diameter on cumulative 90% (D90) is preferably 30 μm or less because the sufficiently smooth tactile feeling of the paint film can be attained. From the viewpoint of the tactile feeling of the paint film, the diameter on cumulative 90% (D90) is more preferably 20 μm or less.

As the evaluation index of the tactile feeling of a paint film, for example, the friction coefficient of a paint film can be used, and as the friction coefficient, MIU (mean friction coefficient), MMD (mean friction coefficient variation), or the like may be used. These friction coefficients may be measured using, for example, with a friction tester (KES-SE manufactured by Kato Tech Co., Ltd.).

In the case of the composite pigment of the present invention, when the diameter on cumulative 90% (D90) is made 20 μm or less, the value of MMD (mean friction coefficient variation) can be lowered to 0.02 or less, or in a favorable case to 0.01 or less.

The oil absorption of the composite pigment of the present invention measured by the method described in JIS K 5101-13-1 is preferably 80 (mL/100 g) or less. In such a case, it is possible to sufficiently reduce the increase in viscosity when the composite pigment of the present invention is blended in a paint. From the viewpoint of reduction of the viscosity of a paint (improvement of handling), the oil absorption amount is more preferably 60 (mL/100 g) or less.

Next, the composite pigment of the present invention also contains inorganic color pigment particles in addition to the extender pigment particles, more particularly it includes the inorganic color pigment particles and the extender pigment particles, both of which are fixed by the inorganic compound and/or organic compound. In other words, in the composite pigment in which the extender pigment particles are fixed by the inorganic compound and/or organic substance, which is one embodiment of the present invention described above, part of the extender pigment particles are replaced with inorganic color pigment particles. Therefore, the composite pigment of the present invention is a composite pigment in which at least the inorganic color pigment particles and the extender pigment particles are fixed by the inorganic compound and/or organic compound.

In the present invention, the term "inorganic color pigment particle" refers to a pigment which contains an inorganic compound as a main component and exhibits an achromatic color such as white or black, or a chromatic color such as red, yellow, or blue. Examples of a white inorganic color pigment include titanium dioxide, zinc oxide, and basic lead carbonate. Examples of a black inorganic color pigment include a lower titanium oxide, titanium oxynitride (titanium black), carbon black, bone black (bone charcoal), graphite, iron black, cobalt chromate black spinel, iron chromate composite oxide, copper chromate spinel black composite oxide, and Fe—Mn—Bi black. Examples of a red inorganic color pigment include red iron oxide, and molybdenum red. Examples of a yellow inorganic color pigment include nickel antimony titanium yellow, chrome antimony titanium buff, synthetic iron oxide yellow, and chrome yellow. Examples of a blue inorganic color pigment include ultramarine blue, iron blue, and cobalt blue. Examples of a green inorganic color pigment include cobalt green, chrome green, chromium oxide green, cobalt chromate green spinel, and cobalt titanate green spinel. At least one kind selected from these inorganic color pigments may be used.

From the viewpoint of versatility of composite pigments, it is preferable to use a white color pigment as the inorganic color pigment, and among others use of a titanium dioxide pigment is more preferable. When a titanium dioxide pigment is used as the inorganic color pigment, any out of the anatase type, rutile type, and brookite type can be used as the crystal form of the titanium dioxide pigment, however use of the rutile type, or the anatase type is preferable. When the composite pigment is blended in a paint resin, or the like, it is more preferable to use the rutile type from the viewpoint of reducing degradation of a resin due to photocatalytic activities. In this regard, as the titanium dioxide pigment, those produced by any of so-called sulfate process and chloride process may be used.

The size of an inorganic color pigment particle constituting the composite pigment of the present invention in terms of the average primary particle diameter is preferably 0.1 µm or more and 1.0 µm or less, more preferably 0.15 µm or more and 0.7 µm or less, and further preferably 0.2 µm or more and 0.5 µm or less. In a case where the average primary particle diameter of the inorganic color pigment is within the above range, when the extender pigment particle and the inorganic color pigment particles are fixed by an inorganic compound to form a composite pigment, the same can have an appropriate size (preferable particle size distribution).

When the inorganic color pigment constituting the composite pigment of the present invention is a titanium oxide pigment, the average primary particle diameter thereof is preferably 0.1 µm or more and 1.0 µm or less, more preferably 0.1 µm or more and 0.5 µm or less, and further preferably 0.1 µm or more and 0.3 µm or less. By adjusting the average primary particle diameter of the titanium oxide pigment within the above range, when the titanium oxide pigment and the extender pigment are formed into a composite pigment, the size thereof can be appropriate. As a result, the low-gloss property (matte effect) and the hiding power can be improved, and further the tactile feeling of the paint film can be made smoother, which is preferable. The average primary particle diameter can be measured by the above-mentioned electron microscopic method.

There is no particular restriction on the particle shape of the inorganic color pigment, and it may be any of a spherical shape, a substantially spherical shape, a columnar shape, a needle shape, a spindle shape, an elliptical shape, a cubic shape, a rectangular solid shape, and an indefinite shape.

In the composite pigment of the present invention, the extender pigment particles enter between the inorganic color pigment particles and function as a spacer to provide appropriate gaps between the particles. In order to exert such a function, the volume of the extender pigment particle is important. In this respect, calcium carbonate has a relatively small specific gravity, and can secure a sufficient volume even with a small amount used. Therefore, from the viewpoint of cost, it is more preferable to use calcium carbonate as the extender pigment. Among various types of calcium carbonate, precipitated (synthetic) calcium carbonate is particularly preferable. This is because precipitated (synthetic) calcium carbonate can be easily designed to have a desired particle size, and therefore one with a desired particle size is easily available.

The extender pigment particle constituting the composite pigment of the present invention is preferably substantially the same as the inorganic color pigment particle in size. Specifically, the average primary particle diameter thereof is preferably 0.1 µm or more and 1.0 µm or less, more preferably 0.1 µm or more and 0.5 µm or less, and further preferably 0.1 µm or more and 0.35 µm or less. In a case where the average primary particle diameter of the extender pigment is within the above range, when the inorganic color pigment and the extender pigment are made to form a composite, the composite pigment can have an appropriate size, so that the low-gloss property (matte effect) and the hiding power can be improved, and also the tactile feeling of the paint film can be made smoother, which is preferable.

In the composite pigment of the present invention, the content ratio of the inorganic color pigment particle to the extender pigment particle may be set appropriately. Specifically, putting the volume of the inorganic color pigment particle as 1, the relative volume of the extender pigment particle is preferably in a range of 0.1 or more and 2 or less, and more preferably in a range of 0.5 or more and 1 or less.

Further, in a case where the inorganic color pigment is a titanium oxide pigment in the composite pigment of the present invention, although the contents of the titanium oxide pigment and the extender pigment can be appropriately set, if the mass of titanium oxide is put as 1, the relative mass of the extender pigment is preferably 0.01 or more and 100 or less, more preferably 0.1 or more and 10 or less, and further preferably 0.2 or more, and 1 or less.

For very firmly fixing the particles of the above inorganic color pigment (such as titanium oxide pigment) and the particles of the extender pigment, the above inorganic compound and/or organic compound is used.

When an inorganic compound is used for the composite pigment of the present invention, the content ratio of the inorganic compound to the inorganic color pigment particles and the extender pigment particles is preferably as follows. That is, putting the volume of the inorganic color pigment particles and the extender pigment particles as 1, the volume of the inorganic compound is preferably 0.3 or more and 2 or less, more preferably 0.4 or more and 1.5 or less, and further preferably 0.5 or more and 1 or less.

As an organic compound to constitute a composite pigment of the present invention, an organic flocculant, an organic coagulant, and the like may be used. There is no particular restriction on the organic flocculant, and the organic coagulant, insofar as they are capable of catching and aggregating a plurality of particles with their polymer chains, and a polymer compound such as a cationic polymers, an anionic polymer, and a nonionic polymer may be used. The content relative to the organic compound may be appropriately set, however putting the mass of the pigment component as 1, the relative mass of the organic compound is preferably 0.001 or more and 1 or less, more preferably 0.001 or more and 0.1 or less, and further preferably 0.01 or more and 0.05 or less.

The composite pigment of the present invention takes the form of an aggregate in which at least the particles of the inorganic color pigment (titanium oxide pigment, or the like) and the particles of the extender pigment are fixed by an inorganic compound and/or organic compound. Although there can be various modes of composite pigment, a typical example is a mode in which at least a plurality of the inorganic color pigment particles, and a plurality of the extender pigment particles are fixed by an inorganic compound and/or an organic compound. In other words, in the one embodiment described above of the present invention with respect to the composite pigment comprising the inorganic color pigment particles and the extender pigment particles, there can be a mode in which the respective numbers of the inorganic color pigment particles and the extender pigment particles fixed therein are plural (two or more).

In this case, a state in which an extender pigment particle is present among the inorganic color pigment particles is preferable, rather than a state in which the same kind particles (group of inorganic color pigment particles each other, or group of extender pigment particles each other) gather at a specific position. Since the extender pigment particles play the role of a spacer, the low-gloss property (matte effect) and the hiding power can be improved. Naturally, it is not always necessary that the extender pigment particles exist between all the inorganic color pigment particles, and the same kind of constituent particles may gather to form its own region in part of the regions of the composite pigment. However, a mode in which, when the composite pigment is viewed macroscopically, a plurality of the inorganic color pigment particles and the extender pigment particles are distributed evenly, is preferable.

For the sake of dispersing a plurality of the inorganic color pigment particles and the extender pigment particles in the composite pigment, the particle shape of the inorganic color pigment and the extender pigment should preferably be spherical or substantially spherical.

In this regard, for the sake of achieving a state in which a plurality of the inorganic color pigment particles (titanium oxide pigment, or the like) and the extender pigment particles in the composite pigment are distributed evenly, the average primary particle diameter of the extender pigment is preferably nearly equal to the average primary particle diameter of the inorganic color pigment, or smaller than the average primary particle diameter of the inorganic color pigment as described above. Specifically, putting the average primary particle diameter of the inorganic color pigment as 1, the average primary particle diameter of the extender pigment is preferably 0.1 or more and 1.5 or less, and more preferably 0.5 or more and 1 or less. This is because the extender pigment particles can function more easily as spacers among the inorganic color pigment particles, by using extender pigment particles having a size nearly equal to the inorganic color pigment particles, or smaller than the inorganic color pigment particles.

The inorganic color pigment particles (titanium oxide pigment, or the like) and the extender pigment particle may be in a state where there is almost no gap between them (densely composite state) by means of an inorganic compound and/or organic compound, or in a state where there are appropriate gaps (coarsely composite state). In addition, a plurality of aggregates in the above-described densely composite state (primary aggregates) may be gathered to form a secondary aggregate in which appropriate gaps are formed among the primary aggregates. The composite pigment may have any shape, such as a spherical shape, a substantially spherical shape, a columnar shape, a needle shape, a spindle shape, an elliptical shape, a cubic shape, a rectangular solid shape, and an indefinite shape, however the spherical shape, the substantially spherical shape, or the like is more preferable.

In the composite pigment of the present invention, the inorganic compound and/or the organic compound is required to be present at least among the constituent particles (inorganic color pigment particles such as titanium oxide pigment, extender pigment particles, and the like) of the composite pigment, they may be also present so as to cover part or all of the surface of the composite pigment. In this case, paying attention to both the functions, the former (an inorganic compound and/or organic compound present among the constituent particles of the composite pigment and used for fixing the inorganic color pigment particles each other) which is referred to as an "inorganic compound and/or organic compound for fixation", and the latter (an inorganic compound and/or organic compound present so as to cover part or all of the surfaces of the composite pigment, and used for so-called "surface treatment of composite pigment") is referred to as an "inorganic compound and/or organic compound for surface treatment" are distinguished from each other.

In this regard, when there is no specific notation such as "for fixation" or "for surface treatment", it normally means "for fixation".

With respect to the composite pigment containing the inorganic color pigment particles of the present invention, it is preferable that the diameter on cumulative 90% (D90) in the volume cumulative distribution measured by a laser diffraction/scattering-type particle size distribution measuring apparatus is 30 μm or less. If so, the sufficiently smooth tactile feeling of a paint film may be realized while developing a matte effect at a high level in the paint film containing the composite pigment. From the viewpoint of the tactile feeling of a paint film, the diameter on cumulative 90% (D90) is more preferably 20 μm or less, and further preferably 10 μm or less.

The diameter on cumulative 90% (D90) of a composite pigment can be measured using the laser diffraction/scattering-type particle size distribution measuring apparatus. As the evaluation index of the tactile feeling of a paint film, for example, the friction coefficient of the paint film can be used, and as the friction coefficient, MIU (mean friction coefficient), MMD (mean friction coefficient variation), or the like may be used. In the case of the composite pigment of the present invention, when the diameter on cumulative 90% (D90) is made 20 μm or less, the value of MMD (mean friction coefficient variation) can be lowered to 0.02 or less.

A general flat emulsion paint develops a matte effect, however the surface of a paint film becomes rough. As a result, the paint film gives a rough tactile feel, the paint film is easily stained, and it is often difficult to remove the stain. In contrast, when the composite pigment of the present invention having a diameter on cumulative 90% (D90) of 30 μm or less, and preferably 20 μm or less is used, the surface of the paint film becomes smooth so that the paint film gives a smooth tactile feel, while a low-gloss property (matte effect) is exhibited, which constitutes unique design. At the same time, a functionality can be imparted such that stain is hardly attached to the paint film and the stain is easily removed.

The composite pigment containing the inorganic color pigment particles of the present invention has preferably a median diameter D50 (diameter on cumulative 50% in the volume cumulative distribution) measured by the laser diffraction/scattering-type particle size distribution measuring apparatus of 1 μm or more and 10 μm or less, more preferably 1 μm or more and 6 μm or less, and further preferably 1 μm or more and 3 μm or less. When the composite pigment of the present invention is used for formation of a paint, the surface of a paint film can be made even smoother. As a result, smoothness of the tactile feeling of a paint film and resistance of the paint film to stain (easiness of removal of the stain) can be further improved while exhibiting the low-gloss property (matte effect).

The composite pigment containing the inorganic color pigment particles of the present invention is preferably made to have an oil absorption measured by the method described in JIS K 5101-13-1 of 80 (mL/100 g) or less. By doing so, it is possible to sufficiently reduce the increase in viscosity when the composite pigment of the present invention is blended in a paint.

The composite pigment of the present invention may contain zinc element in the inorganic color pigment particles. The expression of "containing zinc element in the inorganic color pigment particles" means a state in which zinc element is present on the particle surface of the inorganic color pigment and/or a state in which zinc element is contained (as a dope) inside the inorganic color pigment particles. This also applies to the case where the inorganic color pigment is zinc oxide, which means that zinc element having an origin different from the matrix exists in the surface and/or the inside of the particle of zinc oxide as a matrix.

When zinc element is contained in the composite pigment particles, the composite pigment can have an appropriate size (preferable particle size distribution). Further, it is possible to reduce the amount of small granules contained in the composite pigment. Since relatively large particles generally contribute to development of a matte effect, the abundance ratio of relatively large particles can be increased by reduction of small granules, and consequently the matte effect can be enhanced. The content of zinc element is preferably 0.5% by mass or more and 5% by mass or less in terms of Zn based on the inorganic color pigment.

A zinc element may be present on the surface of the particle of the extender pigment or may be present in a state of being contained (as a dope) inside the extender pigment particles. Alternatively, it may be present in the gaps among the particles of a pigment component (inorganic color pigment and extender pigment), or in the inorganic compound for fixing the pigment component particles each other.

Since zinc element is present at least on the particle surface of the inorganic color pigment, the composite pigment can be made to have a more appropriate size (more preferable particle size distribution), when the inorganic color pigment particles (and the extender pigment particles) are fixed by the inorganic compound, which is preferable. Although the reason is not very clear, it is presumed that aggregation of the component advances favorably, because zinc element (zinc compound) having a relatively high affinity for the inorganic compound is present near the surface of the inorganic color pigment particles (and the extender pigment particles).

The zinc element may be present in the inorganic color pigment particles in various forms, however it is preferably present in the form of zinc oxide and/or zinc hydroxide. Zinc oxide and zinc hydroxide can be easily contained in the inorganic color pigment particles by a treatment such as precipitation or calcination which will be described later, with which the composite pigment can favorably have a more appropriate size (more preferable particle size distribution).

With respect to the composite pigment containing the inorganic color pigment particles of the present invention, the abundance ratio of the composite pigment having a particle diameter of 2 μm or more in the volume cumulative distribution measured by a laser diffraction/scattering-type particle size distribution measuring apparatus is preferably 70% or more of the total, and more preferably 80% or more of the total. For measurement of the volume particle size distribution of the composite pigment, for example, a laser diffraction/scattering-type particle size distribution measuring apparatus "LA-910" (manufactured by HORIBA, Ltd.) can be used.

A paint film containing the composite pigment with such a particle size distribution can achieve a matte effect at a high level. Specifically, the specular gloss under a geometric condition of 60° measured for a paint film having a pigment volume concentration (PVC) of 40% can be made to 5% or less, and further the specular gloss under a geometric condition of 85° can be reduced to 10% or less.

The composite pigment of the present invention may further contain in its outer surface an inorganic compound and/or organic compound for surface treatment in addition to the above composition. The inorganic compound and/or organic compound is present on the surface of the composite pigment of the present invention (more specifically, present so as to cover part or all of the surfaces thereof) and used for so-called "surface treatment of composite pigment", therefore its function is different from that of an inorganic compound or an organic compound used for fixation as described above (also referred to as an "inorganic compound and/or organic compound for fixation"). Consequently, here, the "inorganic compound and/or organic compound for surface treatment" and the "inorganic compound and/or organic compound for fixation" are appropriately distinguished from each other.

In this regard, when there is no notation such as "for fixation" or "for surface treatment", and it cannot be judged from the context, it is normally regarded as "for fixation".

Examples of such an inorganic compound for surface treatment include oxides, hydroxides, and hydrous oxides of silicon, aluminum, zirconium, antimony, tin, cerium, zinc, and titanium. More specifically, silica, aluminum oxide, aluminum hydroxide, zirconium oxide, antimony oxide, tin oxide, cerium oxide, zinc oxide, titanium oxide, and the like can be used. By treating the composite pigment with any of these inorganic compounds, it is possible to improve the acid resistance and the weatherability, or the dispersibility in a dispersion medium such as a resin or the like.

Examples of an organic compound for surface treatment to be present on the surface of a composite pigment of the present invention include an organosilicon compound such as a silicone resin, a siloxane, a silane coupling agent, a carboxylic acid such as stearic acid and lauric acid, or the salts thereof, a polyol, and an amine. By treating the composite pigment with any of these organic compounds, it is possible to improve the dispersibility in a dispersion medium such as a resin or the like.

If necessary, the composite pigment of the present invention may contain appropriately various color pigments, organic pigments, organic dyes, functional pigments such as a heat shielding pigment, or the like in addition to the inorganic color pigment particles (such as titanium oxide pigment), and the extender pigment particles.

The composite pigment of the present invention can be produced, for example, by the following method. That is, the extender pigment particles and the inorganic compound source are added to a solvent such as water and dispersed with a disperser or the like to form a slurry.

The "inorganic compound source" means herein a material, which precipitates as an inorganic compound by adjusting the pH of a slurry as described later. Examples of such an inorganic compound source include sodium silicate, sodium aluminate, aluminum sulfate, zirconium sulfate, stannous chloride, and titanium tetrachloride. Sodium silicate is preferable as an inorganic compound source. As sodium silicate, any of No. 1, No. 2 and No. 3 defined in JIS 1408-1966 can be used, but use of No. 3 is preferable from the viewpoint of availability and handling.

In preparing the slurry, the volume ratio (Va/Vb) of the volume (Va) of the inorganic compound source to the volume (Vb) of the extender pigment particles is preferably set at 0.1 or more and 3 or less. In this case, the volume (Va) of the inorganic compound source means the volume in terms of an inorganic compound to be precipitated as a result of the pH adjustment described later. By adjusting to such a volume ratio, a sufficient fixation effect of the inorganic compound can be obtained, so that the composite pigment can acquire an appropriate size (preferable particle size distribution).

Subsequently, by adjusting the pH of the slurry, an inorganic compound derived from the inorganic compound source precipitates, and the extender pigment particles are fixed by the inorganic compound.

When sodium silicate is used as the inorganic compound source, it is preferable to heat the slurry and keep the temperature in a range of about 50° C. or more and 100° C. or less, and to add dilute sulfuric acid to adjust the pH to 2 or more and 10 or less. By doing so, it is possible to obtain a composite pigment having an appropriate size (preferable particle size distribution) while reducing the formation of free silica. In the pH adjustment by adding the dilute sulfuric acid, the pH is preferably adjusted into a range of 6 or more and 9 or less, and more preferably adjusted into a range of 7 or more and 8 or less.

When aluminum sulfate is used as an inorganic compound source, it is preferable to heat up the slurry and adjust the pH to 4 or more and 13 or less by adding sodium hydroxide while keeping the temperature at about 50 to 100° C.

Following the above steps, if necessary, it is possible to perform washing and dehydration, drying, and appropriate grinding by a publicly known method. Further, if necessary, the above dried product may be calcined at a higher temperature. The calcination temperature can be appropriately set, for example, preferably at about 300° C. or more and 900° C. or less.

In the above, the method of fixing the extender pigment particles by an inorganic compound has been described, however it is also possible to fix the extender pigment particles by an organic compound. That is, the extender pigment particles and an organic compound (an organic flocculant, an organic coagulant, or the like composed of a polymer compound, such as a cationic polymer, an anionic polymer, and a nonionic polymer) are added to a solvent such as water, and dispersed with a disperser or the like to form a slurry, thereby fixing the extender pigment particles. By doing so, a composite pigment, in which the extender pigment particles is fixed by an organic compound, can be produced.

The composite pigment containing the inorganic color pigment particles according to the present invention can be produced by various known methods, and also granulated, for example, with a granulator, however it is difficult to produce fine composite pigment. To cope with the above, there is a preferred method by which a slurry containing at least inorganic color pigment particles (titanium oxide pigment, or the like), and extender pigment particles, as well as an inorganic compound source and/or an organic compound is prepared, and with stirring at least the inorganic color pigment particles and the extender pigment particles are fixed by the inorganic compound and/or organic compound, so that a fine composite pigment having a median diameter D50 and a diameter on cumulative 90% (D90) within the above ranges can be easily produced.

Specifically, inorganic color pigment particles (titanium oxide pigment, or the like) and extender pigment particles (calcium carbonate, barium sulfate, or the like) and the like, as well as an inorganic compound source are added to a solvent such as water, and dispersed by a disperser or the like to form a slurry.

As inorganic color pigment particles, inorganic color pigment particles containing zinc element may be used. In this regard, "containing zinc element" includes not only a state in which zinc element exists in the particle surface of an inorganic color pigment but also a state in which zinc element is present inside the particle of an inorganic color pigment. An inorganic color pigment containing zinc element may be prepared as follows.

For example, a zinc compound is precipitated on the surface of the inorganic color pigment particles by adjusting the pH of a slurry containing the inorganic color pigment particles and the zinc compound source. As the zinc compound source, one capable of precipitating a desired zinc compound by pH adjustment can be used. For example, by using zinc sulfate heptahydrate, zinc chloride, or the like as the zinc compound source, and adjusting the pH of the slurry to about 8 or more and 8.5 or less, an oxide and/or a hydroxide of zinc can be precipitated on the surface of the inorganic color pigment particles. At this time, an alkali such as sodium hydroxide can be used for pH adjustment.

Also, inorganic color pigment particles having zinc element on the surface of the particle or inside the particle may be prepared by mixing inorganic color pigment particles and a zinc compound, and heating (calcination) this mixture. The addition amount of the zinc compound and the temperature of heating (calcination) may be appropriately set according to the type of the inorganic color pigment and the like.

Further, when a titanium dioxide pigment is used as an inorganic color pigment, a titanium dioxide pigment having a zinc compound on the particle surface may be also prepared as follows. That is, a hydrate of titanium dioxide, and a zinc compound as an additive for calcination are mixed and calcined. The amount of the zinc compound is preferably 0.1% by mass or more and 2.0% by mass or less in terms of ZnO with respect to titanium dioxide. Although the calcination conditions can be set appropriately, the calcination temperature is preferably 800° C. or more and 1000° C. or less. As the additive for calcination, various zinc compounds may be used, but it is preferable to use an oxide and/or hydroxide of zinc.

The "inorganic compound source" means herein a material, which precipitates as an inorganic compound by adjusting the pH of a slurry as described later. Examples of such an inorganic compound source include sodium silicate, sodium aluminate, aluminum sulfate, zirconium sulfate, stannous chloride, and titanium tetrachloride. As the inorganic compound source sodium silicate is preferable, and any of No. 1, No. 2 and No. 3 defined in JIS 1408-1966 can be used, but use of No. 3 is preferable from the viewpoint of availability and handling.

In preparing the slurry, the volume ratio (Va/Vb) of the volume (Va) of the inorganic compound source to the volume (Vb) of the inorganic color pigment particles and the extender pigment particles is preferably set at 0.3 or more and 2 or less. In this case, the volume (Va) of the inorganic compound source means the volume in terms of an inorganic compound to be precipitated as a result of the pH adjustment described later. By adjusting to such a volume ratio, a sufficient fixation effect of the inorganic compound can be obtained, so that the composite pigment can acquire an appropriate size (preferable particle size distribution).

In a case where the inorganic color pigment particles contain zinc element, even when the volume ratio (Va/Vb)

is less than 0.3 (for example, about 0.25), a composite pigment having an appropriate size (preferable particle size distribution) can be obtained.

Subsequently, by adjusting the pH of the slurry, an inorganic compound derived from the inorganic compound source precipitates, and the inorganic color pigment particles and the extender pigment particles are fixed by the inorganic compound. The pH for precipitation of the inorganic compound may be appropriately set according to the extender pigment particles and the inorganic compound source. For example, when calcium carbonate is used as the extender pigment, it is preferable to adjust the pH at about 7.0 or more and 10.0 or less. When barium sulfate is used as the extender pigment, it is preferable to adjust the pH at about 3.0 or more and 10.0 or less. Further, for example, when sodium silicate is used as the inorganic compound source, it is preferable to adjust the pH to 2 or more and 10 or less by adding dilute sulfuric acid. By doing so, it is possible to obtain a composite pigment having an appropriate size (preferable particle size distribution) while reducing the formation of free silica. In the pH adjustment by adding the dilute sulfuric acid, the pH is preferably adjusted into a range of 6 or more and 9 or less, and more preferably adjusted into a range of 7 or more and 8 or less. Further, it is preferable that the inorganic compound is precipitated while heating the slurry and keeping the temperature at about 50° C. or more and 100° C. or less.

After that, if necessary, dehydration and washing, then drying, and optionally grinding are carried out by publicly known methods to produce a composite pigment of the present invention. Further, if necessary, the above dried product may be calcined at a higher temperature. The calcination temperature may be appropriately set, for example, preferably in an approximate range of 300° C. or more and 900° C. or less.

In the foregoing, the specific method of fixing the inorganic color pigment particles and the extender pigment particles by an inorganic compound has been described, but it is also possible to fix the inorganic color pigment particles and the extender pigment particles by an organic compound. More particularly, the extender pigment particles, the inorganic color pigment particles, and an organic compound (an organic flocculant, an organic coagulant, or the like composed of a polymer compound, such as a cationic polymer, an anionic polymer, and a nonionic polymer) are added to a solvent such as water, and dispersed by a dispersing machine such as a disperser to form a slurry, so that the inorganic color pigment particles and the extender pigment particles are fixed. By doing so, a composite pigment in which the inorganic color pigment particles and the extender pigment particles are fixed by the organic compound can be produced.

The composite pigment of the present invention produced by any of various methods described above may be classified for the purpose of removing coarse particles. Classification may be carried out by grinding or sieving. There is no particular restriction on the classification method by grinding, and examples thereof include an atomizer method. Examples of the classification method by sieving include wet classification, and dry classification.

When the composite pigment of the present invention is further surface-treated with an inorganic compound and/or organic compound, the surface treatment may be carried out by a publicly known method such as a wet process or a dry process. At this time, in order not to break the produced composite pigment, it is preferable to avoid a treatment method involving a high torque. For example, in a wet process, a composite pigment of the present invention may be surface-treated with an inorganic compound and/or organic compound by adding water or an organic solvent to a composite pigment of the present invention, and an inorganic compound and/or organic compound, followed by mixing.

The composite pigment of the present invention can be used in various applications. For example, it may be used favorably as a matting agent to be blended in a paint composition for coating building wall surface (exterior, interior, ceiling, floor and bathtub, walls and floors of kitchen, toilet, and the like), for coating building materials, for coating vehicles, for coating furniture, and for coating electromechanical products. Further, the composite pigment of the present invention can be blended as a matting agent in plastic, rubber, latex, elastomer, and the like. In using it as a matting agent, the composite pigment of the present invention itself may be used, or a blend with a conventional matting agent, a color material, an additive, or the like may be used. Further, the composite pigment of the present invention may be blended as an extender, an additive, a filler, an extender pigment, a flowability-imparting agent, a strength enhancing auxiliary material, or an improver for optical properties in various paint compositions, plastic, rubber, latex, elastomer, ceramics, glass, metal, or the like.

A paint composition of the present invention contains the above-described composite pigment and a resin, and if necessary, contains a color material, a dispersant, an additive, a solvent, and the like.

Examples of the resin contained in the paint composition of the present invention include various resins for a paint, such as a phenolic resins, an alkyd resins, an acrylic alkyd resin, an acrylic resin, an acrylic emulsion resin, a polyester resin, a polyester-urethane resin, a polyether resin, a polyolefin resin, a polyurethane resin, an acrylic urethane resin, an epoxy resin, a modified epoxy resin, a silicone resin, an acrylic silicone resin, and a fluorocarbon polymer.

As a color material, a pigment, a dye, and the like may be used. As the pigment to be contained in the paint composition of the present invention, various inorganic pigments (such as titanium dioxide, zinc oxide, basic lead carbonate, lower titanium oxide, titanium oxynitride (titanium black), carbon black, bone black (bone charcoal), graphite, iron black, cobalt chromate black spinel, iron chromate composite oxide, copper chromate spinel black composite oxide, Fe—Mn—Bi black, red iron oxide, molybdenum red, nickel antimony titanium yellow, chrome antimony titanium buff, synthetic iron oxide yellow, chrome yellow, ultramarine blue, iron blue, cobalt blue, cobalt green, chrome green, chromium oxide green, cobalt chromate green spinel, and cobalt titanate green spinel), and various organic pigments (such as lake red 4R, ITR red, naphthol red, pyrazolone orange, pyrazolone red, benzimidazolone orange, watching red, lake red R, bordeaux 10B, bon maroon light, anthraquinone red, dianthraquinone red, anthanthrone red, anthanthrone orange, perylene red, perylene maroon, perylene violet, perinone orange, quinacridone red, quinacridone violet, quinacridone magenta, dimethylmagenta, dichloroquinacridone magenta, dichloromagenta, quinacridone maroon, quinacridone scarlet, diketopyrrolopyrrole, fast yellow, benzimidazolone yellow, diarylide yellow, isoindoline yellow, quinophthalone yellow, phthalocyanine green, chlorinated phthalocyanine green, brominated phthalocyanine green, phthalocyanine blue, threne blue, and dioxazine violet) may be used. As the dye, a basic dye (such as rhodamine, bismarc green, malachite green, and methyl violet), a direct dye (such as congo red, and direct scarlet), an acid dye (such as metanil yellow, nigrosine, and acid fast red), a metal complex dye, an oil-soluble dye, and the like may be used. At least one selected from these color materials may be used.

Further, a transparent (translucent) matting paint is prepared, if a color material is not blended in a paint composition. Such a transparent (translucent) matting paint may be used as a topcoat, which is coated on a base layer (a layer formed by coating a color gloss paint, or a pearl paint to a substrate) in the application field of vehicles, or the like.

Examples of an additive contained in the paint composition of the present invention include various kinds of commonly used emulsifiers, antifreezing agents, pH adjusters, thickeners, and defoaming agents. Examples of a solvent include water, toluene, xylene, mineral spirit, acetone, methyl ethyl ketone, methanol, butanol, ethyl acetate, amine acetate, and ethylene glycol. A dispersant is appropriately selected according to the type of an inorganic compound having been used for synthesizing the composite pigment. For example, since silica is present on the surface of the composite pigment when silica is used as the inorganic compound, the surface is slightly acidic. In this case, it is more preferable to use a dispersant having a certain amine value as the dispersant. Specifically, there are "DISPERBYK (registered trademark)-183", "DISPERBYK (registered trademark)-184", "DISPERBYK (registered trademark)-185" manufactured by BYK Additives & Instruments, and the like.

When the paint composition of the present invention is processed to a matting paint by adding a composite pigment of the present invention to a gloss paint or otherwise, the addition amount of the composite pigment is preferably adjusted in a range of 0.1% by mass or more and 10% by mass or less, and further preferably at 1% by mass or more and 5% by mass or less.

In a case where a matting paint for a transparent (translucent) topcoat is prepared by adding a color material at a minimal content, or adding no color material, the pigment volume concentration (PVC) of the composite pigment is preferably adjusted in a range of 5% or more and 40% or less, more preferably in a range of 10% or more and 30% or less, and further preferably in a range of 15% or more and 25% or less. By adjusting in such a range, it is possible to prepare a matting paint for a topcoat, which can sufficiently reduce a gloss, while keeping color of the base layer.

The composite pigment containing the inorganic color pigment particles of the present invention can be used in various applications as a color pigment (matting pigment) having low-gloss property (matte effect). For example, it may be used favorably as a matting pigment to be blended in a paint composition for coating building wall surface (exterior, interior, ceiling, floor and bathtub, walls and floors of kitchen, toilet, and the like), for coating building materials, for coating automobiles, for coating furniture, and for coating electromechanical products. Such a matting pigment may be used as blended in various paints in place of so-called matting agent (a component for developing a matte effect to be added into a paint separately from the color material).

The paint composition of the present invention contains the composite pigment and/or the matting pigment, and the resin, as well as, if necessary, also the additive, solvent, dispersant, or the like.

When the composite pigment of the present invention contains the inorganic color pigment particles, it functions by itself also as a color material. Therefore, when a paint composition of the present invention is prepared, it is not necessary to add separately a color material, but it is also possible to add a color material separately in addition to the composite pigment. As the color material, the above-mentioned common pigments, dyes and the like may be used.

The pigment volume concentration (PVC) of the paint composition of the present invention is preferably adjusted in a range of 10% or more and 60% or less. When importance is attached to reduction of the gloss of a paint film, it is more preferable to adjust the pigment volume concentration in the lower side of the above range, namely in a range of 20% or more and 40% or less, and further preferably in a range of 30% or more and 40% or less. Further, when importance is attached to the hiding power of a paint film, it is more preferable to adjust the pigment volume concentration in the upper side of the above range, namely in a range of 50% or more and 60% or less.

The composite pigment and the resin, and if necessary the above-mentioned dispersant, additive, solvent, color material, and the like are stirred with a dispersing machine, and if necessary degassing is performed, to prepare a paint composition of the present invention.

A paint film of the present invention is formed by coating the aforedescribed paint composition onto an object and curing it. That is, a paint film of the present invention may be obtained by coating the aforedescribed paint composition onto an object using a brush, a wool roller, or the like, followed by drying. Examples of the object include building materials (concrete, mortar, gypsum, plaster, plastic, glass, earthenware, stone, wood, and the like), a vehicle main body (metallic, or plastic), furniture and electromechanical products (plastic, glass, earthenware, stone-made, wooden, and the like). The object may be coated in advance with a paint composition different from the paint composition of the present invention (gloss paint, pearl paint, or the like).

EXAMPLES

Hereinafter, the present invention (the first invention of the present application to the fifth invention of the present application) will be described in detail in accordance with Examples and Comparative Examples, but the present invention is not limited to the Examples.

Examples of the Invention (the First Invention of the Present Application)

Example 1-1

135 g of barium sulfate (TS-2 manufactured by Takehara Kagaku Kogyo Co., Ltd., average primary particle diameter: 0.3 μm) was dispersed in 705 g of pure water, 231 g of No. 3 sodium silicate aqueous solution was added, and the resulting mixture was mixed to prepare a barium sulfate slurry containing sodium silicate. The volume ratio (Va/Vb) of a volume Va of sodium silicate (in terms of $SiO_2$) to a volume Vb of barium sulfate in the slurry was 1. The solution was put in a reaction vessel equipped with a stirrer and a thermometer, and was heated to 75° C. with stirring. While the liquid temperature was kept at 75° C., 2.0% by mass sulfuric acid was added over 3 hours using a microtube pump (MP-2001 manufactured by Tokyo Rikakikai Co., Ltd.), so that the solution had a pH of 7.5. Subsequently, the solution was aged for 1 hour to obtain aggregates of barium sulfate with silica as a binder in a solution. Further, the solution was filtered using No. 2 filter paper, and solids remaining on the filter paper were washed with water, and filtered to obtain a wet filter cake of the aggregates. The obtained wet filter cake was heated and dried for 16 hours in a drier set at 120° C. The thus-obtained dry powder of the aggregates was subjected to dry grinding using a grinder (Stud Mill 63Z manufactured by Makino Mfg. Co., Ltd.), and then classified (rotation speed: 3600 rpm, air flow: 1.5 m³/minute) by a classifier (TC-15M manufactured by Hosokawa Micron Corporation) to obtain a composite pigment in which barium sulfate was fixed with silica. FIG. 1 shows an electron microscope photograph of the composite pigment of Example 1-1.

Example 1-2

Figure 2:
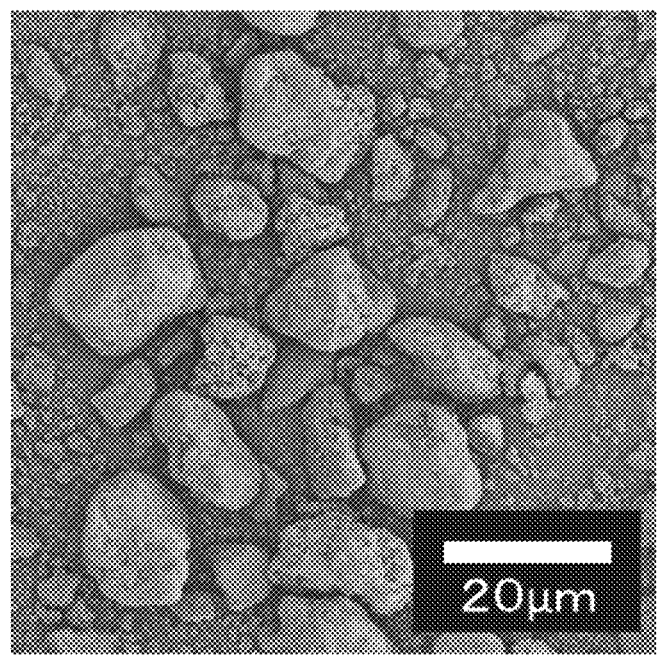
FIG. 2 is an electron microscope photograph of a composite pigment in Example 1-2 of the present invention.

As compared to Example 1-1 described above, the amount of a silica source added was larger. Specifically, the amount of pure water used was changed to 540 g, and the amount of No. 3 sodium silicate aqueous solution added was changed to 462 g, so that a slurry was prepared in which the volume ratio (Va/Vb) of sodium silicate (in terms of $SiO_2$) to barium sulfate was 2. Except for the above, the same procedure as in Example 1-1 was carried out to obtain a composite pigment in which barium sulfate was fixed with silica. FIG. 2 shows an electron microscope photograph of the composite pigment of Example 1-2.

Example 1-3

Figure 3:
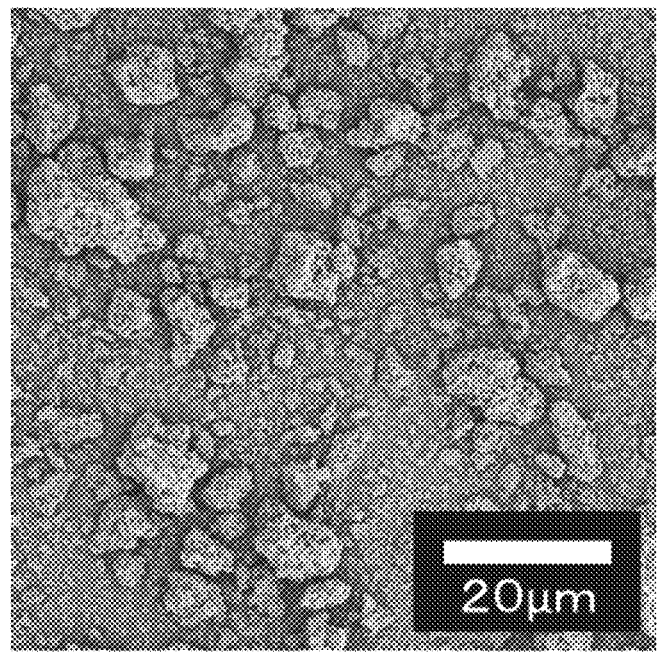
FIG. 3 is an electron microscope photograph of a composite pigment in Example 1-3 of the present invention.

As compared to Example 1-1 described above, the amount of a silica source added was smaller. Specifically, the amount of pure water used was changed to 788 g, and the amount of No. 3 sodium silicate aqueous solution added was changed to 116 g, so that a slurry was prepared in which the volume ratio (Va/Vb) of sodium silicate (in terms of $SiO_2$) to barium sulfate was 0.5. Except for the above, the same procedure as in Example 1-1 was carried out to obtain a composite pigment in which barium sulfate was fixed with silica. FIG. 3 shows an electron microscope photograph of the composite pigment of Example 1-3.

Example 1-4

Figure 4:
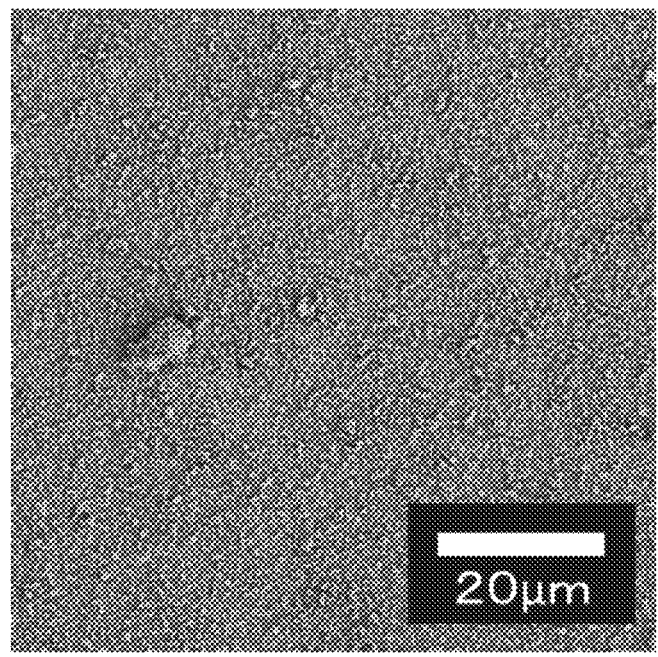
FIG. 4 is an electron microscope photograph of a composite pigment in Example 1-4 of the present invention.

As compared to Example 1-1 described above, the amount of a silica source added was smaller, and even smaller than that in Example 1-3. Specifically, the amount of pure water used was changed to 829 g, and the amount of No. 3 sodium silicate aqueous solution added was changed to 58 g, so that a slurry was prepared in which the volume ratio (Va/Vb) of sodium silicate (in terms of $SiO_2$) to barium sulfate was 0.25. Except for the above, the same procedure as in Example 1-1 was carried out to obtain a composite pigment in which barium sulfate was fixed with silica. FIG. 4 shows an electron microscope photograph of the composite pigment of Example 1-4.

(Evaluation of Physical Properties of Powder)

For the composite pigments of the various Examples, various powder physical properties (particle size distribution, specific surface area and oil absorption) were measured. The results thereof are shown in Table 1-1. Table 1-1 also shows the powder physical properties of extender pigments that are commonly used as a matting agent, a silica matting agent, and a resin bead matting agent. Specifically, Table 1-1 shows the results of measurement of various powder physical properties for barium sulfate (W-1 manufactured by Takehara Kagaku Kogyo Co., Ltd., average particle diameter: 1.5 μm) in Comparative Example 1-1, barium sulfate (W-6 manufactured by Takehara Kagaku Kogyo Co., Ltd., average particle diameter: 4.5 μm) in Comparative Example 1-2, barium sulfate (W-10 manufactured by Takehara Kagaku Kogyo Co., Ltd., average particle diameter: 10 μm) in Comparative Example 1-3, silica (Sylysia 276 manufactured by Fuji Silysia Chemical Ltd., average particle diameter: 7 μm) in Comparative Example 1-4, and resin beads (ART PEARL G-800 manufactured by Negami Chemical Industrial Co., Ltd., average particle diameter: 6 μm) in Comparative Example 1-5.

The methods for measurement of various powder physical properties are as follows. In the measurement methods described below, the "sample" refers to a composite pigment in each of the Examples or a matting agent in each of the Comparative Examples.

(Measurement of Particle Size Distribution)

A particle size distribution was measured using a laser diffraction/scattering-type particle size distribution measuring apparatus (LA-910 manufactured by HORIBA, Ltd.). Specifically, an aqueous solution in which 0.3% by mass of sodium hexametaphosphate was dissolved was prepared as a dispersion medium, each sample was mixed in the aqueous solution, the resulting mixture was circulated and stirred in the apparatus, and simultaneously irradiated with an ultrasonic wave for 3 minutes to sufficiently disperse the sample, and adjustment was performed so that the transmittance of laser light was 73±3%, followed by measuring a particle size distribution on the volume basis. Here, the relative refractive index (complex refractive index) was set to 1.6-0.00i for the Examples and Comparative Examples 1-1 to 1-3, and 1.5-0.00i for Comparative Examples 1-4 and 1-5, and the number of captures was 10.

Figure 5:
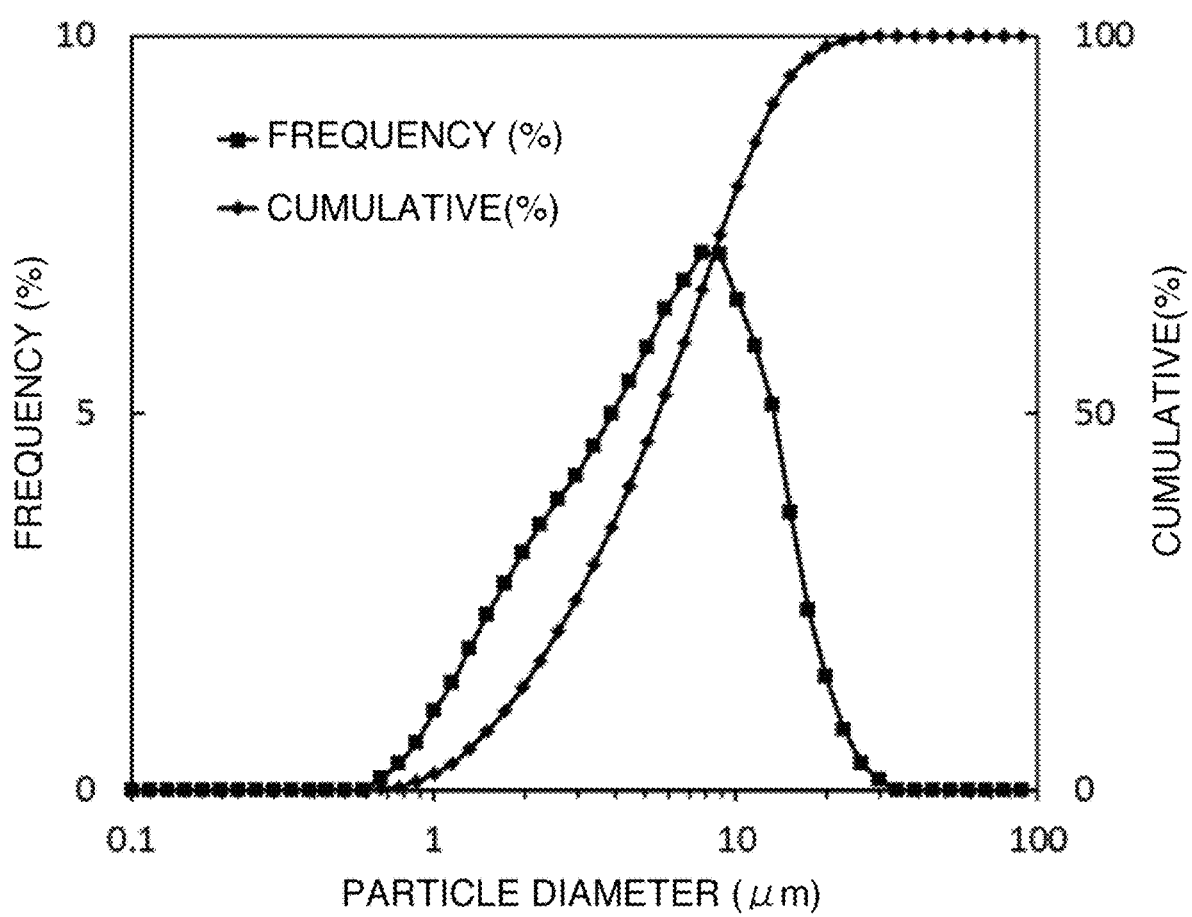
FIG. 5 is a volume cumulative particle size distribution diagram of the composite pigment in Example 1-1 of the present invention.

From the particle size distribution data obtained in this manner, the particle size distribution was expressed as a cumulative distribution, and the particle diameter at cumulative 50% was defined as a diameter on cumulative 50% (D50). Similarly, the particle diameter at cumulative 10% was defined as a cumulative 10% diameter (D10), and the particle diameter at cumulative 90% was defined as a diameter on cumulative 90% (D90). In FIG. 5, a volume cumulative particle size distribution diagram for the composite pigment of Example 1-1 is shown as a representative of the various Examples.

(Measurement of Specific Surface Area)

A BET specific surface area was measured by a nitrogen adsorption method using a BET specific surface area measuring apparatus "MONOSORB" (manufactured by Yuasa-Ionics Co., Ltd.).

(Measurement of Oil Absorption)

Measurement was performed in accordance with Pigment Test Method JIS-K5101-13-1: 2004. Specifically, 5 g of a sample was put on a smooth glass plate, boiled linseed oil was dropped from a burette, and the resulting mixture was generally kneaded with a pallet knife at all such times. The dropping and the kneading were repeated, and a point at which it was possible to wind the mixture in a spiral form using the pallet knife was defined as an end point. The amount of boiled linseed oil absorbed in each sample was divided by the mass of the sample to calculate an oil absorption. In Table 1-1, the oil absorption is expressed in a unit of ml/100 g.

TABLE 1-1

| | Particle size distribution | | | Specific surface area ($m^2/g$) | Oil absorption (ml/100 g) |
|---|---|---|---|---|---|
| | D10 (μm) | D50 (μm) | D90 (μm) | | |
| Example 1-1 | 1.7 | 5.6 | 12.9 | 63.9 | 53 |
| Example 1-2 | 2.4 | 8.4 | 19.1 | 64.2 | 86 |
| Example 1-3 | 1.5 | 4.5 | 10.8 | 55.1 | 47 |

TABLE 1-1-continued

| | Particle size distribution | | | Specific surface area ($m^2/g$) | Oil absorption (ml/100 g) |
|---|---|---|---|---|---|
| | D10 (μm) | D50 (μm) | D90 (μm) | | |
| Example1-4 | 0.8 | 1.3 | 2.3 | 9.2 | —(Not measured) |
| Comparative Example 1-1 | 1.3 | 3.0 | 9.4 | 1.7 | 10 |
| Comparative Example 1-2 | 2.0 | 4.7 | 12.9 | 0.7 | 10 |
| Comparative Example 1-3 | 2.2 | 9.4 | 23.3 | 0.8 | 10 |
| Comparative Example 1-4 | 4.3 | 7.4 | 12.2 | 191.6 | 180 |
| Comparative Example 1-5 | 3.0 | 7.4 | 13.5 | 3.5 | 36 |

(Preparation of Paint Composition)

A transparent matting paint composition was prepared using the composite pigment in each of the above Examples and the matting agent in each of the above Comparative Examples. The pigment volume concentration (PVC) of the paint composition was set to 20%, and the solid volume concentration (SVC) of the paint composition was set to 30%. Specifically, raw materials were blended at a ratio in Table 1-2 below, and the resulting mixture was stirred for 5 minutes using a dispersing machine (T.K. ROBOMIX manufactured by Tokushu Kika Kogyo Co., Ltd., rotation speed: 3000 rpm), and then defoamed by a hybrid mixer (HM-500 manufactured by KEYENCE CORPORATION) to obtain a transparent matting paint composition.

For the transparent matting paint compositions in Examples 1-1 to 1-4 and Comparative Examples 1-1 to 1-5, the samples of the corresponding Examples and Comparative Examples were used, respectively, as matting agents. In addition, for the transparent matting paint composition in Comparative Example 1-6, a mixture of the barium sulfate matting agent in Comparative Example 1-1 and the silica matting agent in Comparative Example 1-4 at a volume ratio of 1:1 was used as a matting agent. For the transparent matting paint composition in Comparative Example 1-7, a mixture of the barium sulfate matting agent in Comparative Example 1-2 and the silica matting agent in Comparative Example 1-4 at a volume ratio of 1:1 was used as a matting agent. For the transparent matting paint composition in Comparative Example 1-8, a mixture of the barium sulfate matting agent in Comparative Example 1-3 and the silica matting agent in Comparative Example 1-4 at a volume ratio of 1:1 was used as a matting agent.

TABLE 1-2

| | | Examples 1-1~1-4, Comparative Examples 1-6~1-8 | Comparative Example 1-1~1-3 | Comparative Example 1-4 | Comparative Example 1-5 |
|---|---|---|---|---|---|
| Resin | Acrylic emulsion resin, PRIMAL AC-2235 manufactured by Rohm and Haas Japan K.K. | 43.5 parts by mass | 40.7 parts by mass | 46.4 parts by mass | 49.3 parts by mass |
| Dispersant | DISPERBYK-184 manufactured by BYK Additives & Instruments (amine value: 15 mg KOH/g) | 0.5 parts by mass | 0.7 parts by mass | 0.4 parts by mass | 0.2 parts by mass |
| Pure water | | 7.8 parts by mass | 7.5 parts by mass | 8.1 parts by mass | 8.4 parts by mass |
| Emulsifier | TRITON CF-10 manufactured by Dow Chemical Company | 0.8 parts by mass | 0.8 parts by mass | 0.9 parts by mass | 0.9 parts by mass |
| Antifreezing Agent | Ethylene glycol manufactured by Kanto Chemical Co., Inc. | 7.1 parts by mass | 6.7 parts by mass | 7.6 parts by mass | 8.1 parts by mass |
| pH adjuster | 28% ammonia aqueous solution | 0.2 parts by mass | 0.2 parts by mass | 0.2 parts by mass | 0.3 parts by mass |
| Thickener | 2% CELLOSIZE aqueous solution manufactured by Dow Chemical Company | 22.4 parts by mass | 21.0 parts by mass | 23.9 parts by mass | 25.4 parts by mass |
| Defoaming Agent | ADEKANATE B-748A manufactured by ADEKA CORPORATION | 0.1 parts by mass | 0.1 parts by mass | 0.2 parts by mass | 0.2 parts by mass |
| Sample | | 17.6 parts by mass | 22.3 parts by mass | 12.3 parts by mass | 7.2 parts by mass |

(Measurement of Viscosity of Paint)

For the transparent matting paint composition in each of the Examples and Comparative Examples, a viscosity was measured using a Brookfield B-type rotary viscometer (TVB-10 Viscometer manufactured by Toki Sangyo Co., Ltd.). The measurement results are shown in Table 1-3. The measurement was performed under the following conditions. The paint composition was put in a 50 ml graduated cylinder, and the viscosity was measured at each of the rotation speeds (6 rpm and 60 rpm).
Rotor: TM4
Measurement temperature: 25° C.

TABLE 1-3

|  | Viscosity (Pa · s) | |
| --- | --- | --- |
|  | 6 rpm | 60 rpm |
| Example 1-1 | 8.9 | 1.7 |
| Example 1-2 | 17.2 | 3.2 |
| Example 1-3 | 10.6 | 2.1 |
| Example 1-4 | 9.4 | 1.9 |
| Comparative Example 1-1 | 5.3 | 1.1 |
| Comparative Example 1-2 | 4.9 | 1.1 |
| Comparative Example 1-3 | 4.4 | 0.9 |
| Comparative Example 1-4 | 30.7 | 5.7 |
| Comparative Example 1-5 | 5.0 | 1.0 |
| Comparative Example 1-6 | 12.5 | 2.5 |
| Comparative Example 1-7 | 12.2 | 2.4 |
| Comparative Example 1-8 | 12.6 | 2.6 |

The paint composition in each of the various Examples had a viscosity lower than that of the paint composition in Comparative Example 1-4 using silica as a matting agent, and exhibited good handling. The viscosity (handling) of the paint composition in each of the Examples was equal to or lower than the viscosity (handling) of the paint composition (in each of Comparative Examples 1-6 to 1-8) using a mixture of silica and barium sulfate as a matting agent, and the paint composition in each of the Examples attained low viscosity (high handling) substantially comparable to that of the paint composition (in each of Comparative Examples 1-1 to 1-3 and 1-5) using an extender pigment (barium sulfate), resin beads or the like as a matting agent.

(Evaluation of Physical Properties of Paint Film)

For the transparent matting paint composition in each of the Examples and Comparative Examples, the physical properties of a paint film were evaluated. The results thereof are shown in Table 1-4. Methods for measurement of various physical properties of a paint film are as follows.

(Measurement of Gloss)

The gloss of a paint film obtained by applying and drying the transparent matting paint composition in each of the above Examples and Comparative Examples was measured in accordance with JIS K5600-4-7: 1999. First, using a four-mill film applicator, the transparent matting paint composition was applied onto a glass plate in such a manner that the thickness was about 40 μm. The applied composition was dried, and a specular gloss was then measured at each of 20°, 60° and 85° using a glossmeter (haze-gloss meter manufactured by BYK-Gardner GmbH).

(Measurement of Hiding Power)

The hiding power of a paint film obtained by applying and drying the transparent matting paint composition in each of the above Examples and Comparative Examples was measured in accordance with JIS K5600-4-1: 1999. First, using a four-mill film applicator, the paint composition was applied onto a test paper for the hiding power in such a manner that the thickness was about 40 μm. The applied composition was dried, and a $Y_b$ value (Y value of black part) and a $Y_w$ value (Y value of white part) were then measured using a spectral colorimeter (SD 5000 manufactured by Nippon Denshoku Industries Co., Ltd.). From the $Y_b$ value and the $Y_w$ value, a hiding power (thereinafter, referred to as C.R.) was calculated in accordance with the following equation.

$$C.R.\ (\%) = Y_b\ \text{value}/Y_w\ \text{value} \times 100$$

TABLE 1-4

|  | Gloss | | | Hiding power | | C.R. |
| --- | --- | --- | --- | --- | --- | --- |
|  | 20° | 60° | 85° | Yb | Yw | (%) |
| Example 1-1 | 0.5 | 5.0 | 4.8 | 6.8 | 81.3 | 8.3 |
| Example 1-2 | 0.4 | 3.0 | 2.7 | 10.6 | 80.9 | 13.0 |
| Example 1-3 | 0.5 | 3.3 | 5.1 | 9.5 | 81.1 | 11.7 |
| Example 1-4 | 0.5 | 4.1 | 40.7 | 7.0 | 81.6 | 8.6 |
| Comparative Example 1-1 | 1.5 | 16.7 | 30.8 | 4.6 | 80.1 | 5.7 |
| Comparative Example 1-2 | 0.8 | 9.4 | 10.6 | 5.0 | 80.9 | 6.1 |
| Comparative Example 1-3 | 1.2 | 13.0 | 11.0 | 4.8 | 80.9 | 5.9 |
| Comparative Example 1-4 | 0.4 | 3.3 | 6.1 | 9.4 | 81.2 | 11.6 |
| Comparative Example 1-5 | 1.5 | 13.8 | 6.6 | 4.3 | 81.4 | 5.3 |
| Comparative Example 1-6 | 0.4 | 5.5 | 5.9 | 5.5 | 80.8 | 6.8 |
| Comparative Example 1-7 | 0.4 | 5.8 | 6.3 | 5.2 | 81.3 | 6.4 |
| Comparative Example 1-8 | 0.5 | 6.9 | 5.9 | 5.2 | 81.4 | 6.4 |

As compared to the paint films of the transparent matting paint compositions in Comparative Examples 1-1 to 1-3 (matting agents of barium sulfate), Comparative Example 1-5 (matting agent of resin beads) and Comparative Examples 1-6 to 1-8 (mixed matting agents of barium sulfate and silica), the paint film of the transparent matting paint composition in each of the Examples had a smaller specular gloss at 20° and 60°, and apparently reduced gloss, and exhibited a sufficient matte effect. The low-gloss property (matte effect) in each of the Examples was comparable to that in Comparative Example 1-4 with a high matte effect, and a gloss was reduced even to the degree of a gloss reduction referred to as "matting (specular gloss of 5% or less at 60°)" over the degree of a gloss reduction generally referred to as "70% gloss", "50% gloss" or "30% gloss".

In addition, in the paint films of the transparent matting paint compositions in Examples 1-1 to 1-3, the specular gloss at 85° was reduced to 10% or less, and so-called 85° gloss was sufficiently reduced.

Further, the paint films of the transparent matting paint compositions in the Examples had substantially the same hiding power as in the Comparative Examples, and maintained a low hiding power. Such transparent matting paint compositions do not hinder color of the base layer even when applied onto a color base layer, and is therefore appropriate as a topcoat matting paint composition which is applied onto the color base layer.

(Evaluation of Uneven Loss of Gloss of Paint Film)

Uneven loss of gloss of the paint film obtained by applying and drying the transparent matting paint composition in each of the above Examples and Comparative Examples was evaluated in the following manner. The specular gloss (20°, 60° and 85°) at each of five arbitrary spots was measured for the paint film used for measurement of the gloss. A standard deviation for the five spots was calculated. The calculation results are shown in Table 1-5.

TABLE 1-5

| | Uneven loss of gloss | | |
|---|---|---|---|
| | 20° | 60° | 85° |
| Example 1-1 | 0.0 | 0.3 | 0.1 |
| Example 1-2 | 0.1 | 0.5 | 0.1 |
| Example 1-3 | 0.1 | 0.3 | 0.3 |
| Example 1-4 | 0.1 | 0.6 | 1.7 |
| Comparative Example 1-1 | 0.1 | 1.4 | 1.4 |
| Comparative Example 1-2 | 0.0 | 0.4 | 1.1 |
| Comparative Example 1-3 | 0.2 | 0.5 | 2.0 |
| Comparative Example 1-4 | 0.1 | 0.4 | 0.5 |
| Comparative Example 1-5 | 0.0 | 0.3 | 0.2 |
| Comparative Example 1-6 | 0.1 | 0.7 | 0.2 |
| Comparative Example 1-7 | 0.1 | 1.3 | 0.1 |
| Comparative Example 1-8 | 0.1 | 0.6 | 0.1 |

The values of the specular gloss (20°, 60° and 85°) in Table 1-5 generally correlated with impressions of appearance (uneven loss of gloss) of the actual paint films, and uneven loss of gloss of the paint film tended to increase as the numerical value of the standard deviation became larger. Specifically, the paint films in Comparative Examples 1-1 to 1-3, which contained barium sulfate alone, had noticeable uneven loss of gloss of the paint film. On the other hand, as is the case with the paint films in the other Comparative Examples, the paint films in Examples 1-1 to 1-4 had no uneven loss of gloss, and confirmed to uniformly have a reduced gloss at every location on the paint film.

(Evaluation of Tactile Feeling of Paint Film)

For the paint film obtained by applying and drying the paint composition in each of the Examples and Comparative Examples, smoothness of tactile feeling was evaluated.

For quantifying the tactile feeling of the paint film as objective data, a friction coefficient was measured. Specifically, using a four-mill film applicator, the paint composition was applied onto a glass plate in such a manner that the thickness was about 40 The applied composition was dried, and an MMD (mean friction coefficient variation) was then measured using a friction feeling tester (KES-SE manufactured by Kato Tech Co., Ltd.). The MMD (mean friction coefficient variation) is used as an index indicating a feeling of roughness of the paint film. The measurement results are shown in Table 1-6. In Table 1-6, tactile feeling at the time of actually touching the paint film with a finger is shown in three grades (○: smooth tactile feeling, Δ: rough tactile feeling, X: highly rough tactile feeling) along with the value of the aforementioned MMD.

TABLE 1-6

| | MMD | Tactile feeling |
|---|---|---|
| Example 1-1 | 0.0105 | ○ |
| Example 1-2 | 0.0100 | ○ |
| Example 1-3 | 0.0070 | ○ |
| Example 1-4 | 0.0066 | ○ |
| Comparative Example 1-1 | 0.0285 | X |
| Comparative Example 1-2 | 0.0207 | Δ |
| Comparative Example 1-3 | 0.0664 | X |
| Comparative Example 1-4 | 0.0190 | ○ |
| Comparative Example 1-5 | 0.0075 | ○ |
| Comparative Example 1-6 | 0.0291 | Δ |
| Comparative Example 1-7 | 0.0202 | Δ |
| Comparative Example 1-8 | 0.0262 | Δ |

All the paint films of the paint compositions in the various Examples had a better (smoother) tactile feeling as compared to the paint films in the Comparative Examples (Comparative Examples 1-1 to 1-3 and Comparative Examples 1-6 to 1-8), which contained an extender pigment (barium sulfate). The degree of the smoothness was equal to or greater than that of a paint film having a smooth tactile feeling in general like the paint films which contained silica or resin beads as a matting agent (in Comparative Examples 1-4 and 1-5).

As described above, paint compositions and paint films containing the composite pigment in these Examples are excellent in that they maintain good handling, has a low-gloss property (matte effect), and can attain a good tactile feeling of the paint film.

Examples of the Present Invention (the Second Invention of the Present Application)

Example 2-1

Figure 6:
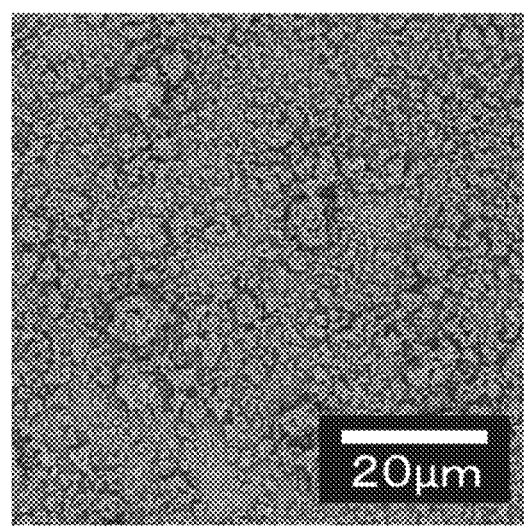
FIG. 6 is an electron microscope photograph of a composite pigment in Example 2-1 of the second invention of the present application.
Figure 7:
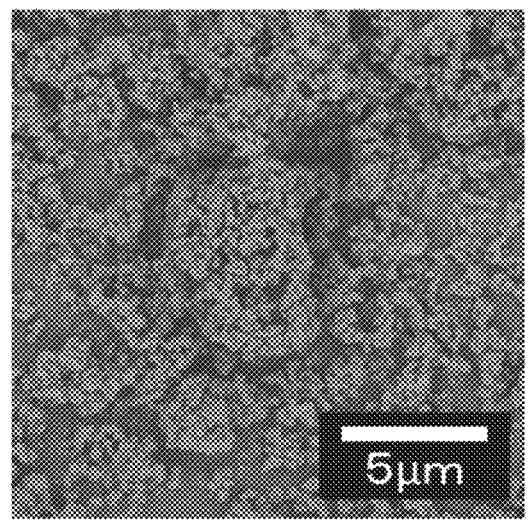
FIG. 7 is an electron microscope photograph (enlarged view) of the composite pigment in Example 2-1 of the second invention of the present application.
Figure 32:
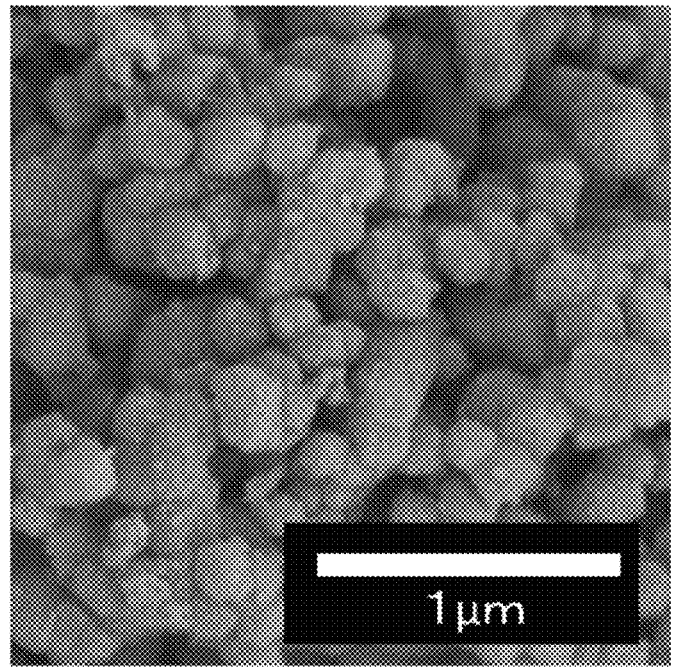
FIG. 32 is an electron microscope photograph (high-magnification enlarged view) of the composite pigment in Example 2-1 of the second invention of the present application.

129 g of a titanium dioxide pigment (manufactured by Ishihara Sangyo Kaisha, Ltd., average primary particle diameter: 0.24 μm) and 82.8 g of a precipitated (synthesized) calcium carbonate (extender pigment, Brilliant-1500, manufactured by Shiraishi Calcium Kaisha, Ltd., average primary particle diameter: 0.15 μm) were dispersed in 819.6 g of pure water. 116.4 g of a No. 3 sodium silicate aqueous solution was added to the solution and mixed to prepare a sodium silicate solution containing the titanium dioxide pigment and calcium carbonate. The solution was charged in a reaction vessel equipped with a stirrer and a thermometer, and heated up to 75° C. under stirring. While the solution temperature was held at 75° C., a sulfuric acid of 1.8% by mass was added over 3 hours by using a microtube pump (MP-2001 manufactured by Tokyo Rikakikai Co., Ltd.) to make pH of the solution to be 7.0 to 7.5. Thereafter, the solution was aged for 1 hour to thereby obtain a composite pigment of titanium dioxide and calcium carbonate with silica as a binder in the solution. The solution was filtered by using a No. 2 filter paper, and solids remaining on the filter paper were washed with water, and again filtered to thereby obtain a wet filter cake of the above composite pigment. The obtained wet filter cake was heated and dried for 16 hours in a drier set at 120° C. The thus-obtained dry powder of the composite pigment was dry ground by using a grinder (Stud Mill 63Z manufactured by Makino Mfg. Co., Ltd.), and thereafter classified (rotation speed: 3,600 rpm, air flow: 1.5 m³/min) by using a classifier (TC-15M manufactured by Hosokawa Micron Corporation) to obtain a composite pigment. An electron microscope photograph of the composite pigment of Example 2-1 is shown in FIG. 6, and an enlarged view of FIG. 6 is shown in FIG. 7. A higher-magnification enlarged view of FIG. 7 is shown in FIG. 32.

Example 2-2

Figure 8:
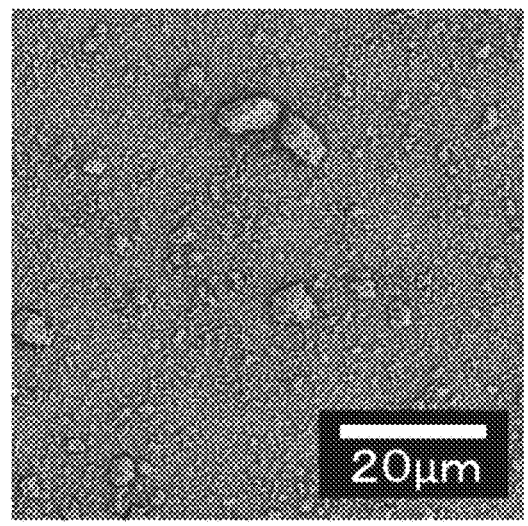
FIG. 8 is an electron microscope photograph of a composite pigment in Example 2-2 of the second invention of the present application.

A composite pigment of titanium dioxide and calcium carbonate with silica as a binder was obtained by the same procedure as in Example 2-1 described above, except for changing the amount of calcium carbonate used to 165.6 g. An electron microscope photograph of the composite pigment of Example 2-2 is shown in FIG. 8.

Example 2-3

A composite pigment of titanium dioxide and calcium carbonate with silica as a binder was obtained by the same procedure as in Example 2-1 described above, except for changing the amount of calcium carbonate used to 41.4 g.

Figure 9:
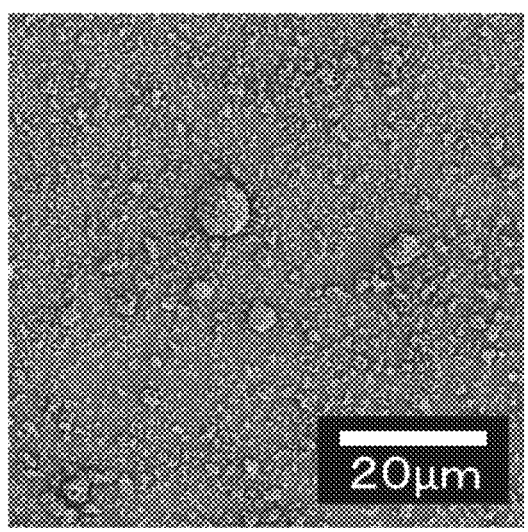
FIG. 9 is an electron microscope photograph of a composite pigment in Example 2-3 of the second invention of the present application.

An electron microscope photograph of the composite pigment of Example 2-3 is shown in FIG. 9.

Example 2-4

Figure 10:
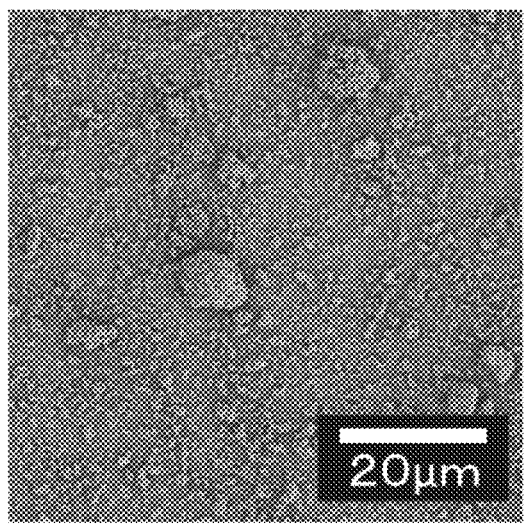
FIG. 10 is an electron microscope photograph of a composite pigment in Example 2-4 of the second invention of the present application.

A composite pigment of titanium dioxide and calcium carbonate with silica as a binder was obtained by the same procedure as in Example 2-1 described above, except for changing the amount of pure water used to 733.7 g and the amount of the sodium silicate aqueous solution used to 232.8 g. An electron microscope photograph of the composite pigment of Example 2-4 is shown in FIG. 10.

Example 2-5

Figure 11:
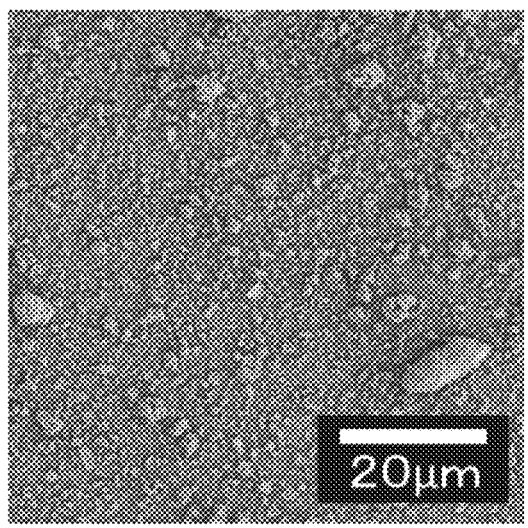
FIG. 11 is an electron microscope photograph of a composite pigment in Example 2-5 of the second invention of the present application.

A composite pigment of silica, titanium dioxide and calcium carbonate was obtained in a solution by the same procedure as in Example 2-1 described above, and thereafter, 21.8 ml of a sodium aluminate aqueous solution (300 g/L) was added to the solution by using a microtube pump (MP-2001 manufactured by Tokyo Rikakikai Co., Ltd.). At this time, sulfuric acid was simultaneously added to hold pH of the solution at 7.0 to 7.5. Thereafter, the solution was aged for 30 min to thereby obtain, in the solution, a composite pigment which consists of silica, titanium dioxide and calcium carbonate and has a cover layer of alumina formed on its surface. The solution was further filtered by using a No. 2 filter paper, and solids remaining on the filter paper were washed with water, and again filtered to thereby obtain a wet filter cake of the above composite pigment. The obtained wet filter cake was heated and dried for 16 hours in a drier set at 120° C. The thus-obtained dry powder of the composite pigment was dry ground by using a grinder (Stud Mill 63Z manufactured by Makino Mfg. Co., Ltd.), and thereafter classified (rotation speed: 3,600 rpm, air flow: 1.5 m³/min) by using a classifier (TC-15M manufactured by Hosokawa Micron Corporation) to obtain a composite pigment. An electron microscope photograph of the composite pigment of Example 2-5 is shown in FIG. 11.

Example 2-6

Figure 12:
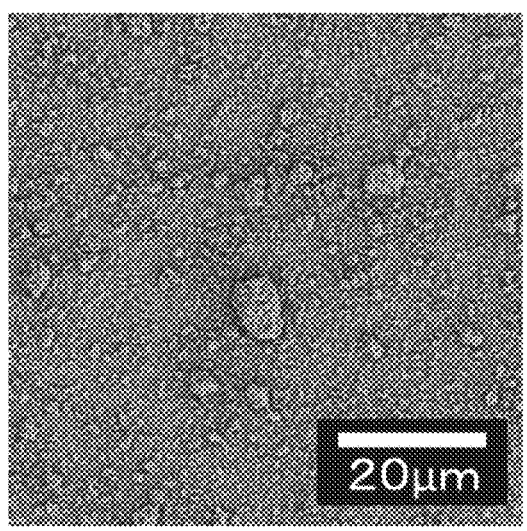
FIG. 12 is an electron microscope photograph of a composite pigment in Example 2-6 of the second invention of the present application.

5 g of the composite pigment obtained in Example 2-1, 195 g of toluene (manufactured by Kanto Chemical Co., Inc.) and 50 g of a silicone resin (KR-251 manufactured by Shin-Etsu Chemical Co., Ltd.) were charged in a reaction vessel, and stirred for 10 min by a paint shaker. After the finish of the stirring, the resultant solution was treated by a high-speed refrigerated centrifuge (CR21GII manufactured by Hitachi, Ltd., rotation speed: 7,500 rpm) for 5 min to remove separated toluene, and heated and dried for 16 hours in a drier set at 120° C. There was thus obtained a composite pigment of silica, titanium dioxide and calcium carbonate, whose surface was covered with the silicone resin. An electron microscope photograph of the composite pigment of Example 2-6 is shown in FIG. 12.

Example 2-7

Figure 13:
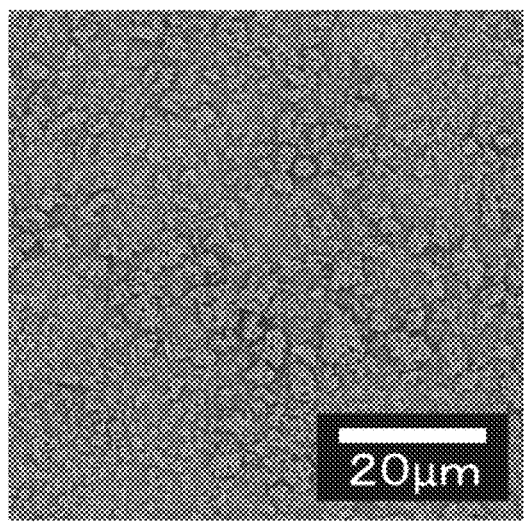
FIG. 13 is an electron microscope photograph of a composite pigment in Example 2-7 of the second invention of the present application.

A composite pigment of titanium dioxide and barium sulfate with silica as a binder was obtained by the same procedure as in Example 2-1 described above, except for using 138.4 g of a barium sulfate (extender pigment, TS-2, manufactured by Takehara Kagaku Kogyo Co., Ltd., average primary particle diameter: 0.31 μm) in place of calcium carbonate in Example 2-1. An electron microscope photograph of the composite pigment of Example 2-7 is shown in FIG. 13.

Comparative Example 2-1

Figure 14:
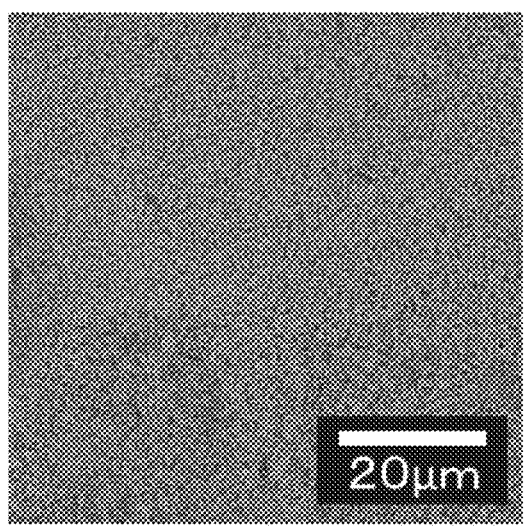
FIG. 14 is an electron microscope photograph of mixed powder of titanium dioxide and calcium carbonate in Comparative Example 2-1 of the second invention of the present application.

A mixed powder was obtained by mixing titanium oxide and calcium carbonate in the same ratio as in Example 2-1. An electron microscope photograph of the mixed powder of Comparative Example 2-1 is shown in FIG. 14.
(Evaluation of Physical Properties of Powder)

For the composite pigments of the various Examples and the mixed powder of Comparative Example 2-1, various powder physical properties were measured as follows. The results are shown in Table 2-1. The measurement methods of the various physical properties were as follows. In the following description of the measurement methods, "sample" refers to a composite pigment of the various Examples or the mixed powder of Comparative Example 2-1.
(Measurements of Median Diameter and Diameter on Cumulative 90%)

The median diameter and the diameter on cumulative 90% were measured by using the laser diffraction/scattering-type particle size distribution measuring apparatus "LA-910" (manufactured by HORIBA, Ltd.). In detail, each sample was mixed in an aqueous solution as a disperse medium in which 0.3% by mass of sodium hexametaphosphate was dissolved, and while being circulated and stirred in the apparatus, irradiated for 3 min with ultrasonic waves to be sufficiently dispersed and adjusted so that the transmittance of laser light became 73±3%, and thereafter, the particle size distribution in terms of volume was measured. The relative refractive index at this time was fixed at 2.00-0.00i and the number of captures was made to be 10 times. When the particle size distribution was expressed as cumulative distribution, the particle diameter at cumulative 50% was defined as a median diameter D50 and the particle diameter at cumulative 90% was defined as a diameter on cumulative 90% (D90).
(Measurement of Specific Surface Area)

The specific surface area was measured by a BET method using a specific surface area measuring apparatus (Flowsorb 112300 manufactured by Shimadzu Corp.). As a gas to be used for the measurement, a mixed gas of nitrogen and helium containing 30% by volume of nitrogen as an adsorption gas and 70% by volume of helium as a carrier gas was used. A sample was filled in a cell, and heated and degassed by using a vacuum device, and thereafter, a certain amount of the mixed gas of nitrogen and helium was made to flow and the specific surface area was measured.
(Measurement of Oil Absorption)

The oil absorption was measured according to the pigment test method JIS-K5101-13-1: 2004. In detail, 5 g of a sample was put on a smooth glass plate; and a boiled linseed oil was dropped from a burette and the entire mixture was kneaded by a pallet knife every dropping. The dropping and kneading were repeated, and a point at which the mixture came to have a state of being capable of being spirally wound by using the pallet knife was defined as an end point. The amount of the boiled linseed oil absorbed in each sample was divided by the mass of each sample to calculate an oil absorption. In the present invention, the oil absorption is expressed in a unit of ml/100 g.

(Measurements of Compositions of Composite Pigments and the Like)

The composition of the constituent components of each sample was measured by using an X-ray fluorescence analyzer (RIX-2100 manufactured by Rigaku Corp.). In detail, a sample was packed in an aluminum ring, and pressure molded by an oil pressing machine to make a sample for the measurement.

In Table 2-1, based on the measurement results, there were calculated compositions (mass ratios) of the titanium oxide, the calcium carbonate (or the barium sulfate) and the silica which were contained in a composite pigment. Specifically, masses of the titanium oxide in terms of $TiO_2$, the calcium carbonate in terms of $CaCO_3$, the barium sulfate in terms of $BaSO_4$ and the silica in terms of $SiO_2$ were totaled and taken as 100, and the each mass ratio was calculated.

TABLE 2-1

|  | D50 | D90 | Specific surface area | Oil absorption | Composition (mass ratio) | | | |
| --- | --- | --- | --- | --- | --- | --- | --- | --- |
|  | (μm) | (μm) | (m²/g) | (ml/100 g) | $TiO_2$ | $CaCO_3$ | $BaSO_4$ | $SiO_2$ |
| Example 2-1 | 1.4 | 1.8 | 21.5 | 44 | 64 | 25 | — | 11 |
| Example 2-2 | 1.0 | 1.7 | 19.6 | 45 | 47 | 43 | — | 10 |
| Example 2-3 | 1.4 | 2.3 | 22.4 | 47 | 67 | 19 | — | 14 |
| Example 2-4 | 1.4 | 2.5 | 27.2 | 52 | 55 | 27 | — | 18 |
| Example 2-5 | 1.8 | 3.3 | 28.8 | 50 | 61 | 24 | — | 15 |
| Example 2-6 | 1.4 | 1.4 | 19.3 | 42 | 59 | 29 | — | 12 |
| Example 2-7 | 1.6 | 2.8 | 24.5 | 39 | 51 | — | 37 | 12 |
| Comparative Example 2-1 | 0.6 | 0.9 | 14.2 | 21 | 61 | 39 | — | — |

(Preparation of Paint Composition)

Paint compositions were prepared by using the composite pigments of Examples 2-1 to 2-5 and Example 2-7 and the mixed powder of Comparative Example 2-1. Specifically, the raw materials described in the following Table 2-2 were stirred by using a dispersing machine (T.K. ROBOMIX, manufactured by Tokushu Kika Kogyo Co., Ltd., rotation speed: 3,000 rpm), and then defoamed by a hybrid mixer (HM-500 manufactured by KEYENCE CORPORATION) to obtain the paint compositions.

TABLE 2-2

| Resin | Acryl emulsion resin, PRIMAL AC-2235, manufactured by Rohm and Haas Japan K.K. | 33.4 parts by mass |
| --- | --- | --- |
| Dispersant | DISPERBYK-184 manufactured by BYK Additives & Instruments | 1.0 parts by mass |
| Tap water |  | 4.2 parts by mass |
| Emulsifier | TRITON CF-10 manufactured by Dow Chemical Company | 0.6 parts by mass |
| Antifreezing agent | Ethylene glycol, manufactured by Kanto Chemical Co., Inc. | 5.5 parts by mass |
| Curing agent | 28% ammonia aqueous solution | 2.6 parts by mass |
| Thickener | 2% CELLOSIZE aqueous solution manufactured by Dow Chemical Company | 17.3 parts by mass |
| Defoaming agent | ADEKANATE B-748A manufactured by ADEKA CORPORATION | 0.1 parts by mass |
| Sample of Example or Comparative Example |  | 35.3 parts by mass |

The paint compositions thus obtained had a pigment volume concentration (PVC) of 40% and a solid volume concentration (SVC) of 36.4%.

Here, in the following description, the paint composition prepared by the above-mentioned method using the sample of Example 2-1 was treated as a paint composition of Example 2-1. The same is applied to the other Examples and Comparative Examples.

In addition to the above paint compositions, the following were prepared as paint compositions of the Comparative Examples.

Comparative Example 2-2

A commercially available matting paint composition (ECOFLAT 60 manufactured by Nippon Paint Co., Ltd.) was prepared.

Comparative Example 2-3

A matting paint composition was prepared by adding a commercially available matting agent (Sylysia 276 manufactured by Fuji Silysia Chemical, Ltd.) to a commercially available gloss emulsion paint (SILICONECERA UV FINISH COAT WB manufactured by Nippon Paint Co., Ltd.). The amount of the matting agent added was made to be 5% by mass to the gloss emulsion paint.

(Evaluation of Physical Properties of Paint Film)

For the paint compositions of the various Examples and Comparative Examples, physical properties thereof when being formed into paint films were evaluated. The results are shown in Table 2-3. Here, measurement methods of the various physical properties of the paint films were as follows.

(Measurement of Gloss)

The gloss of the paint film made by application and drying each of the above-mentioned paint compositions of the various Examples and Comparative Examples were measured according to JIS K5600-4-7:1999. First, a paint composition was applied on a glass plate so that the film thickness became about 40 μm, by using a 4-mil film applicator. The resultant film was dried and thereafter, the 20° and 60° specular glosses were measured by using a gloss meter (haze-gloss meter manufactured by BYK-Gardner GmbH).

(Measurement of Hiding Power)

The hiding powers of the paint films made by application and drying of the above-mentioned paint compositions of the various Examples and Comparative Examples were measured according to JIS K5600-4-7:1999. First, a paint composition was applied on a test paper for the hiding power so that the film thickness became about 40 by using a 4-mil film applicator. The resultant was dried and thereafter, the $Y_b$ value (Y value of a black ground) and the $Y_w$ value (Y value of a white ground) were measured by using a spectroscopic colorimeter (SD5000 manufactured by Nippon Denshoku Industries Co., Ltd.). Then, the hiding power (thereinafter, C.R.) was calculated from the values of the $Y_b$ value and the $Y_w$ value according to the following expression.

$$C.R. (\%) = Y_b \text{ value}/Y_w \text{ value} \times 100$$

(Measurement of Strength of Paint Film)

The strengths of the paint films made by application and drying of the above-mentioned paint compositions of the various Examples and Comparative Examples were measured according to JIS K5600-5-4:1999. First, a paint composition was applied on a glass plate so that the film thickness became about 40 by using a 4-mil film applicator. The resultant film was dried and thereafter subjected to a scratch hardness test using a wood drawing pencil (uni manufactured by Mitsubishi Pencil Co., Ltd.).

TABLE 2-3

|  | Gloss | | Hiding power | | | Pencil |
| --- | --- | --- | --- | --- | --- | --- |
|  | 20° | 60° | Yb | Yw | C.R. (%) | hardness |
| Example 2-1 | 1.2 | 2.4 | 87.4 | 89.6 | 97.5 | 4B |
| Example 2-2 | 1.1 | 2.7 | 79.8 | 87.2 | 91.6 | 2B |
| Example 2-3 | 1.1 | 2.6 | 83.2 | 88.3 | 94.2 | 4B |
| Example 2-4 | 1.2 | 2.4 | 83.6 | 88.5 | 94.5 | 4B |
| Example 2-5 | 1.1 | 2.7 | 83.4 | 88.5 | 94.3 | B |
| Example 2-7 | 1.1 | 2.4 | 83.7 | 88.4 | 94.7 | 4B |
| Comparative Example 2-1 | 3.6 | 26 | 85.7 | 89.5 | 95.8 | 3B |
| Comparative Example 2-2 | 1.1 | 2.3 | 80.9 | 86 | 94 | lower than 6B |
| Comparative Example 2-3 | 2.5 | 17.9 | 85 | 89.4 | 95 | F |

The paint films of the paint compositions of the various Examples had lower 20° and 60° specular glosses than the paint films of the paint compositions of Comparative Example 2-1 and Comparative Example 2-3, and also visually reduced gloss and developed a sufficient matte effect. The low-gloss property (matte effect) of these Examples was equal to that of Comparative Example 2-2, and reduced a gloss up to the degree of a gloss reduction referred to as "matting (a 60° specular gloss of 5% or lower)" over the degree of a gloss reduction generally referred to as "70% gloss", "50% gloss" or "30% gloss". Further the paint films of the paint compositions of the Examples had a C.R. value equal to or higher than that of the paint films of the paint compositions of the Comparative Examples 2-1 to 2-3, and exhibited a practically sufficient hiding power nearly equal to that of the paint films of the paint compositions of the Comparative Examples 2-1 to 2-3. In particular, the paint film of Example 2-1 had a high C.R. value and could attain a higher hiding power than the paint films of the Comparative Examples.

It was further confirmed that the paint film of the paint composition in each of the Examples had a sufficient pencil hardness and had a practically sufficient paint film strength.

As described above, the paint composition in each of the various Examples had paint film physical properties (gloss, hiding power, and the like) equal to or higher than the paint compositions of the Comparative Examples. The composite pigments of the various Examples, only by being added to paint resins and the like and lightly mixed, can be dispersed and formed into paints with labor saving, and can prepare paint films having the low-gloss property (matte effect) without being added separately with matting agents.

(Sensory Evaluation of Paint Film)

Paint films made by application and drying of the paint compositions of Example 2-1, Comparative Example 2-2 and Comparative Example 2-3 were subjected to sensory evaluations for the smoothness of the tactile feeling and the ease of stain removal (stain removability).

(Evaluation of Tactile Feeling)

A paint composition was applied on a glass plate by using a 4-mil film applicator so that the film thickness became about 40 μm, and dried, and was thereafter subjected to a finger touch test for the tactile feeling of a paint film. Specifically, 10 panel members touched the paint film with their fingers and rated superiority or inferiority of the tactile feeling. The rating manner was such that a paint film exhibiting a firstly smooth tactile feeling was given 2 points; a paint film exhibiting a secondly smooth tactile feeling, 1 point; and a paint film exhibiting a most smoothless tactile feeling, 0 points. The average value of points the 10 panel members gave was defined as an evaluation point of the tactile feeling. The results are shown in Table 2-4. The paint film of the paint composition of Example 2-1 resulted in being better in the tactile feeling than those of Comparative Examples 2-2 and 2-3.

TABLE 2-4

|  | Tactile feeling |
| --- | --- |
| Example 2-1 | 1.8 |
| Comparative Example 2-2 | 0 |
| Comparative Example 2-3 | 1.2 |

(Evaluation of Stain Removability)

A paint composition was applied so as to become 0.13 kg/m² on a slate board (300 mm×200 mm×4 mm) on which a resin for sealer (Saibinol AD-7 manufactured by Saiden Chemical Industry Co., Ltd.) had been applied and dried in advance, by using a brush. The obtained film was dried and thereafter, a color pencil and oleic acid were applied, and were subjected to a 20 times-reciprocated wiping-out operation with a waste cloth impregnated with water having 5% of a neutral detergent.

In the paint film of the paint composition of Example 2-1, stain could be completely wiped out. By contrast, in the paint film of the paint composition (a commercially available flat emulsion paint) of Comparative Example 2-2, stain could hardly be removed, or the paint film resulted in peeling off. In the paint film of the paint composition (a combination of a commercially available gloss emulsion paint and a commercially available matting agent) of Comparative Example 2-3, stain resulted in being nearly removed.

Example of the Present Invention (the Third Invention of the Present Application)

Example 3-1

Figure 15:
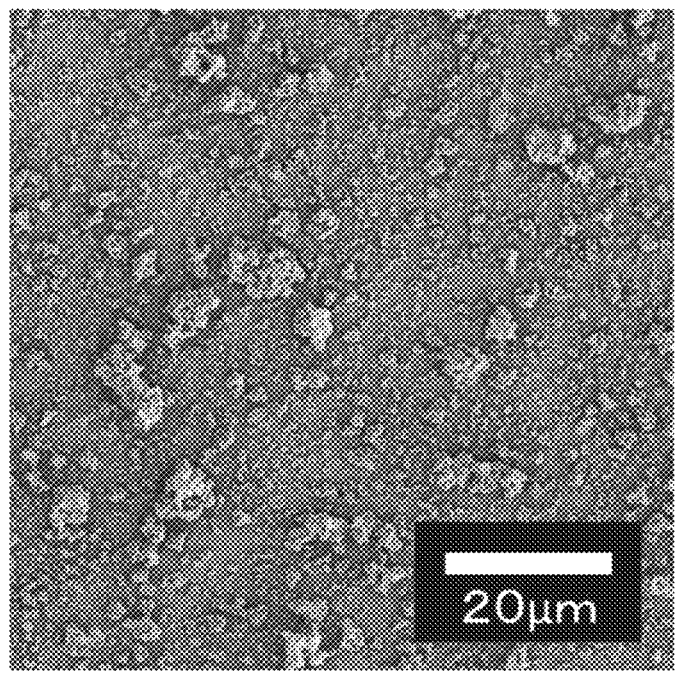
FIG. 15 is an electron microscope photograph of a composite pigment in Example 3-1 of the third invention of the present application.

In 819.6 g of pure water, 129 g of titanium dioxide (manufactured by Ishihara Sangyo Kaisha, Ltd., average primary particle diameter: 0.24 µm) was dispersed, to which 116.4 g of No. 3 sodium silicate aqueous solution, and the resultant was then mixed to prepare a slurry of titanium dioxide containing sodium silicate. The volume ratio (Va/Vb) of the volume Va of sodium silicate (in terms of $SiO_2$) and the volume Vb of titanium dioxide in this slurry was 0.5, and the solid content concentration was 175 g/L. This solution was placed in a reaction vessel equipped with a stirrer and a thermometer, and the temperature was raised to 75° C. with stirring. While maintaining the liquid temperature at 75° C., 2.0% by mass sulfuric acid was added over 3 hours using a micro tube pump (MP-2001 manufactured by Tokyo Rikakikai Co, Ltd.) to adjust the pH of the solution to 7.0 to 7.5. Then, after aging for 1 hour, an aggregate of titanium dioxide containing silica as a binder was obtained in the solution. Then, the solution was filtrated using a No. 2 filter paper, and the solid matter remaining on the filter paper was washed with water, and again filtrated to obtain a wet filter cake of the above aggregate. The obtained wet filter cake was dried with heating in a dryer set at 120° C. for 16 hours. The dry powder of the aggregate thus obtained was ground in a dry state using a grinder (Stud Mill 63Z manufactured by Makino Mfg. Co., Ltd.), and then classified with a classifier (TC-15M manufactured by Hosokawa Micron Corporation) (rotation speed: 3600 rpm, air flow rate: 1.5 m$^3$/min) to obtain a composite pigment in which titanium dioxide was fixed by silica. An electron microscope photograph of the composite pigment of Example 3-1 is shown in FIG. 15.

Example 3-2

Figure 16:
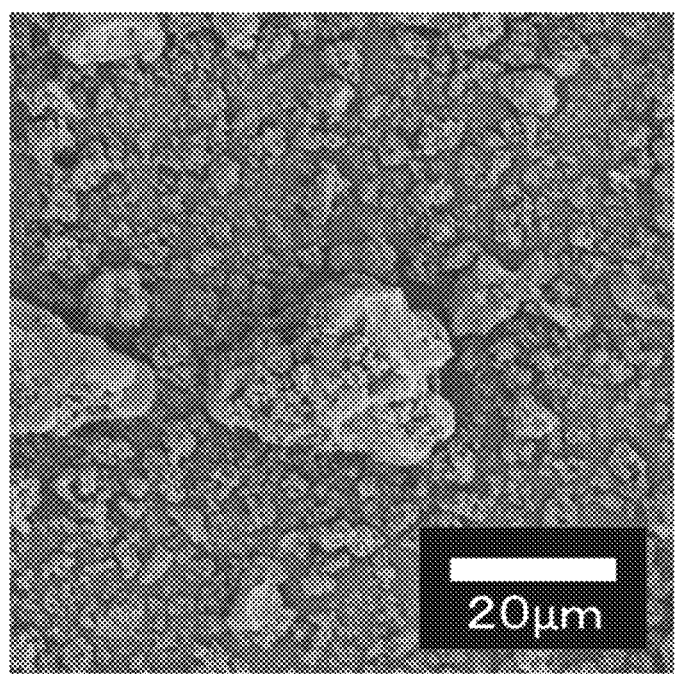
FIG. 16 is an electron microscope photograph of a composite pigment in Example 3-2 of the third invention of the present application.

The addition amount of the silica source in Example 3-1 described above was increased. Specifically, by changing the used amount of pure water to 923.4 g, and the addition amount of No. 3 sodium silicate aqueous solution to 232.8 g, a slurry having a volume ratio (Va/Vb) of sodium silicate (in terms of $SiO_2$) to titanium dioxide of 1 and a solid content concentration of 175 g/L (the same as in Example 3-1) was prepared. Except for the above, a composite pigment in which titanium dioxide was fixed by silica was prepared in the same procedures as in Example 3-1. FIG. 16 shows an electron microscope photograph of the composite pigment of Example 3-2.

Example 3-3

Figure 17:
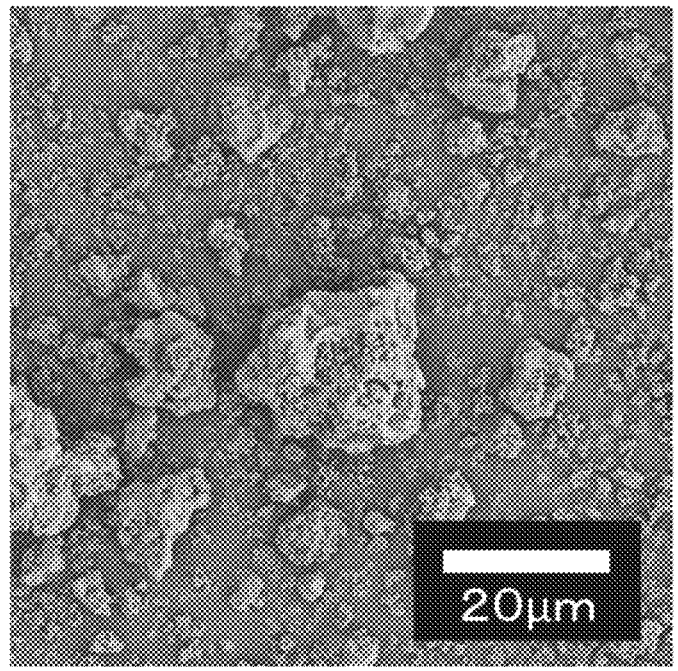
FIG. 17 is an electron microscope photograph of a composite pigment in Example 3-3 of the third invention of the present application.

The solid content concentration of the titanium dioxide slurry containing sodium silicate in Example 3-1 described above was increased. Specifically, by changing the used amount of pure water to 457.0 g, a slurry having a volume ratio (Va/Vb) of sodium silicate (in terms of $SiO_2$) to titanium dioxide of 0.5 (the same as in Example 3-1) and a solid content concentration of 300 g/L was prepared. Except for the above, a composite pigment in which titanium dioxide was fixed by silica was prepared in the same procedures as in Example 3-1. FIG. 17 shows an electron microscope photograph of the composite pigment of Example 3-3.

Example 3-4

Figure 18:
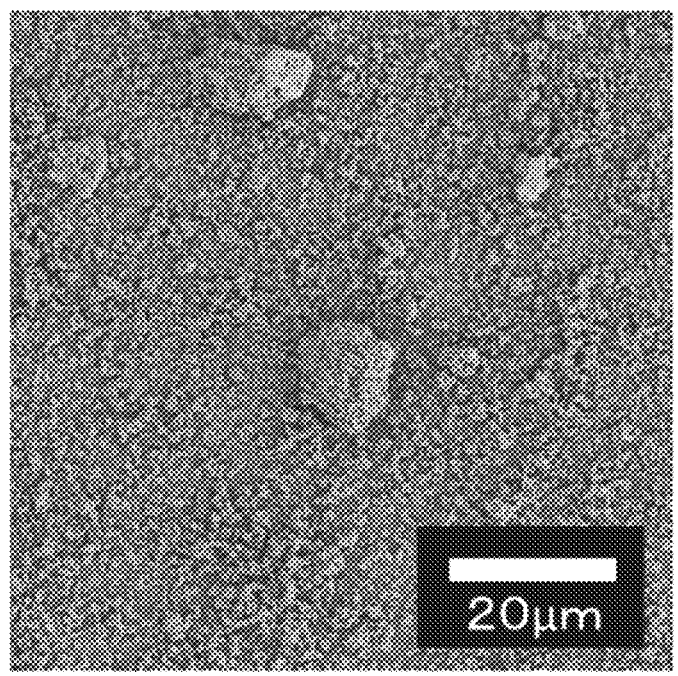
FIG. 18 is an electron microscope photograph of a composite pigment in Example 3-4 of the third invention of the present application.

The solid content concentration of the titanium dioxide slurry containing sodium silicate in Example 3-1 described above was lowered. Specifically, by changing the used amount of pure water to 1516.9 g, a slurry having a volume ratio (Va/Vb) of sodium silicate (in terms of $SiO_2$) to titanium dioxide of 0.5 (the same as in Example 3-1) and a solid content concentration of 100 g/L was prepared. Except for the above, a composite pigment in which titanium dioxide was fixed by silica was prepared in the same procedures as in Example 3-1. FIG. 18 shows an electron microscope photograph of the composite pigment of Example 3-4.

Example 3-5

Figure 19:
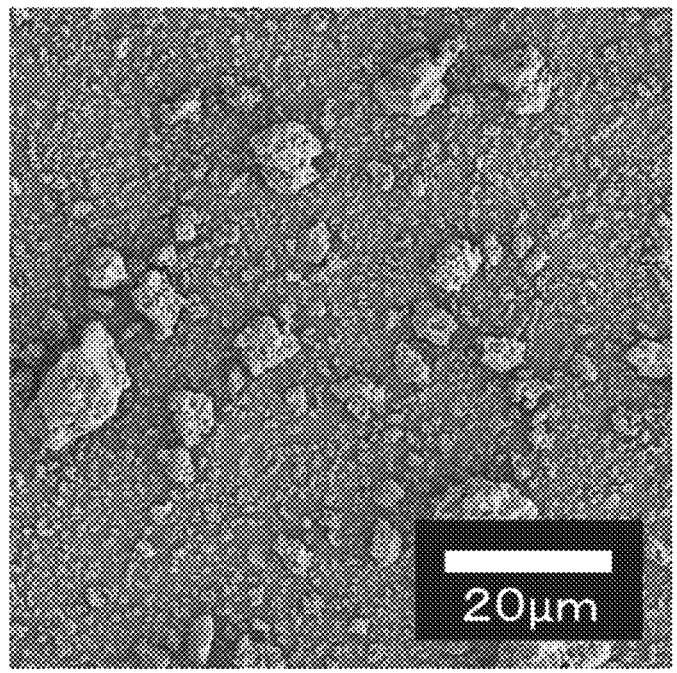
FIG. 19 is an electron microscope photograph of a composite pigment in Example 3-5 of the third invention of the present application.

By changing 129 g of titanium dioxide in Example 3-1 described above to 129 g of nickel antimony titanium yellow (TY-50 manufactured by Ishihara Sangyo Kaisha, Ltd., average primary particle diameter: 0.40 µm), a slurry having a volume ratio (Va/Vb) of sodium silicate (in terms of $SiO_2$) to nickel antimony titanium yellow of 0.5 (the same as in Example 3-1) and a solid content concentration of 175 g/L (the same as in Example 3-1) was prepared. Except for the above, a composite pigment in which nickel antimony titanium yellow was fixed by silica was prepared in the same procedures as in Example 3-1. FIG. 19 shows an electron microscope photograph of the composite pigment of Example 3-5.

Example 3-6

Figure 20:
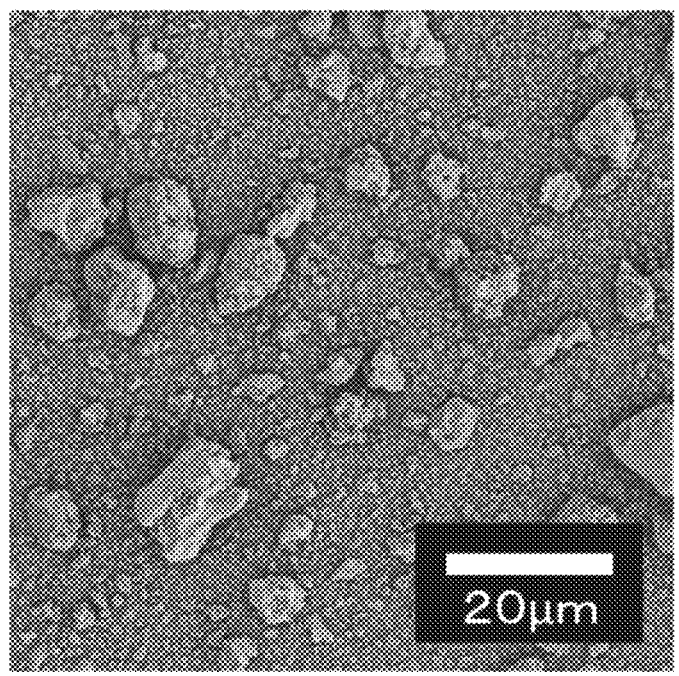
FIG. 20 is an electron microscope photograph of a composite pigment in Example 3-6 of the third invention of the present application.

By changing 129 g of titanium dioxide in Example 3-1 described above to 129 g of chrome antimony titanium buff (TY-300 manufactured by Ishihara Sangyo Kaisha, Ltd., average primary particle diameter: 0.45 µm), a slurry having a volume ratio (Va/Vb) of sodium silicate (in terms of $SiO_2$) to chrome antimony titanium buff of 0.5 (the same as in Example 3-1) and a solid content concentration of 175 g/L (the same as in Example 3-1) was prepared. Except for the above, a composite pigment in which chrome antimony titanium buff was fixed by silica was prepared in the same procedures as in Example 3-1. FIG. 20 shows an electron microscope photograph of the composite pigment of Example 3-6.

Example 3-7

Figure 21:
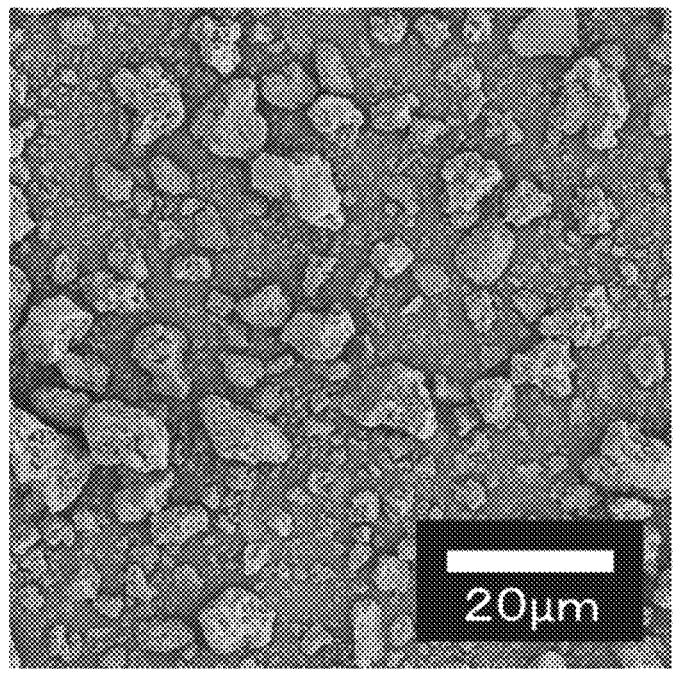
FIG. 21 is an electron microscope photograph of a composite pigment in Example 3-7 of the third invention of the present application.

By changing 129 g of titanium dioxide in Example 3-1 described above to 161.1 g of red iron oxide (manufactured by Toda Kogyo Corp., average primary particle diameter: 0.25 µm), a slurry having a volume ratio (Va/Vb) of sodium silicate (in terms of $SiO_2$) to red iron oxide of 0.5 (the same as in Example 3-1) and a solid content concentration of 210 g/L was prepared. Except for the above, a composite pigment in which red iron oxide was fixed by silica was prepared in the same procedures as in Example 3-1. FIG. 21 shows an electron microscope photograph of the composite pigment of Example 3-7.

Example 3-8

Figure 22:
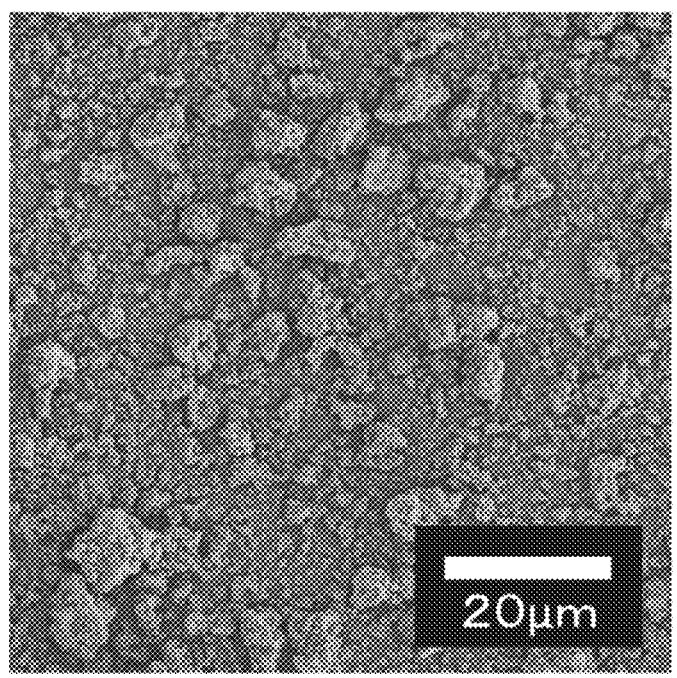
FIG. 22 is an electron microscope photograph of a composite pigment in Example 3-8 of the third invention of the present application.

By changing 129 g of titanium dioxide in Example 3-1 described above to 72.2 g of ultramarine blue (manufactured by Daiichi Kasei Kogyo, average primary particle diameter: 0.2 µm), a slurry having a volume ratio (Va/Vb) of sodium silicate (in terms of $SiO_2$) to ultramarine blue of 0.5 (the same as in Example 3-1) and a solid content concentration of 110 g/L was prepared. Except for the above, a composite pigment in which ultramarine blue was fixed by silica was prepared in the same procedures as in Example 3-1. FIG. 22 shows an electron microscope photograph of the composite pigment of Example 3-8.

Example 3-9

Figure 23:
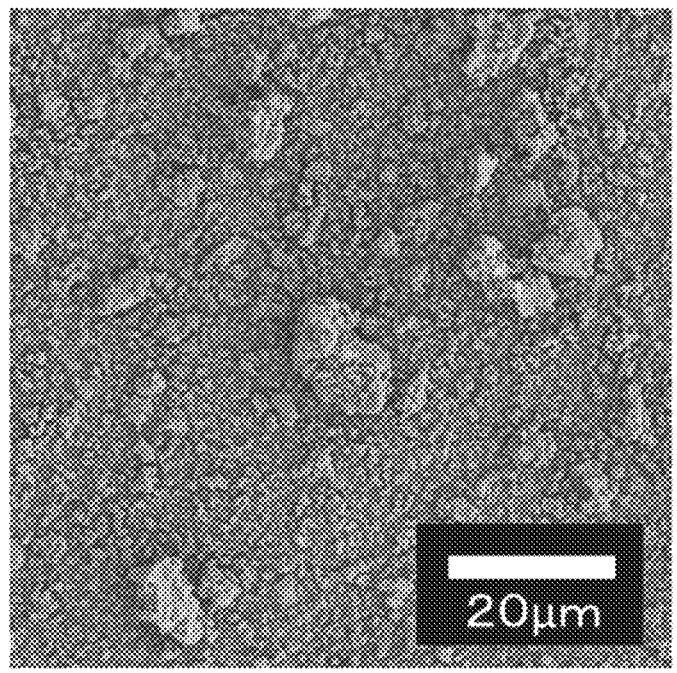
FIG. 23 is an electron microscope photograph of a composite pigment in Example 3-9 of the third invention of the present application.

By changing 129 g of titanium dioxide in Example 3-1 described above to 159.8 g of iron chromate composite oxide (manufactured by Shepherd Color Japan, Inc., average primary particle diameter: 0.4 μm), a slurry having a volume ratio (Va/Vb) of sodium silicate (in terms of $SiO_2$) to iron chromate composite oxide of 0.5 (the same as in Example 3-1) and a solid content concentration of 210 g/L was prepared. Except for the above, a composite pigment in which the iron chromate composite oxide was fixed by silica was prepared in the same procedures as in Example 3-1. FIG. 23 shows an electron microscope photograph of the composite pigment of Example 3-9.

Comparative Example 3-1

Figure 24:
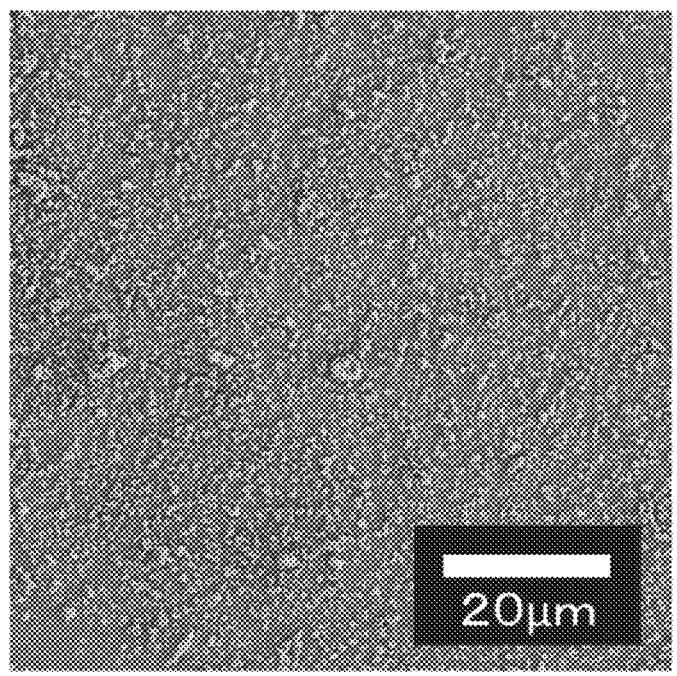
FIG. 24 is an electron microscope photograph of a pigment in Comparative Example 3-1 of the third invention of the present application.

A titanium dioxide pigment was prepared in accordance with the production method described in the Examples of JP 09-25429 A as follows. A slurry (slurry concentration: 350 g/L) of titanium dioxide (manufactured by Ishihara Sangyo Kaisha, Ltd., average primary particle diameter: 0.24 μm) was prepared, and was heated up to 70° C. with stirring, which pH was then adjusted to 4.0 with sulfuric acid diluted to 35%. While maintaining the pH at 4.0 by adding the dilute sulfuric acid, 36.2 g (8% in terms of $SiO_2$ based on the mass of titanium dioxide) of No. 3 sodium silicate aqueous solution was added and aged for 30 min. Subsequently, 50 g (3% in terms of $Al_2O_3$ based on the mass of titanium dioxide) of an aluminum sulfate aqueous solution was added while keeping the temperature at 70° C., and then a sodium hydroxide aqueous solution was added to adjust the pH to 7.5, followed by aging for 1 hour. Subsequently, the slurry was filtrated with No. 2 filter paper and the residue was washed and dried at 120° C. After drying, 1 g of methyl hydrogen polysiloxane (KF-99 manufactured by Shin-Etsu Chemical Co., Ltd.) was added thereto, mixed with a mixer and ground with a jet mill to yield a titanium dioxide pigment. An electron microscope photograph of the titanium dioxide pigment of Comparative Example 3-1 is shown in FIG. 24.

Comparative Example 3-2

Figure 25:
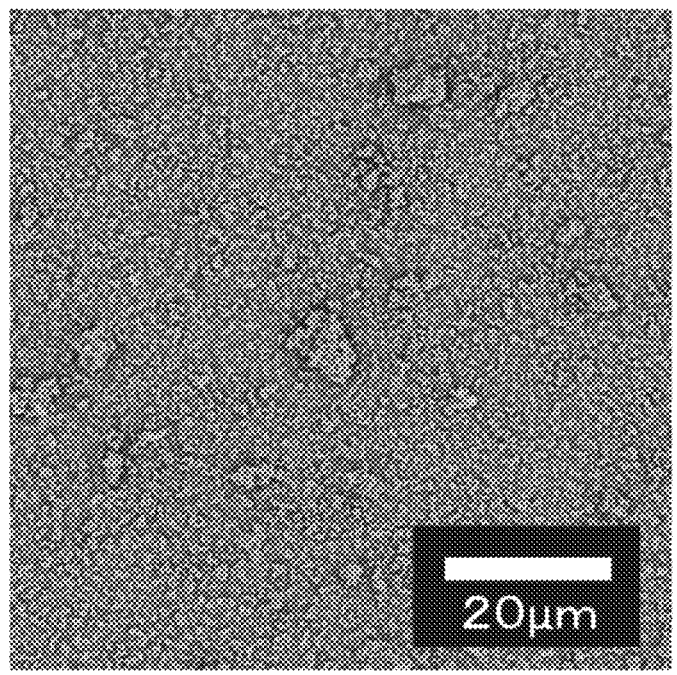
FIG. 25 is an electron microscope photograph of a pigment in Comparative Example 3-2 of the third invention of the present application.

As compared to Example 3-1 described above, the addition amount of the silica source was reduced. Specifically, by changing the used amount of pure water to 761.1 g and the used amount of No. 3 sodium silicate aqueous solution to 58.2 g, a slurry having a volume ratio (Va/Vb) of sodium silicate to titanium dioxide of 0.25, and a solid content concentration of 175 g/L (the same as in Example 3-1) was prepared. Except for the above, a pigment of Comparative Example 3-2 was yielded according to the same procedure as in Example 3-1. An electron microscope photograph of the pigment of Comparative Example 3-2 is shown in FIG. 25. As obvious from FIG. 25, in the sample of Comparative Example 3-2, combining by silica did not progress so much as the composite pigments of the various Examples, and relatively small particles were dominant.

(Evaluation of Physical Properties of Powder)

Various powder physical properties of the composite pigments of the various Examples and the pigments of Comparative Examples 3-1 and 3-2 were measured as follows. The results are shown in Table 3-1. Measurement methods of various powder physical properties are as follows. "Sample" in the descriptions of the measurement method below refers to the respective composite pigments of the Examples and the pigments of Comparative Examples 3-1 and 3-2.

(Measurements of Particle Size Distribution and D90)

A particle size distribution was measured using a laser diffraction/scattering-type particle size distribution measuring apparatus (LA-910 manufactured by HORIBA, Ltd.). More particularly, an aqueous solution in which 0.3% by mass of sodium hexametaphosphate was dissolved was used as a dispersion medium, to which each sample was mixed. The dispersion was circulated and stirred in the apparatus, irradiated with ultrasonic waves for 3 min to be dispersed thoroughly, and adjusted such that the transmittance of laser light became 73±3%. Then a volumetric particle size distribution was measured. In this case, the relative refractive index was set at 2.00-0.00i with respect to Examples 3-1 to 3-3, Example 3-6, and Comparative Examples 3-1 and 3-2, at 2.17-0.00i with respect to Example 3-4, and at 1.18-0.00i with respect to Example 3-5, and the number of data fetching was set at 10 times.

Figure 26:
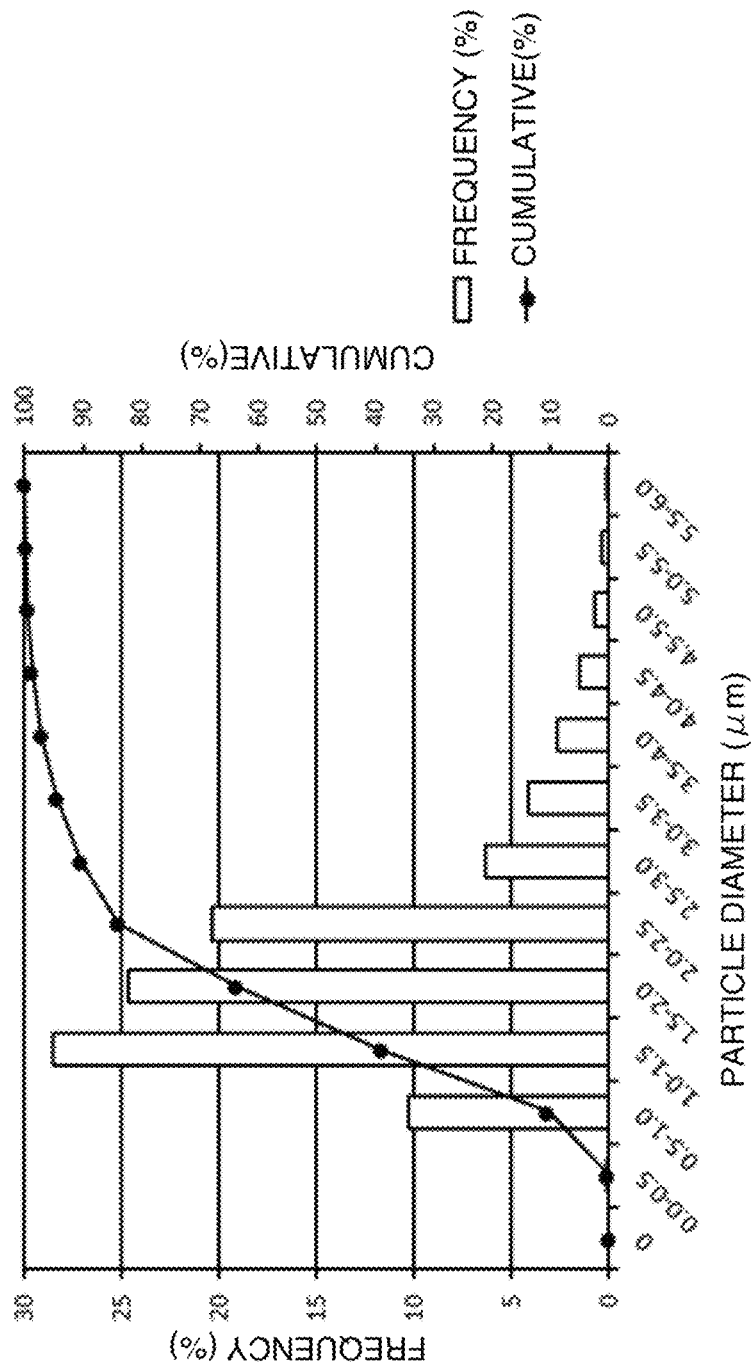
FIG. 26 is a volume cumulative particle size distribution diagram of the composite pigment in Example 3-1 of the third invention of the present application.

From the thus obtained particle size distribution data, the ratio of particles having a predetermined size with respect to the whole sample (the ratio of those having a particle diameter of 1 μm or more, the ratio of those having a particle diameter of 2 μm or more, and the ratio of those having a particle diameter of 5 μm or more) were respectively calculated. Also, when the particle size distribution is expressed as a cumulative distribution, the particle diameter at 90% of cumulative distribution is defined as a diameter on cumulative 90% (D90). Incidentally, FIG. 26 shows a volume cumulative particle size distribution diagram of Example 3-1 as a representative of the various Examples.

TABLE 3-1

| | Particle size distribution (%) | | | |
|---|---|---|---|---|
| | >1 μm | >2 μm | >5 μm | D90(μm) |
| Example 3-1 | 88 | 35 | 2 | 2.9 |
| Example 3-2 | 95 | 60 | 20 | 5.5 |
| Example 3-3 | 80 | 36 | 5 | 3.7 |
| Example 3-4 | 65 | 10 | 0 | 1.9 |
| Example 3-5 | 95 | 56 | 22 | 9.0 |
| Example 3-6 | 93 | 88 | 40 | 13.7 |
| Example 3-7 | 93 | 70 | 39 | 10.6 |
| Example 3-8 | 99 | 88 | 40 | 8.7 |
| Example 3-9 | 99 | 76 | 20 | 5.8 |
| Comparative Example 3-1 | 26 | 1 | 0 | 1.2 |
| Comparative Example 3-2 | 17 | 1 | 0 | 1.1 |

As seen from Table 3-1, the abundance ratio of composite pigment particles having a particle diameter of 1 μm or more in the volume cumulative distribution measured by a laser diffraction/scattering-type particle size distribution measuring apparatus was 50% or more of the total with respect to any of the composite pigments of the various Examples. With respect to any of the composite pigments of Examples 3-1 to 3-3 and Examples 3-5 to 3-9, the abundance ratio of those having a particle diameter of 2 μm or more in the volume particle size distribution was 30% or more of the total. Further, with respect to any of Example 3-2 and Examples 3-5 to 3-9, the abundance ratio of composite pigment particles having a particle diameter of 5 μm or more in the volume cumulative distribution was 20% or more of the total.

On the other hand, with respect to either of the pigments of Comparative Examples 3-1 and 3-2, there were only about 20 to 30% of the pigment particles with respect to the total, which had a particle diameter of 1 μm or more, and most of the particles had a particle diameter of less than 1 μm.

(Preparation of Paint Composition)

Paint compositions were prepared using the samples of Examples 3-1 to 3-9 and Comparative Examples 3-1 and 3-2. Specifically, the raw materials listed in the following Table 3-2 were stirred for 5 min using a dispersing machine (T. K. ROBOMIX manufactured by Tokushu Kika Kogyo Co., Ltd, rotation speed: 3000 rpm), and then degassing was carried out with a hybrid mixer (manufactured by KEYENCE CORPORATION, HM-500) to yield paint compositions.

is regarded as the paint of Example 3-1. The same applies to other Examples and Comparative Example 3-2.

In addition to the paint composition, the following were prepared as paint compositions of the Comparative Examples.

Comparative Example 3-3

A commercially available matting paint composition (ECOFLAT 60 manufactured by Nippon Paint Co., Ltd.) was prepared.

Comparative Example 3-4

A commercially available gloss emulsion paint (SILICONECERA UV FINISH COAT WB manufactured by Nippon Paint Co., Ltd.) was prepared.

Comparative Example 3-5

A matting paint composition was prepared by adding a commercially available matting agent (Sylysia 276 manu-

TABLE 3-2

|   |   | Example 3-1~3-6, 3-9, Comparative Example 3-2 | Example 3-7 | Example 3-8 |
|---|---|---|---|---|
| Resin | Acrylic emulsion resin, PRIMAL AC-2235, manufactured by Rohm and Haas Japan K.K. | 32.2 parts by mass | 28.4 parts by mass | 36.1 parts by mass |
| Dispersant | DISPERBYK-184 manufactured by BYK Additives & Instruments | 1.1 parts by mass | 1.3 parts by mass | 0.8 parts by mass |
| Tap water |   | 4.0 parts by mass | 3.1 parts by mass | 5.7 parts by mass |
| Emulsifier | TRITON CF-10 manufactured by Dow Chemical Company | 0.6 parts by mass | 0.5 parts by mass | 0.7 parts by mass |
| Antifreezing Agent | Ethylene glycol manufactured by Kanto Chemical Co., Ltd. | 5.3 parts by mass | 4.7 parts by mass | 5.9 parts by mass |
| pH adjuster | 28% ammonia aqueous solution | 2.5 parts by mass | 2.2 parts by mass | 2.8 parts by mass |
| Thickener | 2% CELLOSIZE aqueous solution, manufactured by Dow Chemical Company | 16.6 parts by mass | 14.6 parts by mass | 18.6 parts by mass |
| Defoaming Agent | ADEKANATE B-748A manufactured by ADEKA CORPORATION | 0.1 parts by mass | 0.1 parts by mass | 0.1 parts by mass |
| Sample of Example or Comparative Example |   | 37.5 parts by mass | 45.0 parts by mass | 29.6 parts by mass |

The paint composition thus obtained had a pigment volume concentration (PVC) of 40%, and a solid volume concentration (SVC) of 36.4%.

With respect to the pigment of Comparative Example 3-1, when the paint composition was prepared with the above blend, separation of the pigment components in the paint was severe, and therefore it was judged that the paint is not worth undergoing the evaluations described later. Therefore, with respect to the pigment of Comparative Example 3-1, 70 g of a titanium dioxide pigment was blended into 88 g of an acrylic lacquer varnish (solid content 26.5%) prepared by mixing 46.6 g of an acrylic resin (ACRYDIC A-141 manufactured by DIC Corporation) and 41.4 g of xylene in accordance with the blend described in JP 09-25429 A, and the mixture (pigment/resin solid=3/1) was stirred with a paint shaker for 10 min to prepare a paint. As a result of preparation of the paint composition, separation of the pigment components in the paint composition of Comparative Example 3-1 was not observed.

In the following description, the paint composition prepared using the sample of Example 3-1 by the above method factured by Fuji Silysia Chemical Ltd.) to the commercially available gloss emulsion paint (SILICONECERA UV FINISH COAT WB manufactured by Nippon Paint Co., Ltd.). The addition amount of the matting agent was 5% by mass with respect to the gloss emulsion paint.

(Evaluation of Physical Properties of Paint Film)

Physical properties of various paint compositions of the Examples and Comparative Example formed into paint films were evaluated. The results are shown in Table 3-3. The measurement methods for various physical properties of a paint film are as follows.

(Measurement of Gloss)

The gloss of a paint film obtained by applying and drying each of the above-described various paint compositions of the Examples and Comparative Examples was measured in accordance with JIS K 5600-4-7: 1999. First, a paint composition was applied onto a glass plate using a 4-mil film applicator up to the film thickness of about 40 μm. After drying the film, the specular gloss was measured under each of geometric conditions of 20°, 60°, and 85° using a gloss meter (haze-gloss meter, manufactured by BYK-Gardner GmbH).

(Measurement of Hiding Power)

The hiding power of a paint film obtained by applying and drying each of the above-described various paint compositions of the Examples and Comparative Examples was measured in accordance with JIS K 5600-4-1: 1999. First, a paint composition was applied onto a test paper for the hiding power using a 4-mil film applicator up to the film thickness of about 40 μm. After drying the film, the $Y_b$ value (Y value at black part) and $Y_w$ value (Y value at white part) were respectively measured using a spectrophotometer (SD 5000 manufactured by Nippon Denshoku Industries Co., Ltd.). From the values of $Y_b$ value and $Y_w$ value, the hiding power (thereafter, referred to as C.R.) was calculated according to the following equation.

$$C.R. (\%) = Y_b \text{ value} / Y_w \text{ value} \times 100$$

TABLE 3-3

| | Gloss | | | Hiding power | | |
|---|---|---|---|---|---|---|
| | 20° | 60° | 85° | Yb | Yw | C.R. (%) |
| Example 3-1 | 1.2 | 2.2 | 22.0 | 88.9 | 90.4 | 98.3 |
| Example 3-2 | 1.3 | 2.3 | 8.6 | 86.0 | 89.3 | 96.3 |
| Example 3-3 | 1.2 | 2.3 | 11 | 86.9 | 89.7 | 96.9 |
| Example 3-4 | 1.2 | 2.6 | 35.1 | 87.6 | 90.0 | 97.3 |
| Example 3-5 | 0.9 | 2.1 | 6.2 | — | — | — |
| Example 3-6 | 0.4 | 1.0 | 3.8 | — | — | — |
| Example 3-7 | 0.0 | 0.3 | 5.3 | — | — | — |
| Example 3-8 | 0.1 | 0.6 | 6.9 | — | — | — |
| Example 3-9 | 0.0 | 0.3 | 5.2 | — | — | — |
| Comparative Example 3-1 | 1.9 | 23.1 | 76.5 | 86.1 | 88.4 | 97.4 |
| Comparative Example 3-2 | 1.5 | 6.9 | 69.7 | 87.4 | 90.1 | 96.9 |
| Comparative Example 3-3 | 1.1 | 2.3 | 3.0 | 86.4 | 89.3 | 96.7 |
| Comparative Example 3-4 | 39.7 | 73.7 | 96.4 | 85.6 | 88.7 | 96.6 |
| Comparative Example 3-5 | 2.5 | 17.9 | 41.7 | 85.0 | 89.4 | 95.1 |

As compared to the paint films of the paint compositions in Comparative Examples 3-1, 3-2, 3-4, and 3-5, the paint film of the paint composition in each of the Examples had a smaller specular gloss at 20° and 60°, and the gloss was also apparently reduced, and a sufficient matte effect was exhibited. The low-gloss property (matte effect) in each of the Examples was comparable to that in Comparative Example 3-3 having a high matte effect, and the gloss was reduced even to the degree of a gloss reduction referred to as "matting (specular gloss of 5% or less at 60°)" over the degree of a gloss reduction generally referred to as "70% gloss", "50% gloss", or "30% gloss".

Further, with respect to the paint film of the paint composition in each of the Examples, the specular gloss at 20° or 60° was sufficiently low, and the specular gloss at 85° was 40% or less to indicate that so-called 85° gloss was also sufficiently reduced.

Further, with respect to the paint film of the paint composition in each of Examples 3-1 to 3-3, and Examples 3-5 to 3-9, the specular gloss at 85° was reduced to 30% or less, and with respect to the paint film of the paint composition in each of Example 3-2, and Examples 3-5 to 3-9, the specular gloss at 85° was reduced to 10% or less.

In addition, it was confirmed that the paint films of the Examples had a hiding power almost the same as those of the Comparative Examples, and had a sufficient hiding power.

(Evaluation of Tactile Feeling of Paint Film)

Evaluation on the smoothness of the tactile feeling was performed on each of the paint films obtained by applying and drying the paint compositions in the Examples and Comparative Examples.

For quantifying the tactile feeling of a paint film as objective data, a friction coefficient was measured. Specifically, a paint composition was applied onto a glass plate using a 4-mil film applicator up to the film thickness of about 40 μm. The applied composition was dried, and a MMD (mean friction coefficient variation) was then measured using a friction tester (KES-SE manufactured by Kato Tech Co., Ltd.). The MMD (mean friction coefficient variation) is used as an index indicating the feeling of the roughness of a paint film. The measurement results are shown in Table 3-4 below. In Table 3-4, a tactile feeling at the time of actually touching the paint film with a finger is shown in three grades (◎: very smooth tactile feeling, ○: smooth tactile feeling, X: highly rough tactile feeling) along with the value of the aforementioned MMD.

TABLE 3-4

| | MMD | Tactile Feeling |
|---|---|---|
| Example 3-1 | 0.0085 | ◎ |
| Example 3-2 | 0.0143 | ○ |
| Example 3-3 | 0.0054 | ◎ |
| Example 3-4 | 0.0085 | ◎ |
| Example 3-5 | 0.0157 | ○ |
| Example 3-6 | 0.0169 | ○ |
| Example 3-7 | 0.0132 | ○ |
| Example 3-8 | 0.0109 | ○ |
| Example 3-9 | 0.0067 | ◎ |
| Comparative Example 3-1 | 0.0119 | ○ |
| Comparative Example 3-2 | 0.0152 | ○ |
| Comparative Example 3-3 | 0.0253 | X |
| Comparative Example 3-4 | 0.0110 | ○ |
| Comparative Example 3-5 | 0.0117 | ○ |

A paint film of each of the paint compositions of the Examples had a smaller value of MMD (mean friction coefficient variation) compared to the paint film of the paint composition of Comparative Example 3-3. Further, the value of MMD and the tactile feeling at the time of actually touching the paint film are nearly correlated, and the tactile feeling in each of the Examples was excellent (very smooth, or smooth) and was equal to or better than that of a general gloss paint giving a paint film with a smooth tactile feeling (Comparative Example 3-4).

As described above, a paint composition or paint film containing each composite pigment of the present Examples are superior because they have low-gloss property (matte effect), and are able to keep the good tactile feeling of a paint film.

Example of the Present Invention (the Fourth Invention of the Present Application)

Example 4-1

Figure 27:
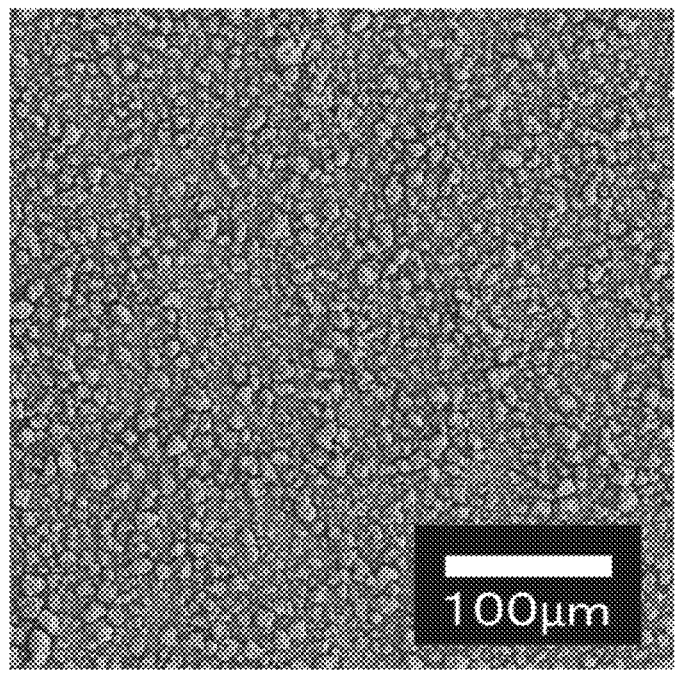
FIG. 27 is an electron microscope photograph of a composite pigment in Example 4-1 of the fourth invention of the present application.
Figure 28:
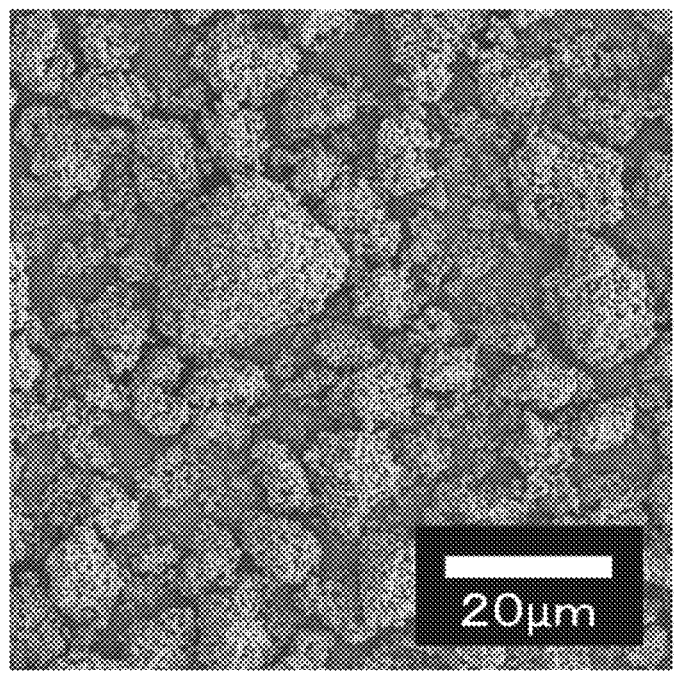
FIG. 28 is an electron microscope photograph (enlarged view) of the composite pigment in Example 4-1 of the fourth invention of the present application.

A mixture of a hydrate of titanium dioxide and zinc oxide as an additive for calcination (0.8% by mass based on titanium dioxide) was calcined to obtain a titanium dioxide pigment. The average primary particle diameter of the titanium dioxide pigment was 0.24 In pure water, 129 g of the titanium dioxide pigment and 82.8 g of precipitated (synthetic) calcium carbonate (extender pigment Brilliant-1500 manufactured by Shiraishi Calcium Kaisha, Ltd., average primary particle diameter: 0.15 μm) were dispersed. To this solution, 116.4 g of No. 3 sodium silicate aqueous solution was added and mixed to obtain a titanium dioxide pigment, and a sodium silicate solution containing calcium carbonate (solid content concentration: 255 g/L) was prepared. This solution was placed in a reaction vessel equipped with a stirrer and a thermometer, and the temperature was raised to 75° C. with stirring. While maintaining the liquid temperature at 75° C., 2.0% by mass sulfuric acid was added over 3 hours using a micro tube pump (MP-2001 manufactured by Tokyo Rikakikai Co, Ltd.) to adjust the pH of the solution to 7.0 to 7.5. Then, after aging for 1 hour, a composite pigment of titanium dioxide/calcium carbonate containing silica as a binder in the solution was obtained. Then, the solution was filtrated using a No. 2 filter paper, and the solid matter remaining on the filter paper was washed with water, and again filtrated to obtain a wet filter cake of the above composite pigment. The obtained wet filter cake was dried with heating in a dryer set at 120° C. for 16 hours. The dry powder of the composite pigment thus obtained was ground in a dry state using a grinder (Stud Mill 63Z manufactured by Makino Mfg. Co., Ltd.), and then classified with a classifier (TC-15M manufactured by Hosokawa Micron Corporation) (rotation speed: 3600 rpm, air flow rate: 1.5 m³/min) to obtain a composite pigment. An electron microscope photograph of the composite pigment of Example 4-1 is shown in FIG. 27. An enlarged view thereof is shown in FIG. 28.

Example 4-2

Figure 29:
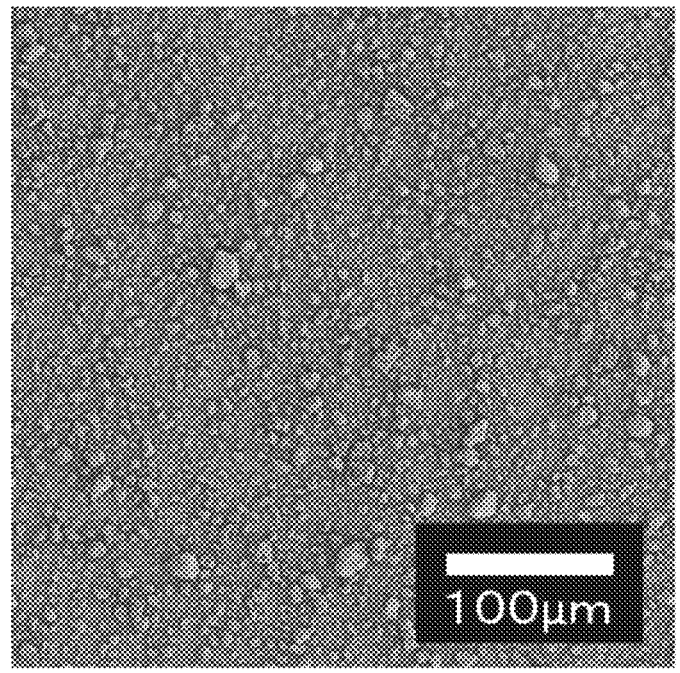
FIG. 29 is an electron microscope photograph of a composite pigment in Example 4-2 of the fourth invention of the present application.

3.8 g of zinc sulfate heptahydrate was dissolved in 430 g of pure water. To the solution, 129 g of a titanium dioxide pigment (manufactured by Ishihara Sangyo Kaisha, Ltd., average primary particle diameter: 0.24 μm) was added to prepare a titanium dioxide dispersion containing zinc sulfate heptahydrate (solid content concentration: 300 g/L). This dispersion was placed in a reaction vessel equipped with a stirrer and a thermometer, and the temperature was raised to 75° C. with stirring. While maintaining the liquid temperature at 75° C., caustic soda (sodium hydroxide) adjusted to 5.0% by mass was added over 1 hour by using a micro tube pump (MP-2001 manufactured by Tokyo Rikakikai Co, Ltd.) to adjust the pH of the solution to 8.0 to 8.5. Then after aging for 1 hour, a titanium dioxide pigment, which surface was coated with zinc oxide, was obtained in the solution. Further, 82.8 g of sedimentary precipitated (synthetic) calcium carbonate (extender pigment Brilliant-1500 manufactured by Shiraishi Calcium Kaisha, Ltd., average primary particle diameter: 0.15 μm), 314.2 g of pure water, and 116.4 g of No. 3 sodium silicate aqueous solution were added and mixed to prepare a sodium silicate solution containing the titanium dioxide pigment and calcium carbonate (solid content concentration: 255 g/L). While maintaining the liquid temperature of this solution at 75° C., 2.0% by mass sulfuric acid was added over 3 hours using a micro tube pump (MP-2001 manufactured by Tokyo Rikakikai Co, Ltd.) to adjust the pH of the solution to 7.0 to 7.5. Then, after aging for 1 hour, a composite pigment of titanium dioxide/calcium carbonate containing silica as a binder was obtained in the solution. Then, the solution was filtrated using a No. 2 filter paper, and the solid matter remaining on the filter paper was washed with water, and again filtrated to obtain a wet filter cake of the above composite pigment. The obtained wet filter cake was dried with heating in a dryer set at 120° C. for 16 hours. The dry powder of the composite pigment thus obtained was ground in a dry state using a grinder (Stud Mill 63Z manufactured by Makino Mfg. Co., Ltd.), and then classified with a classifier (TC-15M manufactured by Hosokawa Micron Corporation) (rotation speed: 3600 rpm, air flow rate: 1.5 m³/min) to obtain a composite pigment. An electron microscope photograph of the composite pigment of Example 4-2 is shown in FIG. 29.

Example 4-3

Figure 30:
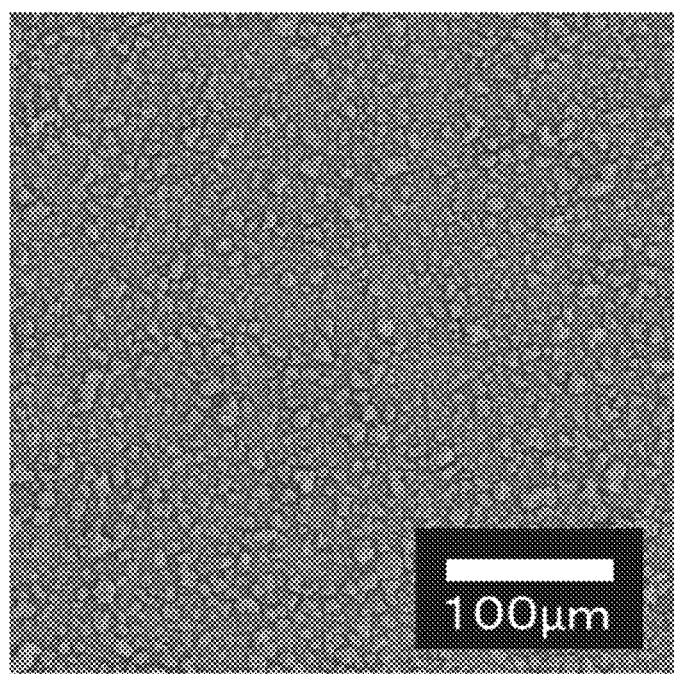
FIG. 30 is an electron microscope photograph of a composite pigment in Example 4-3 of the fourth invention of the present application.
Figure 33:
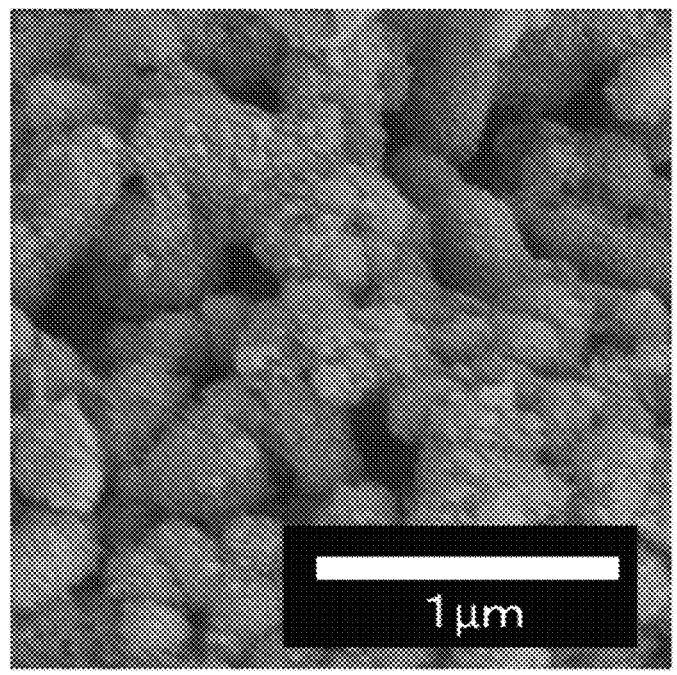
FIG. 33 is an electron microscope photograph (high-magnification enlarged view) of the composite pigment in Example 4-3 of the fourth invention of the present application.

Based on the production method of Example 4-1, a composite pigment not containing an extender pigment (calcium carbonate) was prepared. That is, 129 g of a titanium dioxide pigment obtained by a calcination treatment was dispersed in pure water, to which 116.4 g of No. 3 sodium silicate aqueous solution was added and followed by mixing to prepare a sodium silicate solution containing the titanium dioxide pigment (solid content concentration: 175 g/L). A composite pigment of titanium dioxide with silica as a binder was obtained in the same manner as in Example 4-1 except for the above. FIG. 30 shows an electron microscope photograph of the composite pigment of Example 4-3. A high magnification view of FIG. 30 is shown in FIG. 33.

(Evaluation of Physical Properties of Powder)

Various powder physical properties of various composite pigments of the Examples were measured as follows. The results are shown in Tables 4-1 and 4-2. Measurement methods of various powder physical properties are as follows. "Sample" in the descriptions of the measurement method below refers to the respective composite pigments of the various Examples.

(Measurement of Particle Size Distribution)

A particle size distribution was measured using a laser diffraction/scattering-type particle size distribution measuring apparatus (LA-910 manufactured by HORIBA, Ltd.). More particularly, an aqueous solution in which 0.3% by mass of sodium hexametaphosphate was dissolved was used as a dispersion medium, to which each sample was mixed. The dispersion was circulated and stirred in an apparatus, irradiated with ultrasonic waves for 3 min to be dispersed thoroughly, and adjusted such that the transmittance of laser light became 73±3%. Then a volumetric particle size distribution was measured. The relative refractive index was set at 2.00-0.00i, and the number of data fetching was set at 10 times. When the particle size distribution is expressed as a cumulative distribution, the particle diameter at 50% of the cumulative distribution is defined as a median diameter D50, and the particle diameter at 90% of the cumulative distribution is defined as a D90. The values of D50 and D90 of each sample are shown in Table 4-1.

Figure 31:
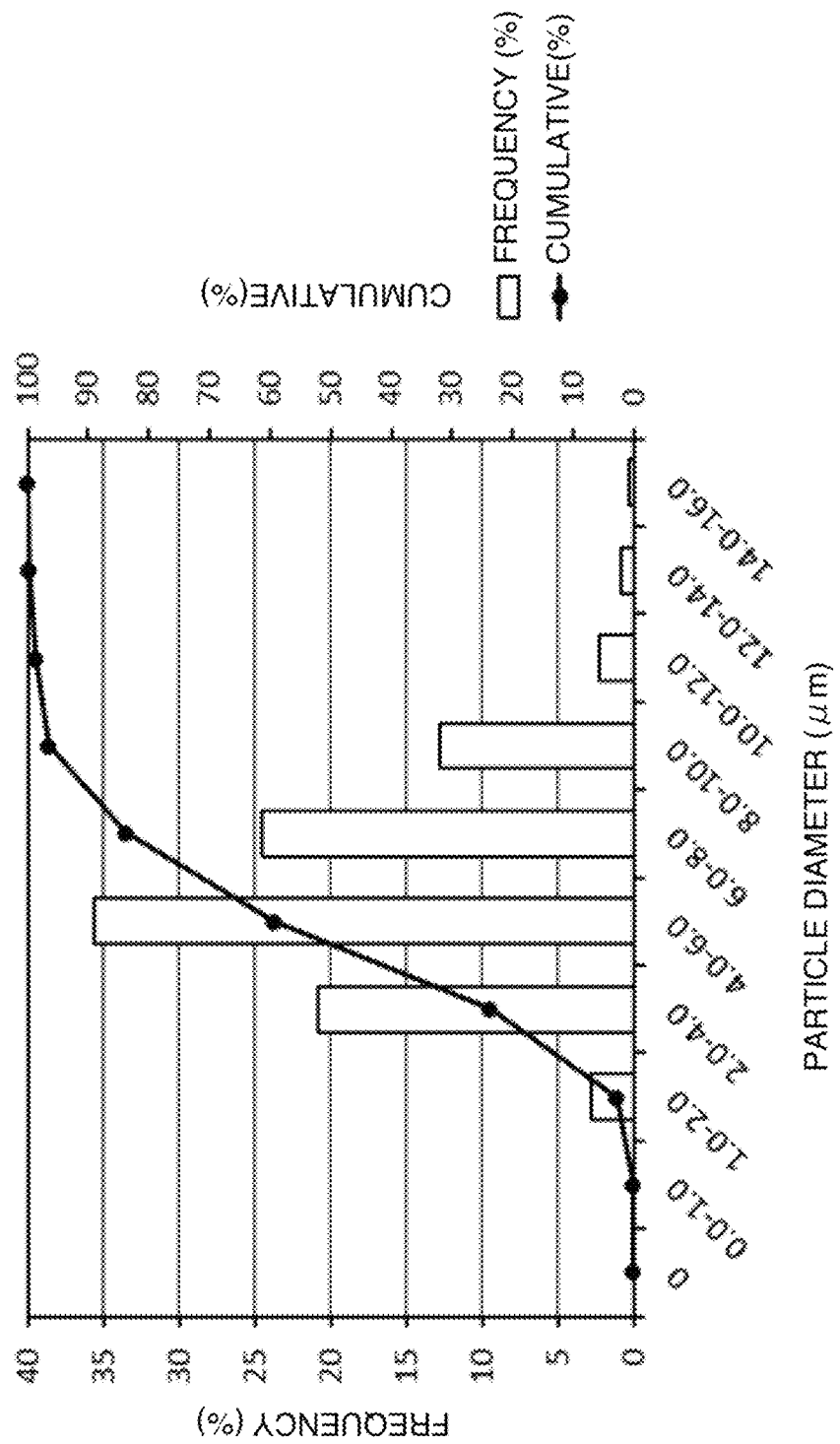
FIG. 31 is a volume particle size distribution diagram of the composite pigment in Example 4-1 of the fourth invention of the present application.

From the particle size distribution data, the ratios of particles having a predetermined size with respect to the total sample (the ratio of particles having a particle diameter of 1 μm or more, the ratio of particles having a particle diameter of 2 μm or more, and the ratio of particles having a particle diameter of 5 μm or more) were calculated respectively. The results are shown in Table 4-1. FIG. 31 shows the volume cumulative particle size distribution diagram of Example 4-1 as a representative of the various Examples.

TABLE 4-1

|  | D50 (μm) | D90 (μm) |
|---|---|---|
| Example 4-1 | 5.3 | 8.5 |
| Example 4-2 | 3.5 | 6.6 |
| Example 4-3 | 5.0 | 8.5 |

TABLE 4-2

| | Particle size distribution (%) | | |
|---|---|---|---|
| | >1 μm | >2 μm | >5 μm |
| Example 4-1 | 99 | 97 | 55 |
| Example 4-2 | 97 | 82 | 24 |
| Example 4-3 | 100 | 97 | 47 |

As shown in Table 4-2, the abundance ratio of particles having a particle diameter of 2 μm or more in the volume cumulative distribution measured by a laser diffraction/scattering-type particle size distribution measuring apparatus of each of the composite pigments of the Examples was 70% or more of the total. Further, the abundance ratio of particles having a particle diameter of 5 μm or more in the volume cumulative distribution of each of the composite pigments was 20% or more (preferably 40% or more) of the total.

(Preparation of Paint Composition)

A paint composition was prepared using the sample in each of the Examples. The pigment volume concentration (PVC) of the paint composition was set to 40%, and the solid volume concentration (SVC) of the paint composition was set to 36.4%. Specifically, the raw materials described in the following Table 4-3 were stirred for 5 min using a dispersing machine (T. K. ROBOMIX manufactured by Tokushu Kika Kogyo Co., Ltd., rotation speed: 3000 rpm), and then degassed by a hybrid mixer (HM-500 manufactured by KEYENCE CORPORATION) to obtain a paint composition.

In the following explanation, the paint compositions prepared by the above method using the samples of Examples 4-1, 4-2, and 4-3 are treated as the paint compositions of Examples 4-1, 4-2, and 4-3 respectively.

TABLE 4-3

| | | Example 4-1, 4-2 | Example 4-3 |
|---|---|---|---|
| Resin | Acrylic emulsion resin, PRIMAL AC-2235, manufactured by Rohm and Haas Japan K. K. | 33.4 parts by mass | 32.2 parts by mass |
| Dispersant | DISPERBYK-184 manufactured by BYK Additives & Instruments (Amine value: 15 mg KOH/g) | 1.0 parts by mass | 1.1 parts by mass |
| Pure water | | 4.2 parts by mass | 4.0 parts by mass |
| Emulsifier | TRITON CF-10 manufactured by Dow Chemical Company | 0.6 parts by mass | 0.6 parts by mass |
| Antifreezing Agent | Ethylene glycol manufactured by Kanto Chemical Co., Inc. | 5.5 parts by mass | 5.3 parts by mass |
| pH adjuster | 28% ammonia aqueous solution | 2.6 parts by mass | 2.5 parts by mass |
| Thickener | 2% CELLOSIZE aqueous solution, manufactured by Dow Chemical Company | 17.3 parts by mass | 16.6 parts by mass |
| Defoaming Agent | ADEKANATE B-748A manufactured by ADEKA CORPORATION | 0.1 parts by mass | 0.1 parts by mass |
| Sample | | 35.3 parts by mass | 37.5 parts by mass |

(Measurement of Viscosity of Paint)

For the paint composition in each of the Examples, a viscosity was measured using a Brookfield B-type rotary viscometer (TVB-10 Viscometer manufactured by Toki Sangyo Co., Ltd.). The measurement results are shown in Table 4-4. The measurement was performed under the following conditions. The paint composition was put in a 50 mL graduated cylinder, and the viscosity was measured at each of the rotation speeds (6 rpm and 60 rpm).

Rotor: TM4
Measurement temperature: 25° C.

TABLE 4-4

| | Viscosity (Pa · s) | |
|---|---|---|
| | 6 rpm | 60 rpm |
| Example 4-1 | 12.2 | 2.8 |
| Example 4-2 | 14.3 | 2.6 |
| Example 4-3 | 23.0 | 4.1 |

It was confirmed that the paint compositions of the Examples had low viscosity and good handling.

In addition to the above-mentioned paint compositions, the following were prepared as paint compositions of the Comparative Examples.

Comparative Example 4-1

A commercially available matting paint composition (ECOFLAT 60 manufactured by Nippon Paint Co., Ltd.) was prepared.

Comparative Example 4-2

A commercially available gloss emulsion paint (SILICONECERA UV FINISH COAT WB manufactured by Nippon Paint Co., Ltd.) was prepared.

Comparative Example 4-3

A matting paint composition was prepared by adding a commercially available matting agent (Sylysia 276 manufactured by Fuji Silysia Chemical Ltd.) to a commercially available gloss emulsion paint (SILICONECERA UV FINISH COAT WB manufactured by Nippon Paint Co., Ltd.). The addition amount of the matting agent was 5% by mass with respect to the gloss emulsion paint.

(Evaluation of Physical Properties of Paint Film)

Physical properties of various paint compositions of the Examples and Comparative Examples formed into paint films were evaluated. The results are shown in Table 4-5. The measurement methods for various physical properties of a paint film are as follows.

(Measurement of Gloss)

The gloss of a paint film obtained by applying and drying each of the above-described various paint compositions of the Examples and Comparative Examples was measured in accordance with JIS K 5600-4-7: 1999. First, a paint composition was applied onto a glass plate using a 4-mil film applicator up to the film thickness of about 40 μm. After drying the film, the specular gloss was measured under each of geometric conditions of 20°, 60°, and 85° using a gloss meter (haze-gloss meter manufactured by BYK-Gardner GmbH).

(Measurement of Hiding Power)

The hiding power of a paint film obtained by applying and drying each of the above-described various paint compositions of the Examples and Comparative Examples was measured in accordance with JIS K 5600-4-1: 1999. First, a paint composition was applied onto a test paper for the hiding power using a 4-mil film applicator up to the film thickness of about 40 μm. After drying the film, the $Y_b$ value (Y value at black part) and $Y_w$ value (Y value at white part) were respectively measured using a spectrophotometer (SD 5000 manufactured by Nippon Denshoku Industries Co., Ltd.). From the values of $Y_b$ value and $Y_w$ value, the hiding power (thereinafter, referred to as C.R.) was calculated according to the following equation.

$$C.R.\ (\%) = Y_b\ \text{value} / Y_w\ \text{value} \times 100$$

TABLE 4-5

| | Gloss | | | Hiding power | | C.R. |
|---|---|---|---|---|---|---|
| | 20° | 60° | 85° | Yb | Yw | (%) |
| Example 4-1 | 1.2 | 2.4 | 4.7 | 82.9 | 87.8 | 94.4 |
| Example 4-2 | 1.2 | 2.3 | 9.1 | 85.8 | 89.0 | 96.4 |
| Example 4-3 | 1.2 | 2.2 | 6.6 | 84.9 | 88.5 | 95.9 |
| Comparative Example 4-1 | 1.1 | 2.3 | 3.0 | 86.4 | 89.3 | 96.7 |
| Comparative Example 4-2 | 39.7 | 73.7 | 96.4 | 85.6 | 88.7 | 96.6 |
| Comparative Example 4-3 | 2.5 | 17.9 | 41.7 | 85.0 | 89.4 | 95.1 |

As compared to the paint films of the paint compositions in Comparative Examples 4-2 and 4-3, the paint film of the paint composition in each of the Examples had a smaller specular gloss at 20° and 60°, and the gloss was also apparently reduced, and a sufficient matte effect was exhibited. The low-gloss property (matte effect) in each of the Examples resulted in reducing the gloss even to the degree of a gloss reduction referred to as "matting (specular gloss of 5% or less at 60°)" over the degree of a gloss reduction generally referred to as "70% gloss", "50% gloss", or "30% gloss". Further, with respect to the paint film of the paint composition in each of the Examples, the specular gloss at 20° or 60° was sufficiently low, and the specular gloss at 85° was 10% or less to indicate that so-called 85° gloss was also remarkably reduced.

In addition, it was confirmed that the paint films of the Examples had a hiding power almost the same as those of the Comparative Examples, and had a sufficient hiding power.

As described above, with respect to the paint composition of each Example, not only the specular glosses at 20° and 60°, but also the specular gloss at 85° was highly reduced. The degree of a gloss reduction was the same level as Comparative Example 4-1 having a high matte effect (commercially available flat emulsion paint).

In this regard, it is prerequisite for expression of the high matte effect that the pigment component of the paint of Comparative Example 4-1 is strongly dispersed. On the other hand, in the case of the composite pigments of the Examples, the paint can be prepared merely by adding the same to a paint resin and mixing it lightly, and therefore it has an advantage of labor saving in dispersion and formation of a paint.

(Evaluation of Tactile Feeling of Paint Film)

Evaluation of the smoothness of the tactile feeling was performed on a paint film obtained by applying and drying each of the paint compositions in the Examples and Comparative Examples.

For quantifying the tactile feeling of the paint film as objective data, a friction coefficient was measured. Specifically, a paint composition was applied onto a glass plate using a 4-mil film applicator up to the film thickness of about 40 μm. The applied composition was dried, and a MMD (mean friction coefficient variation) was then measured using a friction tester (KES-SE, manufactured by Kato Tech Co., Ltd.). The MMD (mean friction coefficient variation) is used as an index indicating the feeling of the roughness of a paint film. The measurement results are shown in Table 4-6 below. In Table 4-6, a tactile feeling at the time of actually touching the paint film with a finger is shown in three grades (◉: very smooth tactile feeling, ○: smooth tactile feeling, X: highly rough tactile feeling) along with the value of the aforementioned MMD.

TABLE 4-6

| | MMD | Tactile feeling |
|---|---|---|
| Example 4-1 | 0.0127 | ○ |
| Example 4-2 | 0.0126 | ○ |
| Example 4-3 | 0.0169 | ○ |
| Comparative Example 4-1 | 0.0253 | X |
| Comparative Example 4-2 | 0.0110 | ○ |
| Comparative Example 4-3 | 0.0117 | ○ |

A paint film of any of the paint compositions of the Examples had a smaller value of MMD (mean friction coefficient variation) compared to the paint film of the paint composition of Comparative Example 4-1. Further, the value of MMD and the tactile feeling at the time of actually touching the paint film are nearly correlated, and the tactile feeling in any of the Examples was excellent (smooth).

As described above, a paint composition or paint film containing each composite pigment of the present Examples are superior, because the smooth tactile feeling of a paint film can be realized while reducing remarkably the gloss including 85° gloss, and good handling can be exhibited.

Examples of the Present Invention (the Fifth Invention of the Present Application)

The present Examples are those re-collected by appropriately using the above-mentioned Examples and Comparative Examples of the first invention of the present application to the fourth invention of the present application. Specifically, the present Examples are as follows.

(Evaluation of Various Powder Physical Properties (Particle Size Distribution, Specific Surface Area, Oil Absorption))

Examples 5-1 to 5-4 correspond to the composite pigments of Examples 1-1 to 1-4 in the above-mentioned [Examples of the present invention (the first invention of the present application)], respectively. Therefore, the various powder physical properties (particle size distribution, specific surface area, oil absorption) of these Examples were determined according to (Evaluation of physical properties of powder), (Measurement of particle size distribution), (Measurement of specific surface area) and (Measurement of oil absorption), and specifically, were as shown in Table 1-1. Then, Comparative Examples 1-1 to 1-5 in Table 1-1 are dealt with as Comparative Examples 5-1 to 5-5. The re-collected results are shown in Table 5-1.

TABLE 5-1

|  | Particle size distribution | | | Specific surface area ($m^2/g$) | Oil absorption (ml/100 g) |
| --- | --- | --- | --- | --- | --- |
|  | D10 (μm) | D50 (μm) | D90 (μm) | | |
| Example 5-1 | 1.7 | 5.6 | 12.9 | 63.9 | 53 |
| Example 5-2 | 2.4 | 8.4 | 19.1 | 64.2 | 86 |
| Example 5-3 | 1.5 | 4.5 | 10.8 | 55.1 | 47 |
| Example 5-4 | 0.8 | 1.3 | 2.3 | 9.2 | — (not measured) |
| Comparative Example 5-1 | 1.3 | 3.0 | 9.4 | 1.7 | 10 |
| Comparative Example 5-2 | 2.0 | 4.7 | 12.9 | 0.7 | 10 |
| Comparative Example 5-3 | 2.2 | 9.4 | 23.3 | 0.8 | 10 |
| Comparative Example 5-4 | 4.3 | 7.4 | 12.2 | 191.6 | 180 |
| Comparative Example 5-5 | 3.0 | 7.4 | 13.5 | 3.5 | 36 |

Further, Examples 5-5 to 5-11 in Table 5-2 correspond to the composite pigments of Examples 2-1 to 2-7 in the above-mentioned [Examples of the present invention (the second invention of the present application)], respectively. Therefore, the various powder physical properties (particle size distribution (respective particle diameters (median diameter) at cumulative 50% and cumulative 90%), specific surface area, oil absorption and composition) of these Examples were determined according to (Evaluation of physical properties of powder), (Measurements of median diameter and diameter on cumulative 90%), (Measurement of specific surface area), (Measurement of oil absorption) and (Measurements of compositions of composite pigments and the like) in the above-mentioned [Examples of the present invention (the second invention of the present application)], and specifically, were as shown in Table 2-1. In the present Examples, Comparative Example 2-1 in Table 2-1 is dealt with as Comparative Example 5-9.

Then, Examples 5-12 and 5-13 correspond to the composite pigments of Examples 4-1 and 4-2 in the above-mentioned [Examples of the present invention (the fourth invention of the present application)], respectively. Therefore, the various powder physical properties (particle size distribution (respective particle diameters (median diameter) at cumulative 50% and cumulative 90%) of these Examples were determined according to (Evaluation of physical properties of powder) and (Measurement of particle size distribution) in the above-mentioned [Examples of the present invention (the fourth invention of the present application)], and specifically, were as shown in Table 4-1. Here, the specific surface area, the oil absorption and the composition were also determined according to (Measurement of specific surface area), (Measurement of oil absorption) and (Measurements of compositions of composite pigments and the like) in the above-mentioned [Examples of the present invention (the second invention of the present application)]. These results are shown collectively in Table 5-2.

TABLE 5-2

|  | D50 (μm) | D90 (μm) | Specific surface area ($m^2/g$) | Oil absorption (ml/100 g) | Composition (mass ratio) | | | |
| --- | --- | --- | --- | --- | --- | --- | --- | --- |
|  |  |  |  |  | $TiO_2$ | $CaCO_3$ | $BaSO_4$ | $SiO_2$ |
| Example 5-5 | 1.4 | 1.8 | 21.5 | 44 | 64 | 25 | — | 11 |
| Example 5-6 | 1.0 | 1.7 | 19.6 | 45 | 47 | 43 | — | 10 |
| Example 5-7 | 1.4 | 2.3 | 22.4 | 47 | 67 | 19 | — | 14 |
| Example 5-8 | 1.4 | 2.5 | 27.2 | 52 | 55 | 27 | — | 18 |
| Example 5-9 | 1.8 | 3.3 | 28.8 | 50 | 61 | 24 | — | 15 |
| Example 5-10 | 1.4 | 1.4 | 19.3 | 42 | 59 | 29 | — | 12 |
| Example 5-11 | 1.6 | 2.8 | 24.5 | 39 | 51 | — | 37 | 12 |
| Example 5-12 | 5.3 | 8.5 | 15.2 | 52 | 66 | 22 | — | 11 |
| Example 5-13 | 3.5 | 6.6 | 18.9 | 56 | 66 | 20 | — | 14 |
| Comparative Example 5-9 | 0.6 | 0.9 | 14.2 | 21 | 61 | 39 | — | — |

Then, Table 5-3 collectively shows, as Examples 5-5 to 5-9 and Examples 5-11 to 5-13, results of respective ratios (a ratio of particles of 1 μm or larger in particle diameter, a ratio of particles of 2 μm or larger in particle diameter, and a ratio of particles of 5 μm or larger in particle diameter) accounted for by particles having predetermined sizes in a sample as a whole, which were calculated from data of the particle size distribution determined according to (Measurement of particle size distribution) in the above-mentioned [Examples of the present invention (the second invention of the present application)] and [Examples of the present invention (the fourth invention of the present application)]. Here, the results of Examples 5-12 and 5-13 are shown as Examples 4-1 and 4-2 in Table 4-2, respectively. A volume cumulative particle size distribution diagram of Example 5-12 is FIG. 31 showing the volume cumulative particle size distribution diagram of Example 4-1 corresponding to this Example.

TABLE 5-3

| | Particle size distribution (%) | | |
|---|---|---|---|
| | >1 μm | >2 μm | >5 μm |
| Example 5-5 | 72 | 16 | 0 |
| Example 5-6 | 51 | 6 | 0 |
| Example 5-7 | 80 | 19 | 0 |
| Example 5-8 | 77 | 21 | 0 |
| Example 5-9 | 89 | 40 | 3 |
| Example 5-11 | 84 | 30 | 1 |
| Example 5-12 | 99 | 97 | 55 |
| Example 5-13 | 97 | 82 | 24 |

From Table 5-3, in the composite pigments (produced by using an inorganic color pigment containing zinc) of Examples 5-12 and 5-13, the abundance ratio of composite pigment particles of 2 μm or larger in particle diameter was 70% or higher in the whole, in a volume cumulative distribution measured by the laser diffraction/scattering-type particle size distribution measuring apparatus. Then in the volume cumulative distribution, the abundance ratio of the composite pigment particles of 5 μm or larger was 20% or higher (preferably 40% or higher) in the whole.

Preparations of the composite pigments of Examples 5-1 to 5-4 and the paint compositions using a matting agent of Comparative Examples 5-1 to 5-5 in Table 5-4 were as described in (Preparation of paint compositions) in the above-mentioned [Examples of the present invention (the first invention of the present application)], and hence, the descriptions in Table 5-4 are the same as in Table 1-2.

TABLE 5-4

| | | Examples 5-1 to 5-4, Comparative Examples 5-6 to 5-8 | Comparative Examples 5-1 to 5-3 | Comparative Example 5-4 | Comparative Example 5-5 |
|---|---|---|---|---|---|
| Resin | Acrylic emulsion resin, PRIMAL AC-2235 manufactured by Rohm and Haas Japan K. K. | 43.5 parts by mass | 40.7 parts by mass | 46.4 parts by mass | 49.3 parts by mass |
| Dispersant | DISPERBYK-184 manufactured by BYK Additives & Instruments (amine value: 15 mg KOH/g) | 0.5 parts by mass | 0.7 parts by mass | 0.4 parts by mass | 0.2 parts by mass |
| Pure water | | 7.8 parts by mass | 7.5 parts by mass | 8.1 parts by mass | 8.4 parts by mass |
| Emulsifier | TRITON CF-10 manufactured by Dow Chemical Company | 0.8 parts by mass | 0.8 parts by mass | 0.9 parts by mass | 0.9 parts by mass |
| Antifreezing agent | Ethylene glycol, manufactured by Kanto Chemical Co., Inc. | 7.1 parts by mass | 6.7 parts by mass | 7.6 parts by mass | 8.1 parts by mass |
| pH adjuster | 28% ammonia aqueous solution | 0.2 parts by mass | 0.2 parts by mass | 0.2 parts by mass | 0.3 parts by mass |
| Thickener | 2% CELLOSIZE aqueous solution manufactured by Dow Chemical Company | 22.4 parts by mass | 21.0 parts by mass | 23.9 parts by mass | 25.4 parts by mass |
| Defoaming agent | ADEKANATE B-748A manufactured by ADEKA CORPORATION | 0.1 parts by mass | 0.1 parts by mass | 0.2 parts by mass | 0.2 parts by mass |
| Sample | | 17.6 parts by mass | 22.3 parts by mass | 12.3 parts by mass | 7.2 parts by mass |

Preparations of the samples of Examples 5-5 to 5-9 and Examples 5-11 to 5-13 and the paint composition using a mixed powder of Comparative Example 5-9 in Table 5-5 were as described in (Preparation of paint compositions) in the above-mentioned [Examples of the present invention (the second invention of the present application)] and [Examples of the present invention (the fourth invention of the present application)], and hence, the descriptions in Table 5-5 are as described in Tables 2-2 and 4-3. The preparations were performed, as described therein, by setting the pigment volume concentration (PVC) of the paint compositions at 40% and the solid volume concentration (SVC) thereof at 36.4%.

TABLE 5-5

| Resin | Acrylic emulsion resin, PRIMAL AC-2235, manufactured by Rohm and Haas Japan K. K. | 33.4 parts by mass |
|---|---|---|

TABLE 5-5-continued

| Dispersant | DISPERBYK-184 (amine value: 15 mg KOH/g), manufactured by BYK Additives & Instruments | 1.0 parts by mass |
| --- | --- | --- |
| Pure water | | 4.2 parts by mass |
| Emulsifier | TRITON CF-10, manufactured by Dow Chemical Company | 0.6 parts by mass |
| Antifreezing Agent | Ethylene glycol, manufactured by Kanto Chemical Co., Inc. | 5.5 parts by mass |
| pH adjuster | 28% ammonia aqueous solution | 2.6 parts by mass |
| Thickener | 2% CELLOSIZE aqueous solution manufactured by Dow Chemical Company | 17.3 parts by mass |
| Defoaming Agent | ADEKANATE B-748A manufactured by ADEKA CORPORATION | 0.1 parts by mass |
| Sample of Example or Comparative Example | | 35.3 parts by mass |

The viscosities of the composite pigments of Examples 5-1 to 5-4 and various paint compositions using a matting agent of Comparative Examples 5-1 to 5-8 in Table 5-6 were measured as described in (Measurement of the paint viscosity) in the above-mentioned [Examples of the present invention (the first invention of the present application)], and specifically, were as shown in Table 1-3.

TABLE 5-6

| | Viscosity (Pa · s) | |
| --- | --- | --- |
| | 6 rpm | 60 rpm |
| Example 5-1 | 8.9 | 1.7 |
| Example 5-2 | 17.2 | 3.2 |
| Example 5-3 | 10.6 | 2.1 |
| Example 5-4 | 9.4 | 1.9 |
| Comparative Example 5-1 | 5.3 | 1.1 |
| Comparative Example 5-2 | 4.9 | 1.1 |
| Comparative Example 5-3 | 4.4 | 0.9 |
| Comparative Example 5-4 | 30.7 | 5.7 |
| Comparative Example 5-5 | 5.0 | 1.0 |
| Comparative Example 5-6 | 12.5 | 2.5 |
| Comparative Example 5-7 | 12.2 | 2.4 |
| Comparative Example 5-8 | 12.6 | 2.6 |

The paint compositions of the various Examples were lower in the viscosity than the paint composition of Comparative Example 5-4 using silica as a matting agent, and exhibited good handling. The viscosities (handling) of the Examples resulted in being equal to or lower than those of the paint compositions (Comparative Examples 5-6 to 5-8) using a mixture of silica and barium sulfate as a matting agent; and some Examples attained low viscosities (high handling) nearly equal to the viscosities of the paint compositions (Comparative Examples 5-1 to 5-3 and 5-5) using an extender pigment (barium sulfate), resin beads or the like as a matting agent.

For Examples 5-5 to 5-9 and Examples 5-11 to 5-13, the viscosities of the various paint compositions were measured as described in (Measurement of viscosity of paint) in the above-mentioned [Examples of the present invention (the fourth invention of the present application)], and their results are shown in Table 5-7.

It was confirmed that any of the paint compositions of the Examples in Table 5-7 was good in handling.

TABLE 5-7

| | Viscosity (Pa · s) | |
| --- | --- | --- |
| | 6 rpm | 60 rpm |
| Example 5-5 | 10.5 | 1.9 |
| Example 5-6 | 12.6 | 2.7 |
| Example 5-7 | 12.4 | 2.7 |
| Example 5-8 | 15.1 | 3.2 |
| Example 5-11 | 15.3 | 3.2 |
| Example 5-12 | 12.2 | 2.8 |
| Example 5-13 | 14.3 | 2.6 |

(Evaluation of Physical Properties of Paint Film)

For the paint compositions of the various Examples and Comparative Examples, the results of the evaluation of the physical properties of the paint films are collectively shown in Tables 5-8 and 5-9. The measurement methods of the various physical properties of the paint films were as described in (Evaluation of physical properties of paint film), (Evaluation of gloss) and (Measurement of hiding power) in the above-mentioned [Examples of the present invention (the first invention of the present application)]. Therefore, Examples 5-1 to 5-4 and Comparative Examples 5-1 to 5-8 in Table 5-8 are shown as Examples 1-1 to 1-4 and Comparative Examples 1-1 to 1-8 in Table 1-4, respectively. Then, in the Examples and Comparative Examples in Table 5-9, the results of the measurement of the paint film strength are shown together. The measurement of the paint film strength was performed as described in (Measurement of strength of paint film) in the above-mentioned [Examples of the present invention (the second invention of the present application)]. Therefore, the measurement results of the paint film strengths of Examples 5-5 to 5-11 and Comparative Example 5-9 in Table 5-9 are shown in Examples 2-1 to 2-7 and Comparative Example 2-1 in Table 2-3 together with the glosses (20°, 60°) and the hiding powers (Yb, Yw and C.R.).

Here, Comparative Example 5-10 in Table 5-9 shows the results used a commercially available matting paint composition (ECOFLAT 60 manufactured by Nippon Paint Co., Ltd.); Comparative Example 5-11 therein shows the results used a commercially available gloss emulsion paint (SILICONECERA UV FINISH COAT WB manufactured by Nippon Paint Co., Ltd.); Comparative Example 5-12 therein shows the results used a matting paint composition prepared by adding a commercially available matting agent (Sylysia 276 manufactured by Fuji Silysia Chemical Ltd., the addition amount was 5% by mass to a gloss emulsion paint) to the commercially available gloss emulsion paint (SILICONECERA UV FINISH COAT WB manufactured by Nippon Paint Co., Ltd.); the measurement results of the paint film strengths of Comparative Examples 5-10 and 5-11 are respectively shown as Comparative Examples 2-1 and 2-3 in Table 2-3 in the above-mentioned [Examples of the present invention (the second invention of the present application)]; and the glosses (20°, 60° and 85°) and the hiding powers ($Y_b$, $Y_w$ and C.R.) of Comparative Examples 5-10 to 5-12 are respectively shown as Comparative Examples 4-1 to 4-3 in Table 4-5 in the above-mentioned [Examples of the present invention (the fourth invention of the present application)].

TABLE 5-8

|  | Gloss | | | Hiding power | | |
| --- | --- | --- | --- | --- | --- | --- |
|  | 20° | 60° | 85° | Yb | Yw | C.R. (%) |
| Example 5-1 | 0.5 | 5.0 | 4.8 | 6.8 | 81.3 | 8.3 |
| Example 5-2 | 0.4 | 3.0 | 2.7 | 10.6 | 80.9 | 13.0 |
| Example 5-3 | 0.5 | 3.3 | 5.1 | 9.5 | 81.1 | 11.7 |
| Example 5-4 | 0.5 | 4.1 | 40.7 | 7.0 | 81.6 | 8.6 |
| Comparative Example 5-1 | 1.5 | 16.7 | 30.8 | 4.6 | 80.1 | 5.7 |
| Comparative Example 5-2 | 0.8 | 9.4 | 10.6 | 5.0 | 80.9 | 6.1 |
| Comparative Example 5-3 | 1.2 | 13.0 | 11.0 | 4.8 | 80.9 | 5.9 |
| Comparative Example 5-4 | 0.4 | 3.3 | 6.1 | 9.4 | 81.2 | 11.6 |
| Comparative Example 5-5 | 1.5 | 13.8 | 6.6 | 4.3 | 81.4 | 5.3 |
| Comparative Example 5-6 | 0.4 | 5.5 | 5.9 | 5.5 | 80.8 | 6.8 |
| Comparative Example 5-7 | 0.4 | 5.8 | 6.3 | 5.2 | 81.3 | 6.4 |
| Comparative Example 5-8 | 0.5 | 6.9 | 5.9 | 5.2 | 81.4 | 6.4 |

As shown in Table 5-8, the paint films of the transparent matting paint compositions of Examples 5-1 to 5-4 had lower 20° and 60° specular glosses than the paint films of the transparent matting paint compositions of Comparative Examples 5-1 to 5-3 (matting agent of barium sulfate), Comparative Example 5-5 (matting agent of resin beads) and Comparative Examples 5-6 to 5-8 (matting agent of a mixture of barium sulfate and silica), and visually reduced gloss and developed a sufficient matte effect. The low-gloss property (matte effect) of these Examples was equal to that of Comparative Example 5-4 having a strong matte effect, and a gloss thereof was reduced to the degree of a gloss reduction referred to as "matting (a 60° specular gloss of 5% or lower)" over the degree of a gloss reduction generally referred to as "70% gloss", "50% gloss" or "30% gloss".

Then, the hiding powers of the paint films of the transparent matting paint compositions of the Examples 5-1 to 5-3 reduced the 85° specular gloss to 10% or lower, sufficiently reducing so-called 85° gloss.

Further, the hiding powers of the paint films of the transparent matting paint compositions of the Examples were nearly equal to those of the Comparative Examples, and maintained low hiding powers. Such transparent matting paint compositions do not hinder color of the base layer even when applied onto a color base layer, and is therefore appropriate as a topcoat matting paint composition which is applied onto the color base layer.

These facts were as already described in (Measurement of hiding power) in the above-mentioned [Examples of the present invention (the first invention of the present application)].

TABLE 5-9

|  | Gloss | | | Hiding power | | C.R. (%) | Pencil hardness |
| --- | --- | --- | --- | --- | --- | --- | --- |
|  | 20° | 60° | 85° | Yb | Yw | | |
| Example 5-5 | 1.2 | 2.4 | 24.2 | 87.4 | 89.6 | 97.5 | 4B |
| Example 5-6 | 1.1 | 2.7 | 36.6 | 79.8 | 87.2 | 91.6 | 2B |
| Example 5-7 | 1.1 | 2.6 | 29.7 | 83.2 | 88.3 | 94.2 | 4B |
| Example 5-8 | 1.2 | 2.4 | 30.2 | 83.6 | 88.5 | 94.5 | 4B |
| Example 5-9 | 1.1 | 2.7 | 28.3 | 83.4 | 88.5 | 94.3 | B |
| Example 5-11 | 1.1 | 2.4 | 26.8 | 83.7 | 88.4 | 94.7 | 4B |
| Example 5-12 | 1.2 | 2.4 | 4.7 | 82.9 | 87.8 | 94.4 | — |
| Example 5-13 | 1.2 | 2.3 | 9.1 | 85.8 | 89.0 | 96.4 | — |
| Comparative Example 5-9 | 3.6 | 26 | 46.4 | 85.7 | 89.5 | 95.8 | 3B |
| Comparative Example 5-10 | 1.1 | 2.3 | 3.0 | 80.9 | 86 | 94 | Lower than 6B |
| Comparative Example 5-11 | 39.7 | 73.7 | 96.4 | 85.6 | 88.7 | 96.6 | — |
| Comparative Example 5-12 | 2.5 | 17.9 | 41.7 | 85.0 | 89.4 | 95.1 | F |

The paint films of the paint compositions of Examples 5-5 to 5-13 had lower 20° and 60° specular glosses than the paint films of the paint compositions of Comparative Examples 5-9, Comparative Example 5-11 and Comparative Example 5-12, and visually reduced gloss and developed a sufficient matte effect. The low-gloss property (matte effect) of these Examples was equal to that of Comparative Example 5-10 (a commercially available flat emulsion paint), and gloss thereof was reduced even to the degree of a gloss reduction referred to as "matting (a 60° specular gloss of 5% or lower)" over the degree of a gloss reduction generally referred to as "70% gloss", "50% gloss" or "30% gloss". Then, the paint films of the paint compositions of Examples 5-12 and 5-13 had sufficiently low 20° and 60° specular glosses, and moreover also had a 85° specular gloss of 10% or lower, highly reducing so-called 85° gloss.

Further, the paint films of the paint compositions of Examples 5-5 to 5-13 had a practically sufficient hiding power nearly equal to that of the paint compositions of Comparative Examples 5-9 to 5-12. In particular, the paint film of Example 5-1 had a high C.R. value and could attain a higher hiding power than that of the Comparative Examples.

Further, it was confirmed that the paint film of the paint composition in each of the Examples had a sufficient pencil hardness and had a practically sufficient paint film strength.

These facts were as already described in (Measurement of strength of paint film) in the above-mentioned [Examples of the present invention (the second invention of the present application)] and (Measurement of hiding power) in the above-mentioned [Examples of the present invention (the fourth invention of the present application)].

As described above, the paint compositions of Examples 5-5 to 5-13 had paint film physical properties (gloss, hiding power and the like) equal to or higher than those of the Comparative Examples, and highly reduced also the 20° and 60° specular glosses to degrees nearly equal to Comparative Example 5-10.

Here, the paint of Comparative Example 5-10 needed strong dispersion of pigment components in order to develop a high matte effect. By contrast, using each composite pigment of the Examples was superior in that: labor saving in dispersion and formation of paints could be achieved merely by adding the same to a paint resin and mixing it lightly; and the paint films having the low-gloss property (matte effect) could be prepared without separate addition of a matting agent.

(Evaluation of Uneven Loss of Gloss of Paint Film)

Evaluation of the uneven loss of gloss of the paint films made by application and drying of the transparent matting paint compositions of Examples 5-1 to 5-4 and Comparative Examples 5-1 to 5-8 was as described in (Evaluation of uneven loss of gloss of paint film) in the above-mentioned [Examples of the present invention (the first invention of the present application)]. Specifically, Examples 5-1 to 5-4 and Comparative Examples 5-1 to 5-8 in Table 5-10 are shown as Examples 1-1 to 1-4 and Comparative Examples 1-1 to 1-8 in Table 1-5, respectively.

TABLE 5-10

| | Uneven loss of gloss | | |
|---|---|---|---|
| | 20° | 60° | 85° |
| Example 5-1 | 0.0 | 0.3 | 0.1 |
| Example 5-2 | 0.1 | 0.5 | 0.1 |
| Example 5-3 | 0.1 | 0.3 | 0.3 |
| Example 5-4 | 0.1 | 0.6 | 1.7 |
| Comparative Example 5-1 | 0.1 | 1.4 | 1.4 |
| Comparative Example 5-2 | 0.0 | 0.4 | 1.1 |
| Comparative Example 5-3 | 0.2 | 0.5 | 2.0 |
| Comparative Example 5-4 | 0.1 | 0.4 | 0.5 |
| Comparative Example 5-5 | 0.0 | 0.3 | 0.2 |
| Comparative Example 5-6 | 0.1 | 0.7 | 0.2 |
| Comparative Example 5-7 | 0.1 | 1.3 | 0.1 |
| Comparative Example 5-8 | 0.1 | 0.6 | 0.1 |

The values of the specular glosses (20°, 60°, 85°) in Table 5-10 and the visual (uneven loss of gloss) impression of the real paint films exhibited a rough correlation, and it was likely that the larger the numerical values of the standard deviations, the greater the uneven loss of gloss of the paint films. Specifically, the paint films of Comparative Examples 5-1 to 5-3 containing barium sulfate as a single substance had a remarkable uneven loss of gloss of their paint films. By contrast, it was confirmed that similarly to the other Comparative Examples, the paint films of Examples 5-1 to 5-4 exhibited no uneven loss of gloss, and the gloss was uniformly reduced at any place of the paint films. These facts were as already described in (Evaluation of uneven loss of gloss of paint film) in the above-mentioned [Examples of the present invention (the first invention of the present application)].

(Evaluation of Tactile Feeling of Paint Film)

Evaluation of the tactile feeling of the paint films made by application and drying of the transparent matting paint compositions of Examples 5-1 to 5-4 and Comparative Examples 5-1 to 5-8 was as described in (Evaluation of tactile feeling of paint film) in the above-mentioned [Examples of the present invention (the first invention of the present application)]. Specifically, the tactile feeling evaluation results of the paint films of Examples 5-1 to 5-4 and Comparative Examples 5-1 to 5-8 in Table 5-11 are shown in Examples 1-1 to 1-4 and Comparative Examples 1-1 to 1-8 in Table 1-6, respectively. Therefore, evaluation of MMD (variation in the mean friction coefficient) in the Table and evaluation of the tactile feeling when a paint film was actually touched with a finger (○: smooth tactile feeling, Δ: rough tactile feeling, X: highly rough tactile feeling) were as described in (Evaluation of tactile feeling of paint film) in the above-mentioned [Examples of the present invention (the first invention of the present application)].

TABLE 5-11

| | MMD | Tactile Feeling |
|---|---|---|
| Example 5-1 | 0.0105 | ○ |
| Example 5-2 | 0.0100 | ○ |
| Example 5-3 | 0.0070 | ○ |
| Example 5-4 | 0.0066 | ○ |
| Comparative Example 5-1 | 0.0285 | X |
| Comparative Example 5-2 | 0.0207 | Δ |
| Comparative Example 5-3 | 0.0664 | X |
| Comparative Example 5-4 | 0.0190 | ○ |
| Comparative Example 5-5 | 0.0075 | ○ |
| Comparative Example 5-6 | 0.0291 | Δ |
| Comparative Example 5-7 | 0.0202 | Δ |
| Comparative Example 5-8 | 0.0262 | Δ |

Any of the paint films of the paint compositions of Examples 5-1 to 5-4 had better tactile feeling (smoother) than the paint films (Comparative Examples 5-1 to 5-3 and Comparative Examples 5-6 to 5-8), any of which contained an extender pigment (barium sulfate). The degree of the smoothness was a degree nearly equal to or higher than that of paint films usually having smooth tactile feeling, like the paint films (Comparative Examples 5-4 and 5-5), which contained silica or resin beads as a matting agent.

As described above, the paint compositions and paint films in which the composite pigments of the present Examples were blended were superior in that these maintained good handling and had a low-gloss property (matte effect), and could attain good paint film tactile feeling.

These facts were as described in (Evaluation of tactile feeling of paint film) in the above-mentioned [Examples of the present invention (the first invention of the present application)].

The measurement results of the evaluation of the tactile feeling of the paint films of Examples 5-5 and 5-11 to 5-13 and Comparative Examples 5-10 to 5-12 in Table 5-12 were results measured as described in (Evaluation of tactile feeling of paint film) in the above-mentioned [Examples of the present invention (the fourth invention of the present application)] and were also results measured as described in (Evaluation of tactile feeling of paint film) in the above-mentioned [Examples of the present invention (the first invention of the present application)]. Therefore, the results of the tactile feeling evaluation of the Examples 5-12 and 5-13 and Comparative Examples 5-10 to 5-12 in Table 5-12 are shown as Examples 4-1 and 4-2 and Comparative Examples 4-1 to 4-3 in Table 4-6.

Any of the paint films of the paint compositions of Examples 5-5 and 5-11 to 5-13 had a lower value of MMD (variation in mean friction coefficient) than the paint film of the paint composition of Comparative Example 5-11. Then, the value of MMD and the tactile feeling of the paint films when being touched with a finger exhibited a rough correlation, and the tactile feeling of the Examples was good (smooth). These facts were as described in (Evaluation of tactile feeling of paint film) in the above-mentioned [Examples of the present invention (the fourth invention of the present application)].

TABLE 5-12

| | MMD | Tactile Feeling |
|---|---|---|
| Example 5-5 | 0.0112 | ○ |
| Example 5-11 | 0.0079 | ○ |
| Example 5-12 | 0.0127 | ○ |
| Example 5-13 | 0.0126 | ○ |
| Comparative Example 5-10 | 0.0110 | ○ |
| Comparative Example 5-11 | 0.0253 | X |
| Comparative Example 5-12 | 0.0117 | ○ |

(Evaluation of Stain Removability)

As described in comparison of Example 2-1 with Comparative Examples 2-2 and 2-3 in (Evaluation of stain removability) in the above-mentioned [Examples of the present invention (the second invention of the present application)], although in the paint film of the paint composition of Example 5-5, stain could be completely wiped out, in the paint film of the paint composition (a commercially available flat emulsion paint) of Comparative Example 5-11, stain could hardly be removed, or the paint film resulted in peeling off; and it was found that in the paint film of the paint composition (a combination of a commercially available gloss emulsion paint and a commercially available matting agent) of Comparative Example 5-12, stain could be nearly removed.

As described above, the paint compositions and the paint films in which the composite pigments of the Examples were blended were superior in that these highly reduced gloss including 85° gloss and simultaneously could attain a smooth paint film tactile feeling and moreover exhibited a good handling.

INDUSTRIAL APPLICABILITY

The composite pigment of the present invention, since being able to highly attain all of good handling, a low-gloss property (matte effect) and good paint film tactile feeling, can appropriately be used for paint films having the low-gloss property (matte effect), matting paint films and the like for buildings and vehicles and the like.

The composite pigment of the present invention can reduce a gloss of paint films by modifying inorganic color pigments, and can be used in various applications as a pigment having the low-gloss property (matte effect), a matting pigment and the like. Further the composite pigment of the present invention, since also when being blended in paint films, both the property of having a low gloss and a luster and the good tactile feeling of the paint films can simultaneously be satisfied, can be used for paint films having the low-gloss property (matte effect), matting paint films and the like.

The composite pigment of the present invention, since being able to achieve labor saving in dispersion and formation of paints can be achieved and being capable of developing a high matte effect, is appropriate as a pigment to be used for paint compositions requiring the low-gloss property (matte effect).

The invention claimed is:

1. A composite pigment comprising:
   extender pigment particles comprising barium sulfate; and
   an inorganic compound comprising silica,
   the composite pigment in which a plurality of the extender pigment particles are aggregated in a granular shape with the inorganic compound interposed between the particles,
   wherein a content ratio of the extender pigment particles and the inorganic compound in the composite pigment is 0.3 to 3 parts by volume of the inorganic compound to 1 part by volume of the extender pigment particles, and
   wherein the composite pigment having a diameter on cumulative 50% (D50) in a volume cumulative distribution measured by a laser diffraction/scattering-type particle size distribution measuring apparatus is 1 µm or more and 15 µm or less.

2. A matting pigment comprising the composite pigment set forth in claim 1.

3. A method for producing a composite pigment comprising:
   adjusting a pH of a slurry containing an inorganic compound source and extender pigment particles so that an inorganic compound derived from the inorganic compound source is precipitated to fix the extender pigment particles,
   the composite pigment in which a plurality of the extender pigment particles are aggregated in a granular shape with the inorganic compound interposed between the particles,
   wherein the extender pigment particles comprise barium sulfate and the inorganic compound comprises silica,
   wherein a content ratio of the extender pigment particles and the inorganic compound in the composite pigment is 0.3 to 3 parts by volume of the inorganic compound to 1 part by volume of the extender pigment particles, and
   wherein the composite pigment having a diameter on cumulative 50% (D50) in a volume cumulative distribution measured by a laser diffraction/scattering-type particle size distribution measuring apparatus is 1 µm or more and 15 µm or less.

4. A paint composition comprising the composite pigment set forth in claim 1 and a resin.

5. The paint composition according to claim 4, further comprising a dispersant having an amine value.

6. A paint film comprising the paint composition set forth in claim 4.

7. A paint composition comprising the matting pigment set forth in claim 2, and a resin.

8. A matting pigment consisting essentially of:
   a composite pigment in which a plurality of extender pigment particles are aggregated in a granular shape with an inorganic compound interposed between the particles,
   wherein the extender pigment particles comprise barium sulfate and the inorganic compound comprises silica,
   wherein a content ratio of the extender pigment particles and the inorganic compound in the composite pigment is 0.3 to 3 parts by volume of the inorganic compound to 1 part by volume of the extender pigment particles, and
   wherein the matting pigment having a diameter on cumulative 50% (D50) in a volume cumulative distribution measured by a laser diffraction/scattering-type particle size distribution measuring apparatus is 1 µm or more and 15 µm or less.

9. The composite pigment according to claim 1, wherein the inorganic compound has an aggregating property used to form the granular shape with the inorganic compound interposed between the extender pigment particles.

10. The method according to claim 3, wherein the inorganic compound has an aggregating property used to form the granular shape with the inorganic compound interposed between the extender pigment particles.

11. The matting pigment according to claim 8, wherein the inorganic compound has an aggregating property used to form the granular shape with the inorganic compound interposed between the extender pigment particles.

* * * * *